US012444089B2

(12) United States Patent
Hur et al.

(10) Patent No.: US 12,444,089 B2
(45) Date of Patent: Oct. 14, 2025

(54) POINT CLOUD DATA PROCESSING METHOD AND APPARATUS

(71) Applicant: LG Electronics Inc., Seoul (KR)

(72) Inventors: Hyejung Hur, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 830 days.

(21) Appl. No.: 17/624,086

(22) PCT Filed: Jun. 11, 2020

(86) PCT No.: PCT/KR2020/007566
§ 371 (c)(1),
(2) Date: Dec. 30, 2021

(87) PCT Pub. No.: WO2021/002604
PCT Pub. Date: Jan. 7, 2021

(65) Prior Publication Data
US 2022/0366610 A1 Nov. 17, 2022

(30) Foreign Application Priority Data
Jul. 2, 2019 (KR) ........................ 10-2019-0079322

(51) Int. Cl.
*G06T 9/40* (2006.01)
*G06T 9/00* (2006.01)

(52) U.S. Cl.
CPC ................ *G06T 9/001* (2013.01); *G06T 9/40* (2013.01)

(58) Field of Classification Search
CPC .. G06T 9/00; G06T 9/001; G06T 9/40; G06T 2207/10028; G06T 15/08; H04N 19/184; H04N 19/91; H04N 19/96; H04N 19/597; H04N 19/70; G05T 15/00; G05T 15/005
USPC .................................................. 382/100, 232
See application file for complete search history.

(56) References Cited

U.S. PATENT DOCUMENTS

2015/0373331 A1 12/2015 Krutsch et al.
2016/0275719 A1 9/2016 Oke
2019/0080483 A1* 3/2019 Mammou ............. G06T 3/4007
2019/0081638 A1* 3/2019 Mammou ............ H04N 19/436
2019/0311499 A1* 10/2019 Mammou ................. G06T 7/50
2019/0311501 A1* 10/2019 Mammou ............... G06T 9/001
(Continued)

FOREIGN PATENT DOCUMENTS

CN 107093207 8/2017
CN 109196559 A 1/2019
(Continued)

OTHER PUBLICATIONS

International Search Report and Written Opinion in International Appln. No. PCT/KR2020/007566, dated Sep. 21, 2020, 17 pages (with English translation.
(Continued)

*Primary Examiner* — Sheela C Chawan
(74) *Attorney, Agent, or Firm* — Fish & Richardson P.C.

(57) ABSTRACT

In a method for processing point cloud data according to embodiments, point cloud data can be encoded and transmitted to a bitstream. In a method for processing point cloud data according to embodiments, a bitstream comprising point cloud data can be received, and the point cloud data can be decoded.

14 Claims, 39 Drawing Sheets

(56) References Cited

U.S. PATENT DOCUMENTS

2019/0311502 A1* 10/2019 Mammou ............... G06T 9/001

FOREIGN PATENT DOCUMENTS

| | | |
|---|---|---|
| CN | 109257604 | 1/2019 |
| EP | 3975124 | 3/2022 |

OTHER PUBLICATIONS

Lopes, “Adaptive Plane Projection for Video-based Point Cloud Coding,” Thesis for the degree of Master of Science in Electrical and Computer Engineering, University Tecnico Lisboa, , Nov. 2018, 114 pages.
Mammou et al., “G-PCC codec description v2,” International Organisation for Standardisation, ISO/IEC JTC1/SC29/WG11 N18189, Marrakech, MA, Jan. 2019, 39 pages.
Schwarz et al., “Emerging MPEG Standards for Point Cloud Compression,” IEEE Journal on Emerging and Selected Topics in Circuits and Systems, Dec. 2018, 9(1):133-148.
Hu et al., “Study on 3D Subdivision Mode and encoding in Heliocentric Coordination System,” Chin. J. Space Sci., 2016, 36(1):106-116, (with English abstract).
Office Action in Chinese Appln. No. 202080048800.4, mailed on Apr. 25, 2024, 18 pages (with English translation).
Ze, “3D point cloud compression and visualization study of Kijingling,” Dissertation for the Degree of Computer Technology, Beijing University of Technology, retrieved from <https://www.cnki.net/KCMS/detail/detail.aspx?dbcode-CMFD&dbname=CMFD201701&filename=1016785855.nh&uniplatform=OVERSEA&v-90XMcJ4YSvn5va91r815SrgjTZu_jxdyHRvR2VZoDAKTgOze0nlyt0qJffZWKhhj>, 72 pages (with English abstract).
Notice of Allowance in Chinese Appln. No. 202080048800.4, mailed on Sep. 2, 2024, 7 pages (with English translation).
Qiu et al., “An integrated index online visualization of geo-scene point clouds on mobiles,” Journal of Zhejiang University, (Science Edition), 2019, 46(1): 101-110.
Zhou et al., “Extraction of Building Windows From Mobile Laser Scanning Point Clouds,” IGARSS, IEEE, Jul. 2018, 5 pages.

* cited by examiner object
object
camera
camera
camera
camera
object camera
camera
object
camera
camera FIG. 7
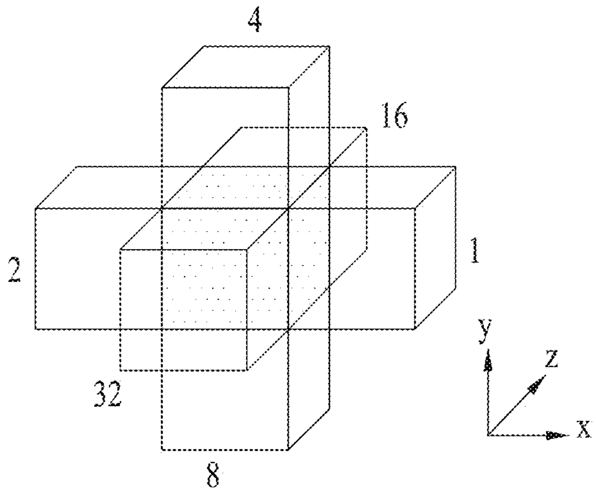
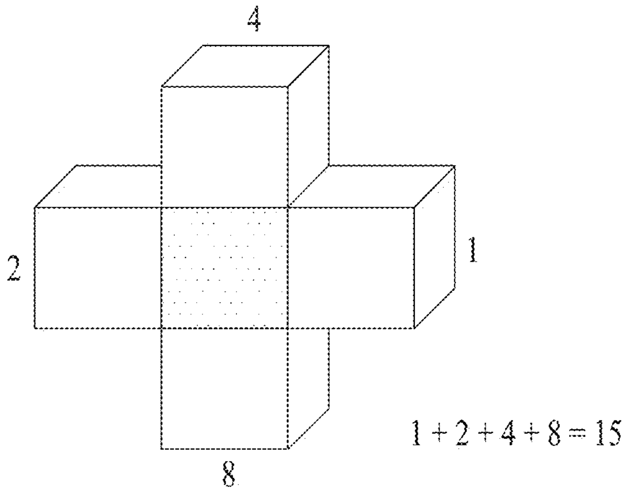

FIG. 29

| attribute_parameter_set( ) { | Descriptor |
|---|---|
| aps_attr_parameter_set_id | ue(v) |
| aps_seq_parameter_set_id | ue(v) |
| attr_coding_type | ue(v) |
| isLifting = ( attr_coding_type = = 0 \|\| attr_coding_type = = 2 ) ? 1 : 0 | |
| if( isLifting ) { | |
| num_pred_nearest_neighbours | ue(v) |
| max_num_direct_predictors | ue(v) |
| lifting_search_range | ue(v) |
| lifting_quant_step_size | ue(v) |
| lifting_quant_step_size_chroma | ue(v) |
| lod_binary_tree_enabled_flag | u(1) |
| num_detail_levels_minus1 | ue(v) |
| for( idx = 0; idx <= num_detail_levels_minus1; idx++ ) { | |
| sampling_distance_squared[ idx ] | ue(v) |
| } | |
| lod_generation_type | ue(v) |
| if (lod_generation_type == 2) { | |
| sampling_range_type | ue(v) |
| sampling_rate | ue(v) |
| sampling_select_type | ue(v) |
| sampling_select_idx | ue(v) |
| sampling_select_max_num_of_points | ue(v) |
| if (sampling_range_type >= 2) { | |
| sampling_begin_depth | ue(v) |
| sampling_isolated_point_minimum_num_of_elements | ue(v) |
| sampling_isolated_point_sampling_type | ue(v) |
| sampling_isolated_point_maximum_merge_range | ue(v) |
| } | |

2900

| } | Descriptor |
|---|---|
| if( attr_coding_type = = 0 ) //PredictingLifting | ue(v) |
| adaptive_prediction_threshold | ue(v) |
| } | ue(v) |
| if( attribute_coding_type = = 1 ) { //RAHT | |
| raht_depth | |
| raht_quant_step_size | ue(v) |
| } | ue(v) |
| aps_extension_present_flag | ue(v) |
| if( aps_extension_present_flag ) | ue(v) |
| while( more_data_in_byte_stream( ) ) | ue(v) |
| aps_extension_data_flag | u(1) |
| num_detail_levels_minus1 | ue(v) |
| for( idx = 0; idx <= num_detail_levels_minus1; idx++ ) { | |
| sampling_distance_squared[ idx ] | ue(v) |
| if( aps_extension_present_flag ) | |
| } | ue(v) |

FIG. 30

| attribute_parameter_set( ) { | Descriptor |
|---|---|
| aps_attr_parameter_set_id | ue(v) |
| aps_seq_parameter_set_id | ue(v) |
| attr_coding_type | ue(v) |
| isLifting = ( attr_coding_type == 0 \|\| attr_coding_type == 2 ) ? 1 : 0 | |
| if( isLifting ) { | |
| num_pred_nearest_neighbours | ue(v) |
| max_num_direct_predictors | ue(v) |
| lifting_search_range | ue(v) |
| lifting_quant_step_size | ue(v) |
| lifting_quant_step_size_chroma | ue(v) |
| lod_binary_tree_enabled_flag | u(1) |
| num_detail_levels_minus1 | ue(v) |
| for( idx = 0; idx <= num_detail_levels_minus1; idx++ ) { | |
| sampling_distance_squared[ idx ] | ue(v) |
| lod_generation_type | ue(v) |
| if (lod_generation_type == 2) { | |
| sampling_begin_depth | |
| 3000 → sampling_attrs_per_lod_flag | u(1) |
| 3010: if (sampling_attrs_per_lod_flag) { | |
| for( idx = 0; idx <= num_detail_levels_minus1; idx++ ) { | |
| sampling_range_type[idx] | ue(v) |
| sampling_rate[idx] | ue(v) |
| sampling_select_type[idx] | |
| sampling_select_idx[idx] | |
| sampling_select_max_num_of_points[idx] | ue(v) |
| if (sampling_range_type[idx] > 2) { | |
| sampling_isolated_point_minimum_num_of_elements[idx] | ue(v) |
| sampling_isolated_point_sampling_type[idx] | ue(v) |
| sampling_isolated_point_maximum_merge_range[idx] | ue(v) |
| } | |
| } | |
| } | |
| if( attr_coding_type == 0 ) //PredictingLifting | |
| adaptive_prediction_threshold | ue(v) |
| } | |
| if( attribute_coding_type == 1 ) { //RAHT | |
| raht_depth | ue(v) |
| raht_quant_step_size | ue(v) |
| raht_quant_step_size_chroma | ue(v) |
| aps_extension_present_flag | u(1) |
| if( aps_extension_present_flag ) | |
| while( more_data_in_byte_stream( ) ) | |
| aps_extension_data_flag | u(1) |
| byte_alignment( ) | |
| } | |

FIG. 31

| tile_parameter_set( ) { | Descriptor |
|---|---|
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| tile_bounding_box_offset_z[ i ] | se(v) |
| tile_bounding_box_scale_factor[ i ] | ue(v) |
| tile_bounding_box_size_width[ i ] | ue(v) |
| tile_bounding_box_size_height[ i ] | ue(v) |
| lod_generation_type | ue(v) |
| if (lod_generation_type == 2) { | |
| sampling_range_type | ue(v) |
| sampling_rate | ue(v) |
| sampling_select_type | ue(v) |
| sampling_select_idx | ue(v) |
| sampling_select_max_num_of_points | ue(v) |
| if (sampling_range_type >= 2) { | |
| sampling_isolated_point_mininum_num_of_elements | ue(v) |
| sampling_isolated_point_sampling_type | ue(v) |
| sampling_isolated_point_maximum_merge_range | ue(v) |
| } | |
| } | |
| } | |
| byte_alignment( ) | |
| } | |

3100 (lod_generation_type through closing brace of if block)

FIG. 32

| tile_parameter_set( ) { | Descriptor |
|---|---|
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| tile_bounding_box_offset_z[ i ] | se(v) |
| tile_bounding_box_scale_factor[ i ] | ue(v) |
| tile_bounding_box_size_width[ i ] | ue(v) |
| tile_bounding_box_size_height[ i ] | ue(v) |
| lod_generation_type | ue(v) |
| if (lod_generation_type == 2) { | |
| sampling_begin_depth | |
| sampling_attrs_per_lod_flag | u(1) |
| if (sampling_attrs_per_lod_flag) { | |
| for( idx = 0; idx <= num_detail_levels_minus1; idx++ ) { | |
| sampling_range_type[idx] | ue(v) |
| sampling_rate[idx] | ue(v) |
| sampling_select_type[idx] | |
| sampling_select_idx[idx] | |
| sampling_select_max_num_of_points[idx] | ue(v) |
| if (sampling_range_type[idx] > 2) { | |
| sampling_isolated_point_mininum_num_of_elements[idx] | ue(v) |
| sampling_isolated_point_sampling_type[idx] | ue(v) |
| sampling_isolated_point_maximum_merge_range | |
| } | |
| } | |
| } | |
| } | |
| } | |
| byte_alignment( ) | |

3200 (sampling_attrs_per_lod_flag)

3210 (if (sampling_attrs_per_lod_flag) { … })

| attribute_slice_header( ) { | Descriptor |
|---|---|
| ash_attr_parameter_set_id | ue(v) |
| ash_attr_sps_attr_idx | ue(v) |
| ash_attr_geom_slice_id | ue(v) |
| lod_generation_type | ue(v) |
| if (lod_generation_type == 2) { | |
| sampling_range_type | ue(v) |
| sampling_rate | ue(v) |
| sampling_select_type | ue(v) |
| sampling_select_idx | ue(v) |
| sampling_select_max_num_of_points | ue(v) |
| if (sampling_range_type >= 2) { | |
| sampling_begin_depth | ue(v) |
| sampling_isolated_point_mininum_num_of_elements | ue(v) |
| sampling_isolated_point_sampling_type | ue(v) |
| sampling_isolated_point_maximum_merge_range | ue(v) |
| } | |
| } | |
| byte_alignment( ) | |

FIG. 34

3400 → sampling_attrs_per_lod_flag 3410 (bracket: if (sampling_attrs_per_lod_flag) { … })

| attribute_slice_header( ) { | Descriptor |
|---|---|
| ash_attr_parameter_set_id | ue(v) |
| ash_attr_sps_attr_idx | ue(v) |
| ash_attr_geom_slice_id | ue(v) |
| lod_generation_type | ue(v) |
| if (lod_generation_type == 2) { | |
| sampling_begin_depth | ue(v) |
| sampling_attrs_per_lod_flag | ue(v) |
| if (sampling_attrs_per_lod_flag) { | ue(v) |
| for( idx = 0; idx <= num_detail_levels_minus1; idx++ ) { | ue(v) |
| sampling_range_type[idx] | ue(v) |
| sampling_rate[idx] | |
| sampling_select_type[idx] | ue(v) |
| sampling_select_idx[idx] | ue(v) |
| sampling_select_max_num_of_points[idx] | ue(v) |
| if (sampling_range_type[idx] > 2) { | ue(v) |
| sampling_isolated_point_minimum_num_of_elements[idx] | |
| sampling_isolated_point_sampling_type[idx] | |
| sampling_isolated_point_maximum_merge_range[idx] | |
| } | |
| } | |
| } | |
| } | |
| byte_alignment( ) | |

POINT CLOUD DATA PROCESSING METHOD AND APPARATUS

CROSS-REFERENCE TO RELATED APPLICATIONS

This application is a National Stage application under 35 U.S.C. § 371 of International Application No. PCT/KR2020/007566, filed on Jun. 11, 2020, which claims the benefit of Korean Application No. 10-2019-0079322, filed on Jul. 2, 2019. The disclosures of the prior applications are incorporated by reference in their entirety.

TECHNICAL FIELD

The present disclosure provides a method for providing point cloud contents to provide a user with various services such as virtual reality (VR), augmented reality (AR), mixed reality (MR), and self-driving services.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

To achieve these objects and other advantages and in accordance with the purpose of the disclosure, in some embodiments, a method for transmitting point cloud data may include: encoding the point cloud data including geometry information and attribute information and transmitting a bitstream including the encoded point cloud data. In some embodiments, the geometry information represents positions of points of the point cloud data and the attribute information represents attributes of the points of the point cloud data.

In some embodiments, a method for processing point cloud data may include receiving a bitstream including the point cloud data. In some embodiments, the point cloud data includes geometry information and attribute information, wherein the geometry information represents positions of points of the point cloud data, and the attribute information represents one or more attributes of the points of the point cloud data. The point cloud data processing method may include decoding the point cloud data.

In some embodiments, a method for processing point cloud data may include receiving a bitstream including the point cloud data and decoding the point cloud data. In some embodiments, the point cloud data includes geometry information and attribute information, wherein the geometry information represents positions of points of the point cloud data, and the attribute information indicating one or more attributes of the points of the point cloud data.

In some embodiments, a device for processing point cloud data may include a receiver configured to receive a bitstream including the point cloud data and a decoder configured to decode the point cloud data. In some embodiments, the point cloud data includes geometry information and attribute information, wherein the geometry information represents positions of points of the point cloud data, and the attribute information indicating one or more attributes of the points of the point cloud data.

Advantageous Effects

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure.

For a better understanding of various embodiments described below, reference should be made to the description of the following embodiments in connection with the accompanying drawings. In the drawings:

FIG. 7 shows an example of a neighbor node pattern according to embodiments;

FIG. 29 shows an exemplary syntax for APS according to embodiments;

FIG. 30 shows an exemplary syntax for APS according to embodiments;

FIG. 31 shows an exemplary syntax for TPS according to embodiments;

FIG. 32 shows an exemplary syntax for TPS according to embodiments;

FIG. 33 shows an exemplary syntax for an attribute header according to embodiments;

FIG. 34 shows an exemplary syntax for an attribute header according to embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
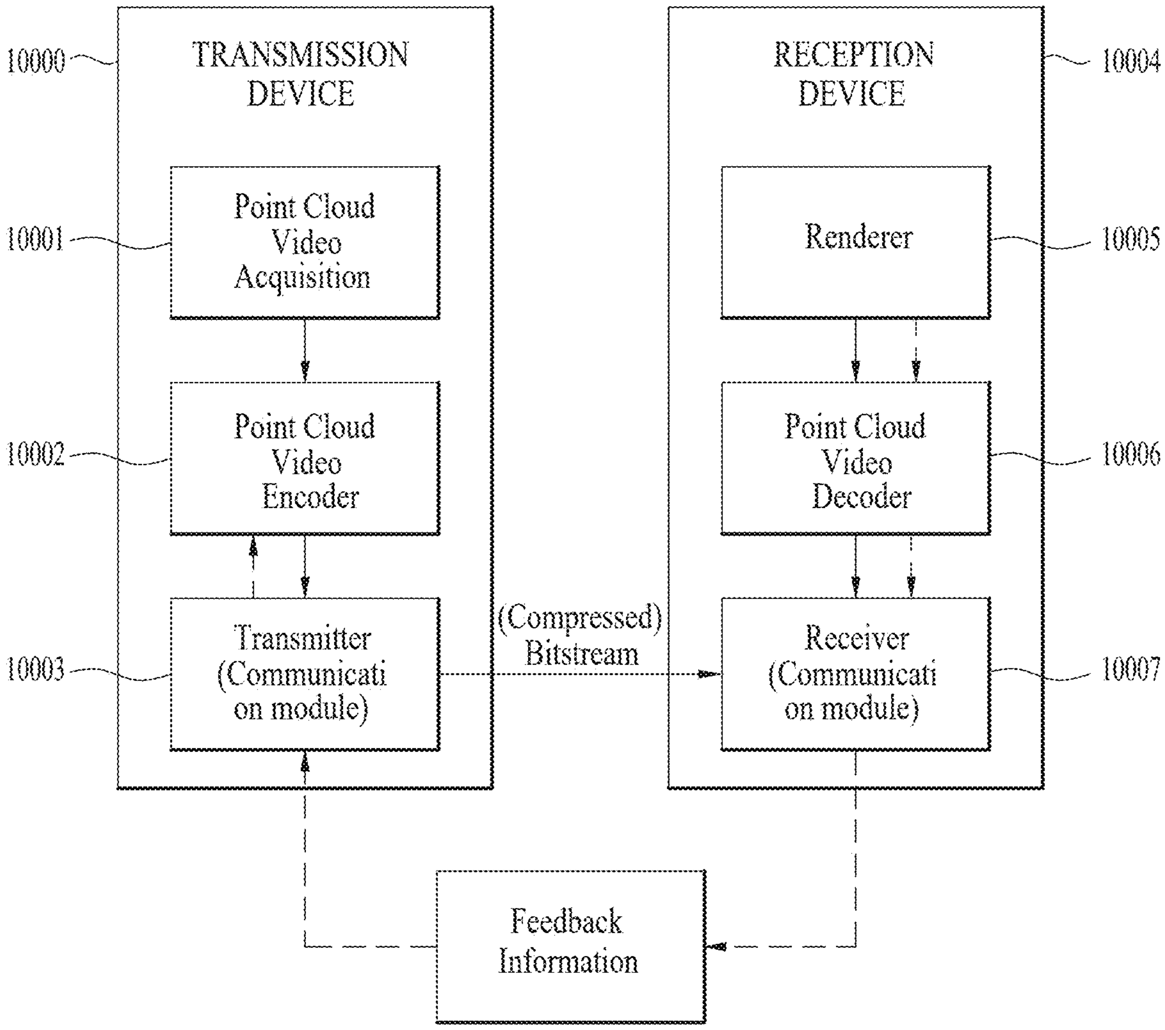
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device

10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in the opposite process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
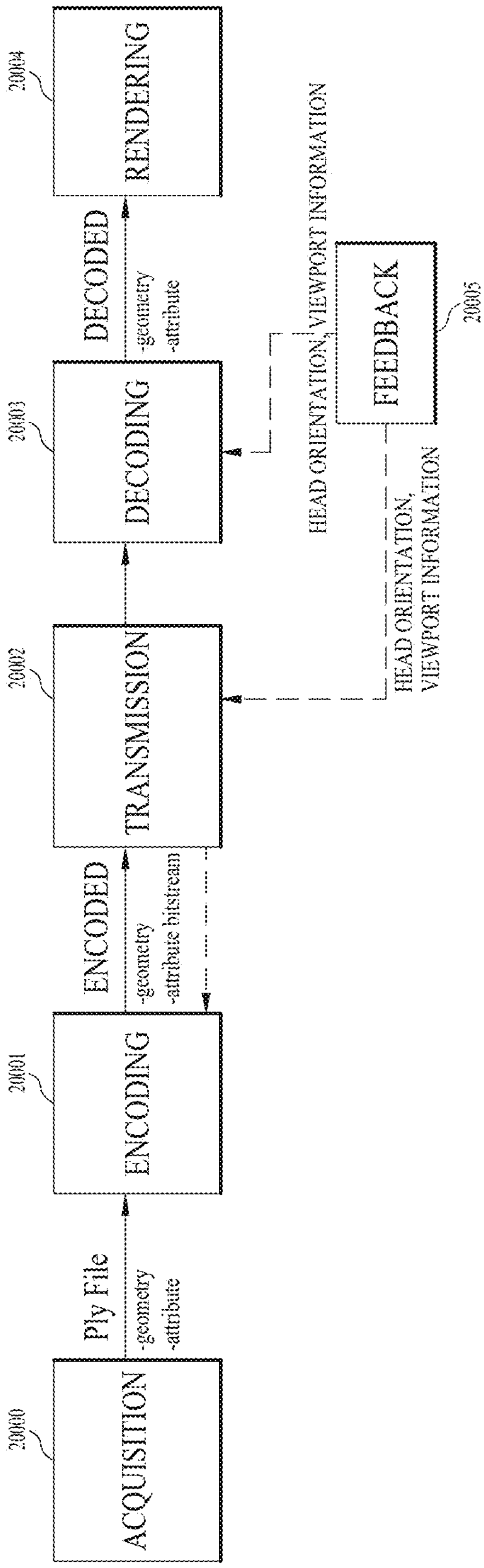
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
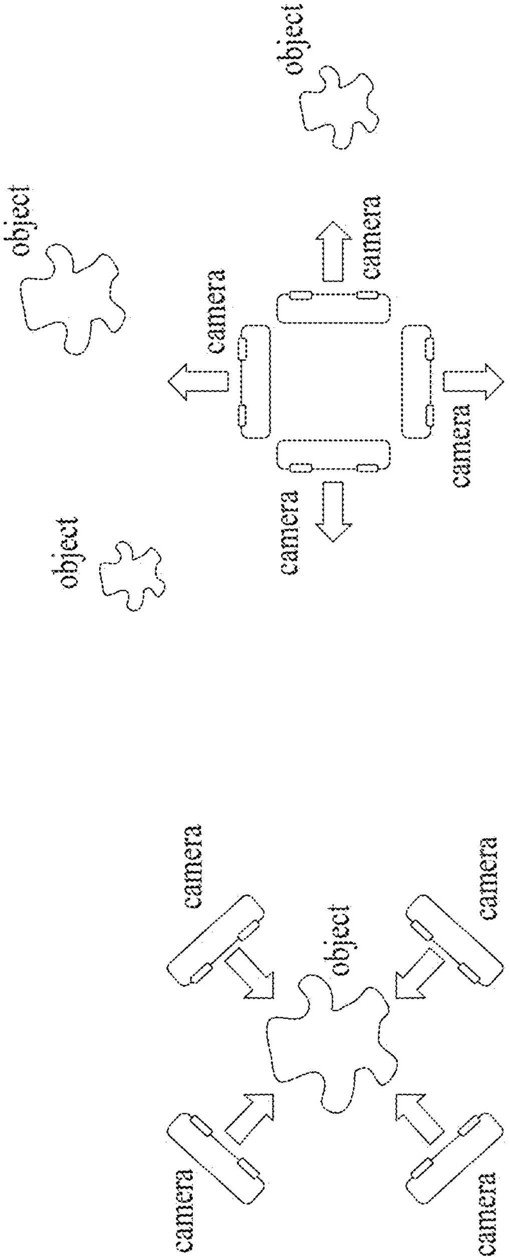
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
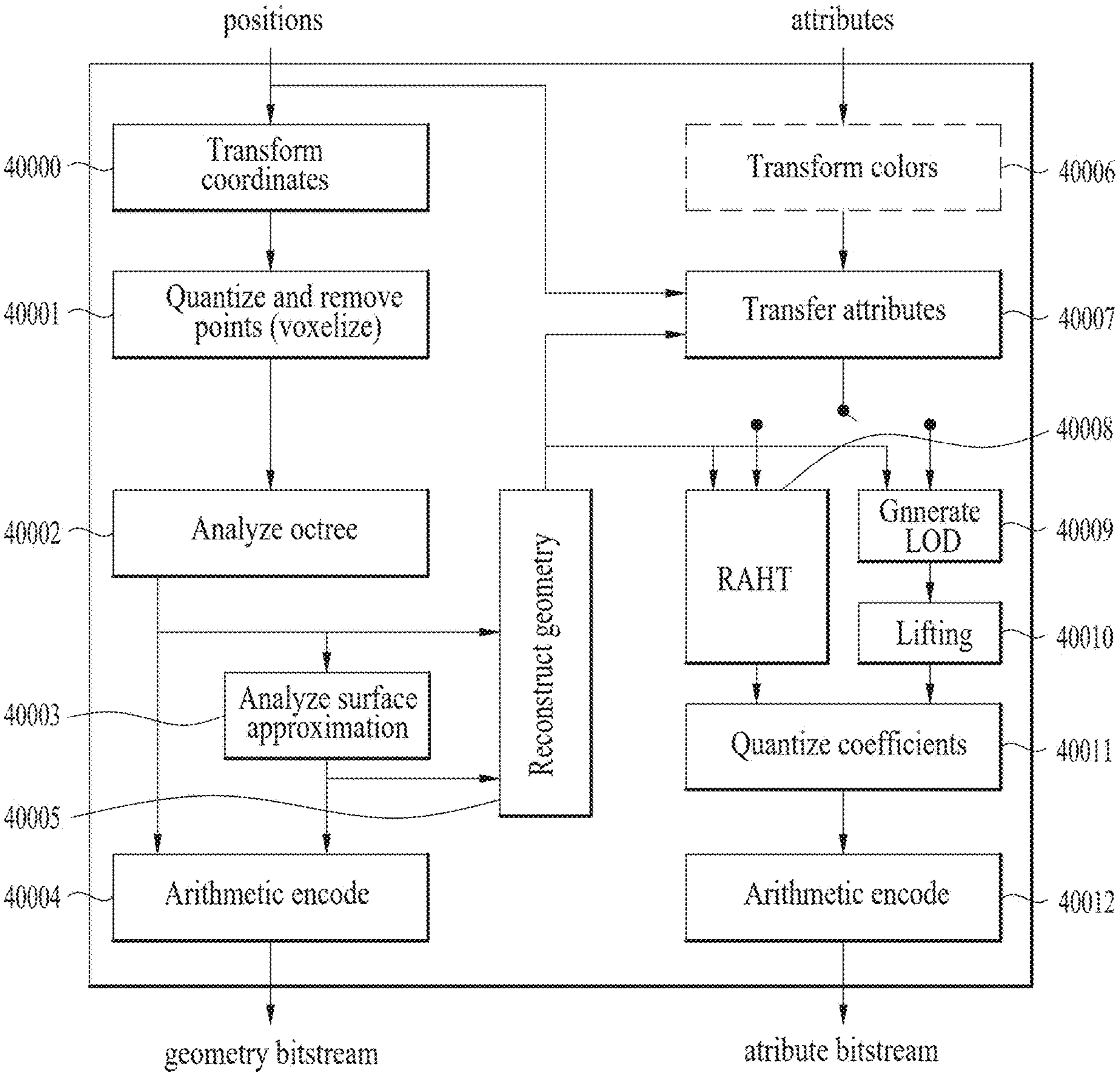
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighbor points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighbor points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
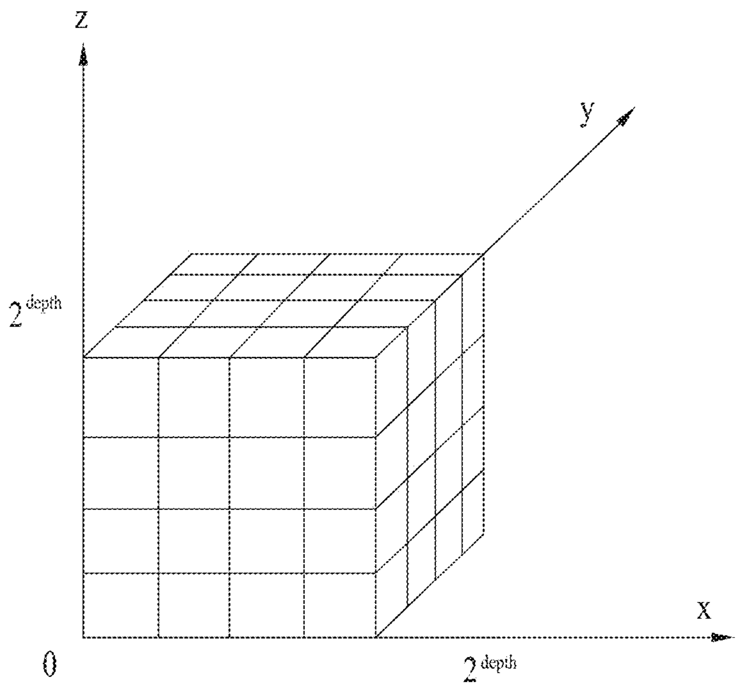
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
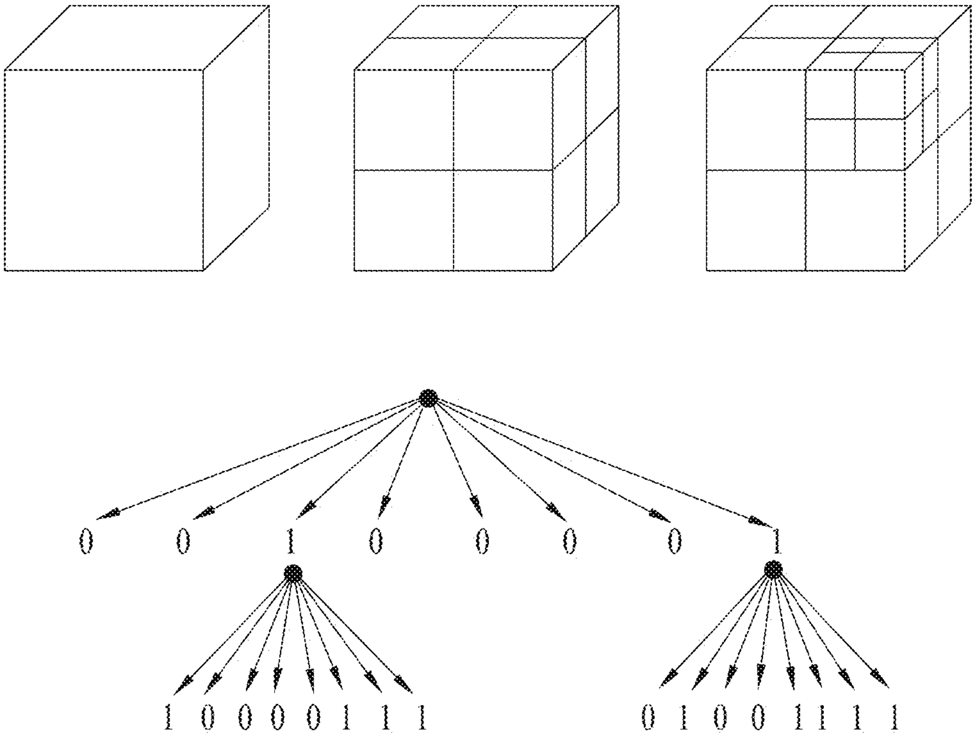
FIG. 6 shows an example of an octree and occupancy code according to embodiments.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, 2d may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d=\mathrm{Ceil}(\mathrm{Log}\ 2(\mathrm{Max}(x_n^{int},y_n^{int},z_n^{int},n=1,\ldots,N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004)

according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: 1) calculating the centroid value of each vertex, 2) subtracting the center value from each vertex value, and 3) estimating the sum of the squares of the values obtained by the subtraction.

$$\begin{bmatrix}\mu_x\\ \mu_y\\ \mu_z\end{bmatrix} = \frac{1}{n}\sum_{i=1}^{n}\begin{bmatrix}x_i\\ y_i\\ z_i\end{bmatrix} \quad 1)$$

$$\begin{bmatrix}\bar{x}_i\\ \bar{y}_i\\ \bar{z}_i\end{bmatrix} = \begin{bmatrix}x_i\\ y_i\\ z_i\end{bmatrix} - \begin{bmatrix}\mu_x\\ \mu_y\\ \mu_z\end{bmatrix} \quad 2)$$

$$\begin{bmatrix}\sigma_x^2\\ \sigma_y^2\\ \sigma_z^2\end{bmatrix} = \sum_{i=1}^{n}\begin{bmatrix}\bar{x}_i^2\\ \bar{y}_i^2\\ \bar{z}_i^2\end{bmatrix} \quad 3)$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 1

TABLE Triangles formed from vertices ordered 1

| n | Triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
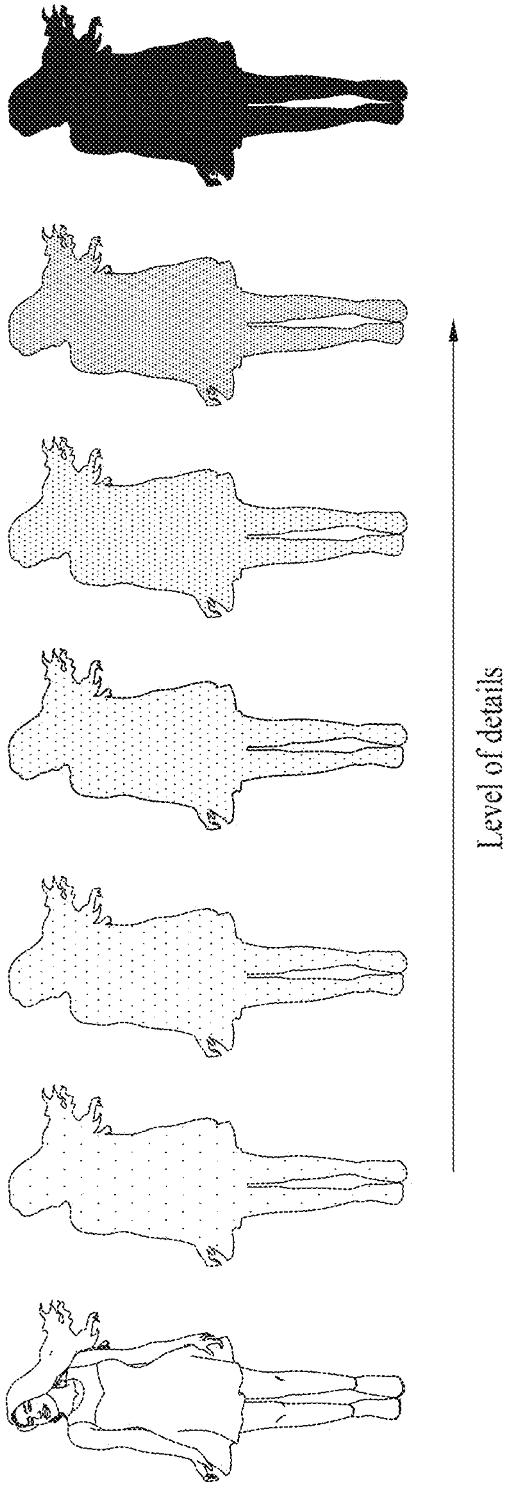
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
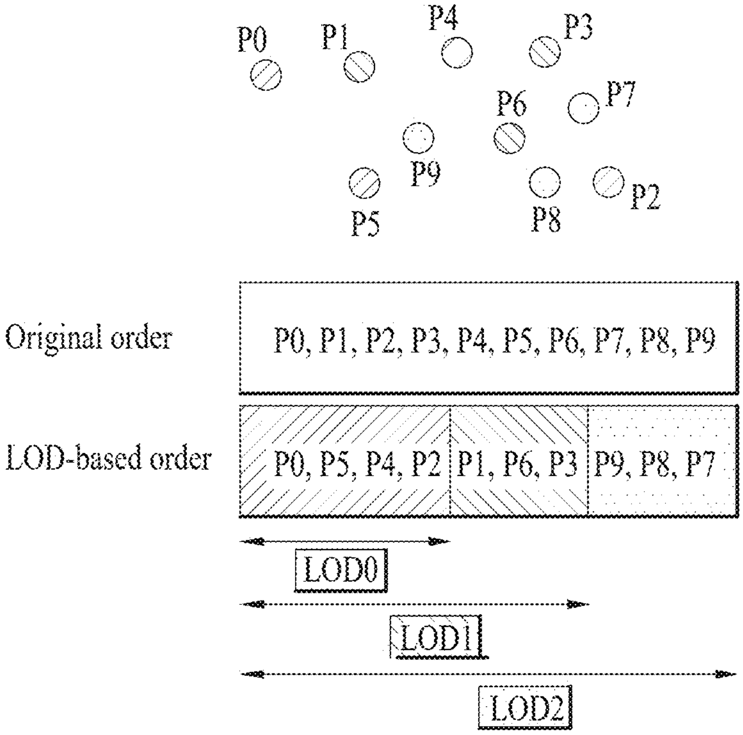
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighbor points present within a set distance for each LOD, and a distance to the neighbor points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE Attribute prediction residuals quantization pseudo code

TABLE 2

```
int PCCQuantization(int value, int quantStep) {
  if( value >=0) {
    return floor(value / quantStep + 1.0 / 3.0);
  } else {
    return −floor(−value / quantStep + 1.0 / 3.0);
  }
}
```

TABLE Attribute prediction residuals inverse quantization pseudo code

TABLE 3

```
int PCCInverseQuantization(int value, int quantStep) {
  if( quantStep ==0) {
    return value;
  } else {
    return value * quantStep;
  }
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}$$

$$T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l_{-1x,y,z}}=w_{l_{2x,y,z}}+w_{l_{2x+1,y,z}}$. The root node is created through the $g_{1_{0,0,0}}$, and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
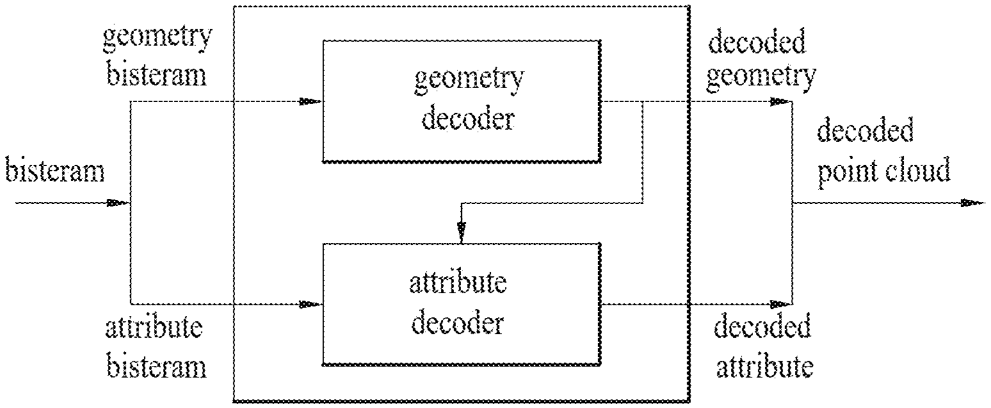
FIG. 10 illustrates an exemplary point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
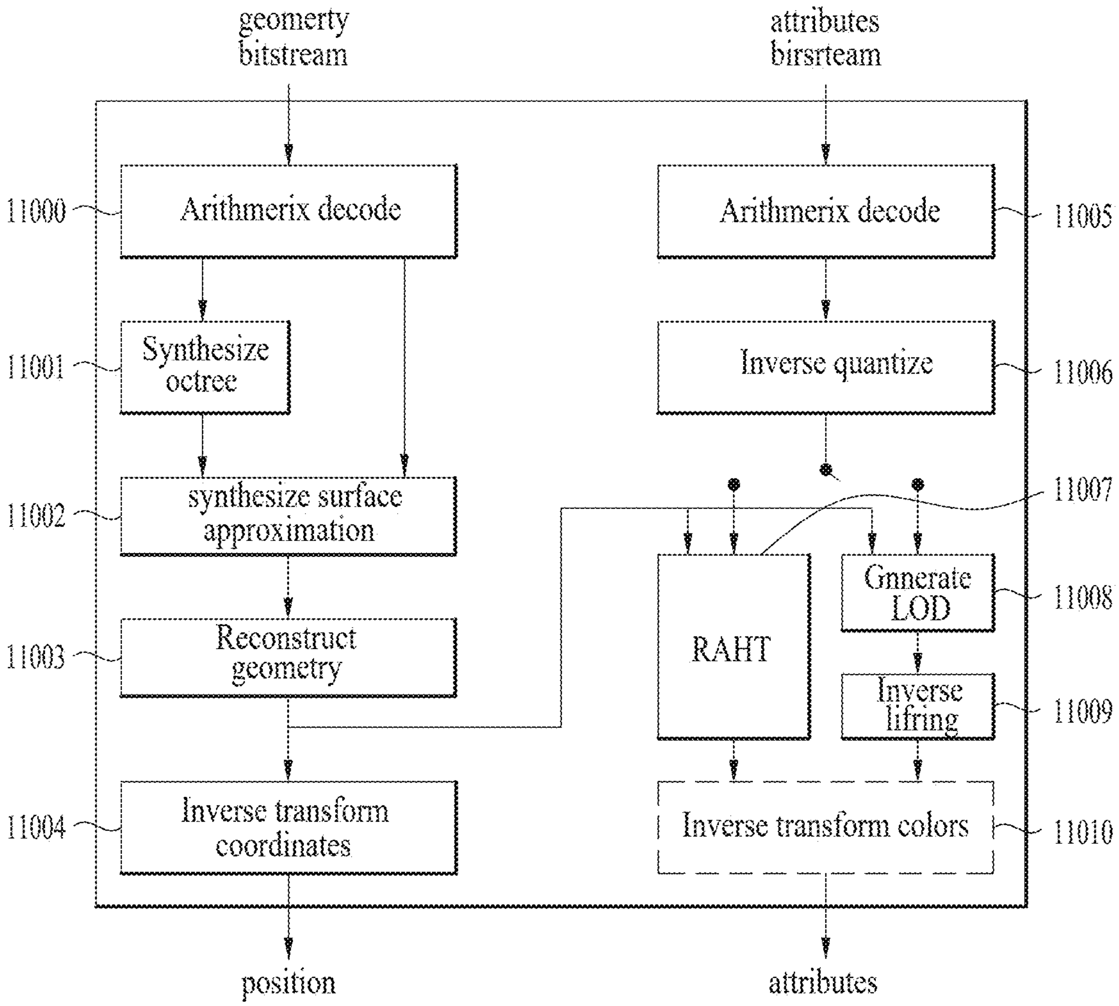
FIG. 11 illustrates an exemplary point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
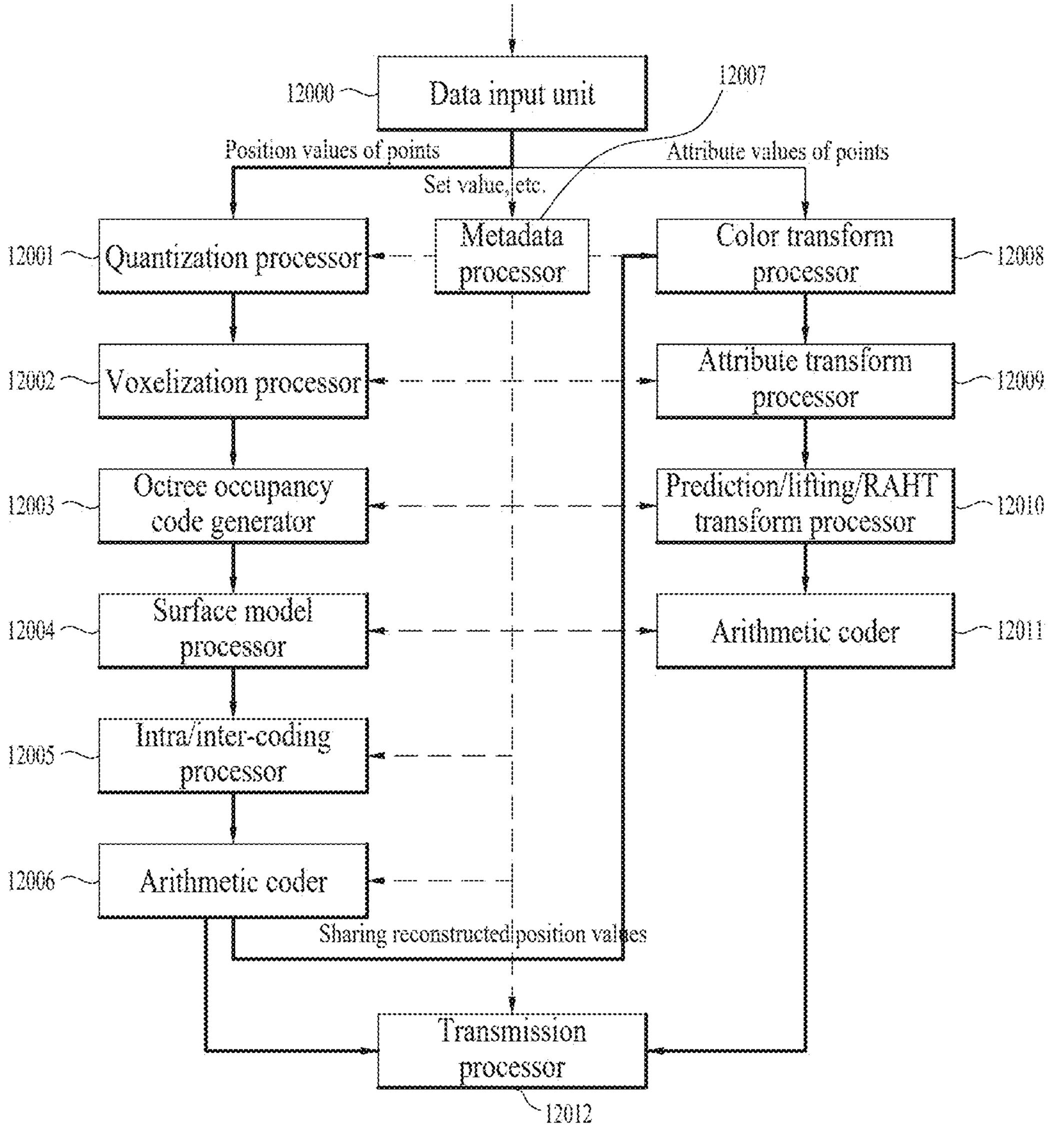
FIG. 12 illustrates an exemplary transmission device according to embodiments.

FIG. 12 illustrates an exemplary transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom0$^0$ and one or more attribute bitstreams Attr0$^0$ and Attr1$^0$. The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same or similar to the operation and/or transmission method of the transmitter 10003. Details are the same as those described with reference to FIGS. 1 and 2, and thus a description thereof is omitted.

Figure 13:
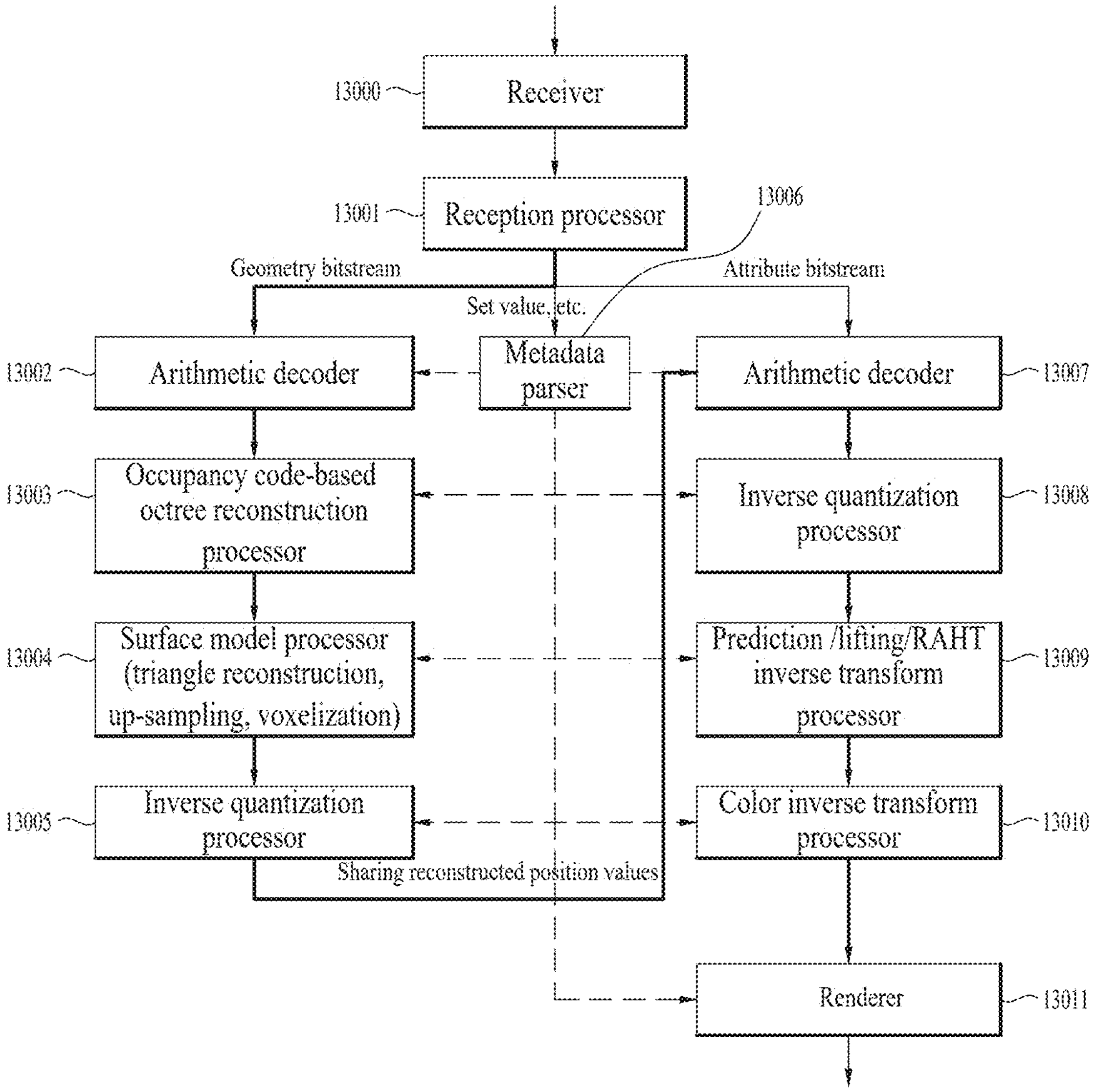
FIG. 13 illustrates an exemplary reception device according to embodiments.

FIG. 13 illustrates an exemplary reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 1301 performs one or more of operations and/or decoding the same or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same or similar to the operation and/or inverse transform coding of the color inverse transformer 11010. The renderer 13011 according to the embodiments may render the point cloud data.

Figure 14:
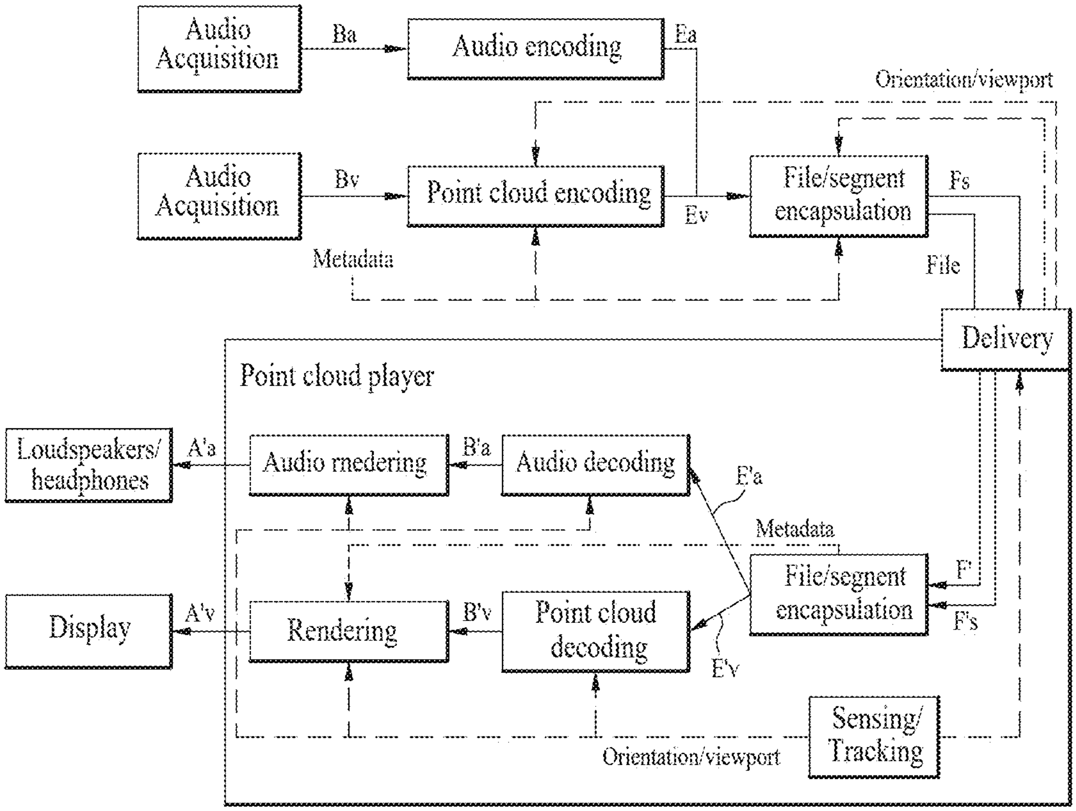
FIG. 14 illustrates an architecture for streaming G-PCC-based point cloud data according to embodiments.

FIG. 14 illustrates an architecture for streaming G-PCC-based point cloud data according to embodiments.

The upper part of FIG. 14 shows a process of processing and transmitting point cloud content by the transmission device described in FIGS. 1 to 13 (for example, the transmission device 10000, the transmission device of FIG. 12, etc.).

As described with reference to FIGS. 1 to 13, the transmission device may acquire audio Ba of the point cloud content (Audio Acquisition), encode the acquired audio (Audio Encoding), and output an audio bitstream Ea. In addition, the transmission device may acquire a point cloud (or point cloud video) By of the point cloud content (Point Acquisition), and perform point cloud encoding on the acquired point cloud to output a point cloud video bitstream Eb. The point cloud encoding of the transmission device is the same or similar to the point cloud encoding described with reference to FIGS. 1 to 13 (for example, the encoding of the point cloud encoder of FIG. 4), and thus a detailed description thereof will be omitted.

The transmission device may encapsulate the generated audio bitstream and video bitstream into a file and/or a segment (File/segment encapsulation). The encapsulated file and/or segment Fs, File may include a file in a file format such as ISOBMFF or a DASH segment. Point cloud-related metadata according to embodiments may be contained in the encapsulated file format and/or segment. The metadata may be contained in boxes of various levels on the ISOBMFF file format, or may be contained in a separate track within the file. According to an embodiment, the transmission device may encapsulate the metadata into a separate file. The transmission device according to the embodiments may deliver the encapsulated file format and/or segment over a network. The processing method for encapsulation and transmission by the transmission device is the same as that described with reference to FIGS. 1 to 13 (for example, the transmitter 10003, the transmission step 20002 of FIG. 2, etc.), and thus a detailed description thereof will be omitted.

The lower part of FIG. 14 shows a process of processing and outputting point cloud content by the reception device (for example, the reception device 10004, the reception device of FIG. 13, etc.) described with reference to FIGS. 1 to 13.

According to embodiments, the reception device may include devices configured to output final audio data and final video data (e.g., loudspeakers, headphones, a display), and a point cloud player configured to process point cloud content (a point cloud player). The final data output devices and the point cloud player may be configured as separate physical devices. The point cloud player according to the embodiments may perform geometry-based point cloud compression (G-PCC) coding, video-based point cloud compression (V-PCC) coding and/or next-generation coding.

The reception device according to the embodiments may secure a file and/or segment F', Fs' contained in the received data (for example, a broadcast signal, a signal transmitted over a network, etc.) and decapsulate the same (File/segment decapsulation). The reception and decapsulation methods of the reception device is the same as those described with reference to FIGS. 1 to 13 (for example, the receiver 10005, the reception unit 13000, the reception processing unit 13001, etc.), and thus a detailed description thereof will be omitted.

The reception device according to the embodiments secures an audio bitstream E'a and a video bitstream E'v contained in the file and/or segment. As shown in the figure, the reception device outputs decoded audio data B'a by performing audio decoding on the audio bitstream, and renders the decoded audio data (audio rendering) to output final audio data A'a through loudspeakers or headphones.

Also, the reception device performs point cloud decoding on the video bitstream E'v and outputs decoded video data B'v. The point cloud decoding according to the embodiments is the same or similar to the point cloud decoding described with reference to FIGS. 1 to 13 (for example, decoding of the point cloud decoder of FIG. 11), and thus a detailed description thereof will be omitted. The reception device may render the decoded video data and output final video data through the display.

The reception device according to the embodiments may perform at least one of decapsulation, audio decoding, audio rendering, point cloud decoding, and point cloud video rendering based on the transmitted metadata. The details of the metadata are the same as those described with reference to FIGS. 12 to 13, and thus a description thereof will be omitted.

As indicated by a dotted line shown in the figure, the reception device according to the embodiments (for example, a point cloud player or a sensing/tracking unit in the point cloud player) may generate feedback information (orientation, viewport). According to embodiments, the feedback information may be used in a decapsulation process, a point cloud decoding process and/or a rendering process of the reception device, or may be delivered to the transmission device. Details of the feedback information are the same as those described with reference to FIGS. 1 to 13, and thus a description thereof will be omitted.

Figure 15:
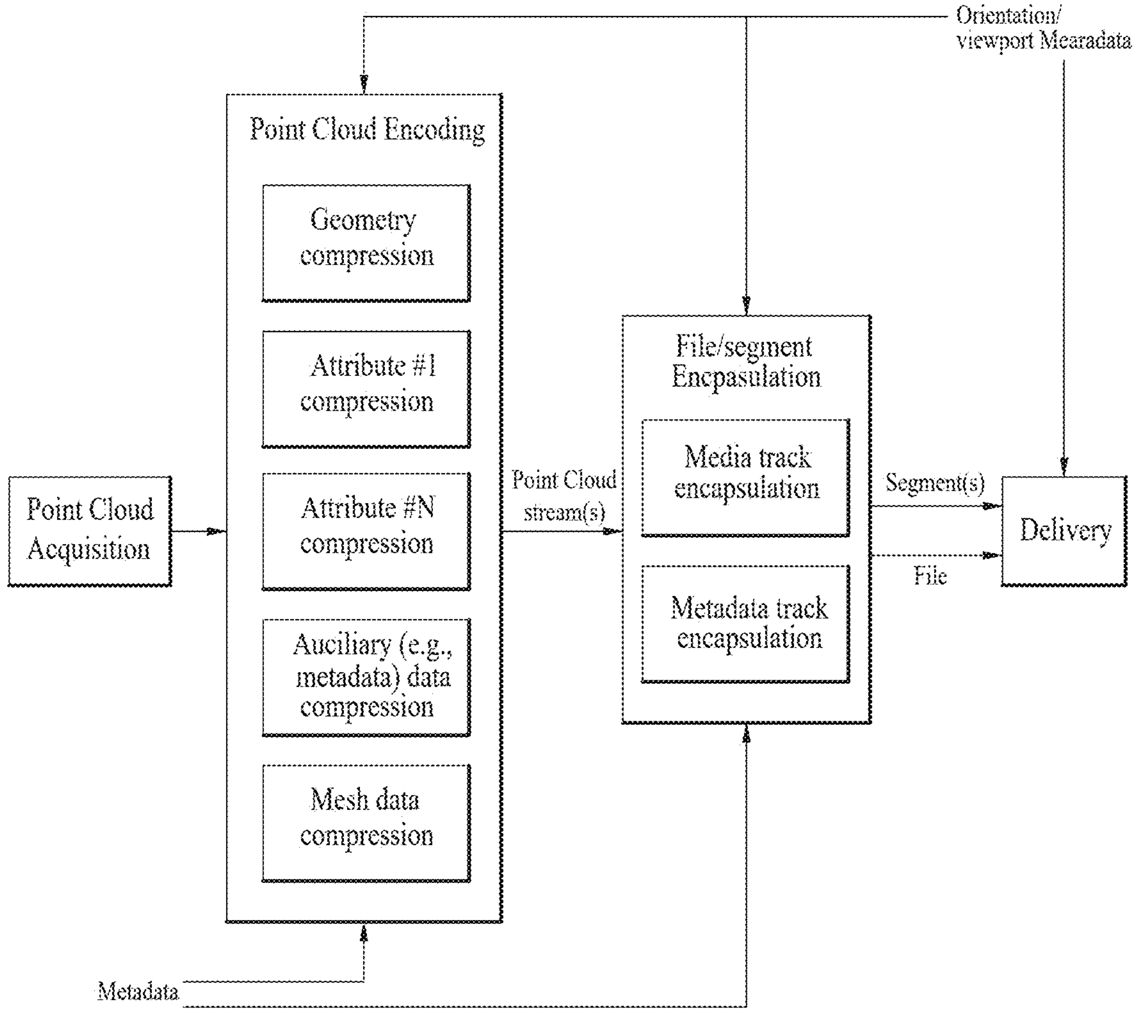
FIG. 15 illustrates an exemplary point cloud transmission device according to embodiments.

FIG. 15 shows an exemplary transmission device according to embodiments.

The transmission device of FIG. 15 is a device configured to transmit point cloud content, and corresponds to an example of the transmission device described with reference to FIGS. 1 to 14 (e.g., the transmission device 10000 of FIG. 1, the point cloud encoder of FIG. 4, the transmission device of FIG. 12, the transmission device of FIG. 14). Accordingly, the transmission device of FIG. 15 performs an operation that is identical or similar to that of the transmission device described with reference to FIGS. 1 to 14.

The transmission device according to the embodiments may perform one or more of point cloud acquisition, point cloud encoding, file/segment encapsulation and delivery.

Since the operation of point cloud acquisition and delivery illustrated in the figure is the same as the operation described with reference to FIGS. 1 to 14, a detailed description thereof will be omitted.

As described above with reference to FIGS. 1 to 14, the transmission device according to the embodiments may perform geometry encoding and attribute encoding. The geometry encoding may be referred to as geometry compression, and the attribute encoding may be referred to as attribute compression. As described above, one point may have one geometry and one or more attributes. Accordingly, the transmission device performs attribute encoding on each attribute. The figure illustrates that the transmission device performs one or more attribute compressions (attribute #1 compression, . . . , attribute #N compression). In addition, the transmission device according to the embodiments may perform auxiliary compression. The auxiliary compression is performed on the metadata. Details of the metadata are the same as those described with reference to FIGS. 1 to 14, and thus a description thereof will be omitted. The transmission device may also perform mesh data compression. The mesh data compression according to the embodiments may include the trisoup geometry encoding described with reference to FIGS. 1 to 14.

The transmission device according to the embodiments may encapsulate bitstreams (e.g., point cloud streams) output according to point cloud encoding into a file and/or a segment. According to embodiments, the transmission device may perform media track encapsulation for carrying data (for example, media data) other than the metadata, and perform metadata track encapsulation for carrying metadata. According to embodiments, the metadata may be encapsulated into a media track.

As described with reference to FIGS. 1 to 14, the transmission device may receive feedback information (orientation/viewport metadata) from the reception device, and perform at least one of the point cloud encoding, file/segment encapsulation, and delivery operations based on the received feedback information. Details are the same as those described with reference to FIGS. 1 to 14, and thus a description thereof will be omitted.

Figure 16:
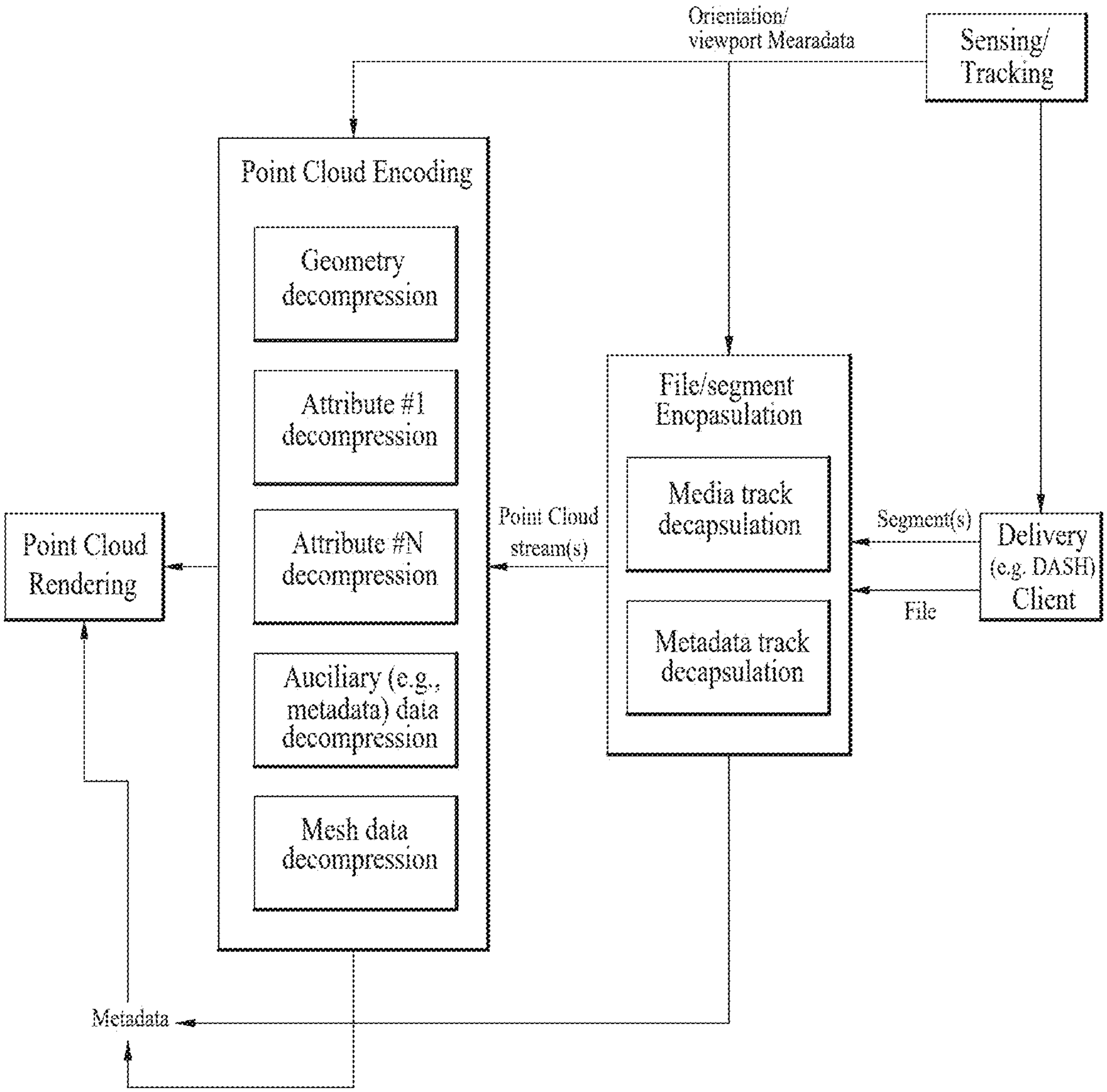
FIG. 16 illustrates an exemplary point cloud reception device according to embodiments.

FIG. 16 shows an exemplary reception device according to embodiments.

The reception device of FIG. 16 is a device for receiving point cloud content, and corresponds to an example of the reception device described with reference to FIGS. 1 to 14 (for example, the reception device 10004 of FIG. 1, the point cloud decoder of FIG. 11, and the reception device of FIG. 13, the reception device of FIG. 14). Accordingly, the reception device of FIG. 16 performs an operation that is identical or similar to that of the reception device described with reference to FIGS. 1 to 14. The reception device of FIG. 16 may receive a signal transmitted from the transmission device of FIG. 15, and perform the opposite process of the operation of the transmission device of FIG. 15.

The reception device according to the embodiments may perform at least one of delivery, file/segment decapsulation, point cloud decoding, and point cloud rendering.

Since the point cloud reception and point cloud rendering operations illustrated in the figure are the same as those described with reference to FIGS. 1 to 14, a detailed description thereof will be omitted.

As described with reference to FIGS. 1 to 14, the reception device according to the embodiments decapsulate the file and/or segment acquired from a network or a storage device. According to embodiments, the reception device may perform media track decapsulation for carrying data (for example, media data) other than the metadata, and perform metadata track decapsulation for carrying metadata. According to embodiments, in the case where the metadata is encapsulated into a media track, the metadata track decapsulation is omitted.

As described with reference to FIGS. 1 to 14, the reception device may perform geometry decoding and attribute decoding on bitstreams (e.g., point cloud streams) secured through decapsulation. The geometry decoding may be referred to as geometry decompression, and the attribute decoding may be referred to as attribute decompression. As described above, one point may have one geometry and one or more attributes, each of which is encoded by the transmission device. Accordingly, the reception device performs attribute decoding on each attribute. The figure illustrates that the reception device performs one or more attribute decompressions (attribute #1 decompression, . . . , attribute #N decompression). The reception device according to the embodiments may also perform auxiliary decompression. The auxiliary decompression is performed on the metadata. Details of the metadata are the same as those described with reference to FIGS. 1 to 14, and thus a disruption thereof will be omitted. The reception device may also perform mesh data decompression. The mesh data decompression according to the embodiments may include the trisoup geometry decoding described with reference to FIGS. 1 to 14. The reception device according to the embodiments may render the point cloud data that is output according to the point cloud decoding.

As described with reference to FIGS. 1 to 14, the reception device may secure orientation/viewport metadata using a separate sensing/tracking element, and transmit feedback information including the same to a transmission device (for example, the transmission device of FIG. 15). In addition, the reception device may perform at least one of a reception operation, file/segment decapsulation, and point cloud decoding based on the feedback information. Details are the same as those described with reference to FIGS. 1 to 14, and thus a description thereof will be omitted.

Figure 17:
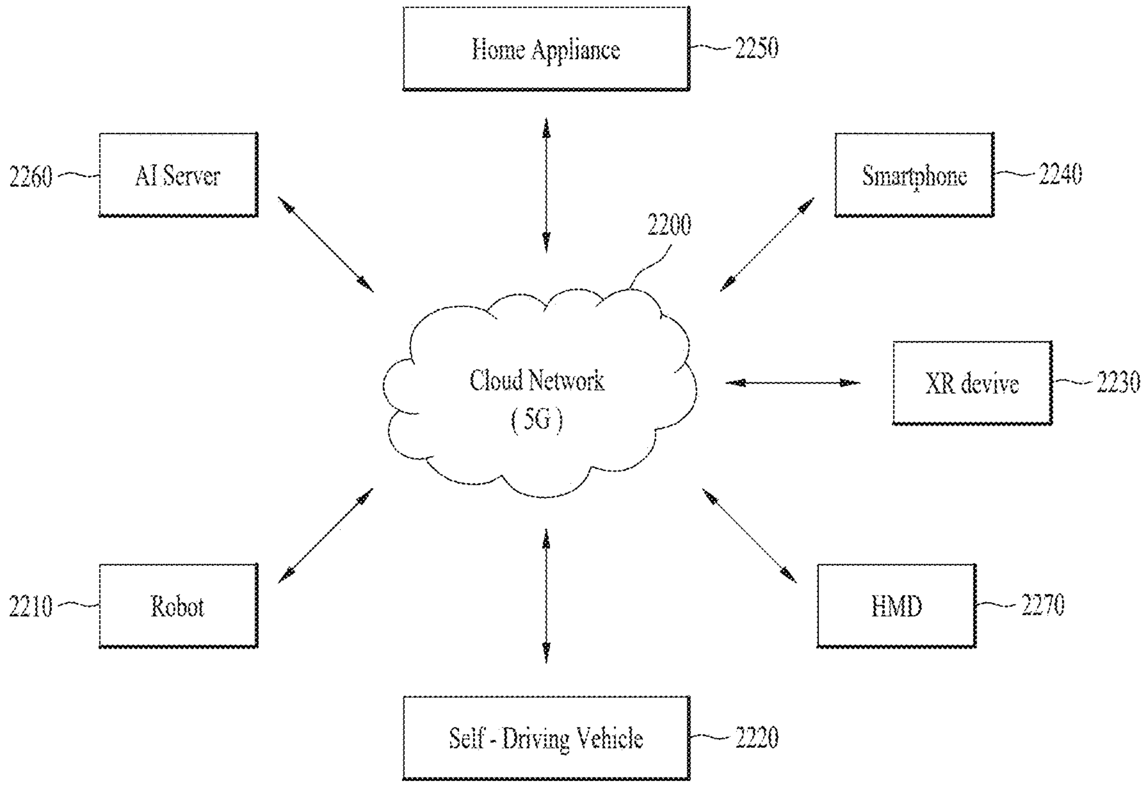
FIG. 17 illustrates an exemplary structure operatively connectable with a method/device for transmitting and receiving point cloud data according to embodiments.

FIG. 17 shows an exemplary structure operatively connectable with a method/device for transmitting and receiving point cloud data according to embodiments.

The structure of FIG. 17 represents a configuration in which at least one of a server 1760, a robot 1710, a self-driving vehicle 1720, an XR device 1730, a smartphone 1740, a home appliance 1750, and/or an HMD 1770 is connected to a cloud network 1700. The robot 1710, the self-driving vehicle 1720, the XR device 1730, the smartphone 1740, or the home appliance 1750 is referred to as a device. Further, the XR device 1730 may correspond to a point cloud data (PCC) device according to embodiments or may be operatively connected to the PCC device.

The cloud network 1700 may represent a network that constitutes part of the cloud computing infrastructure or is present in the cloud computing infrastructure. Here, the cloud network 1700 may be configured using a 3G network, 4G or Long Term Evolution (LTE) network, or a 5G network.

The server 1760 may be connected to at least one of the robot 1710, the self-driving vehicle 1720, the XR device 1730, the smartphone 1740, the home appliance 1750, and/or the HMD 1770 over the cloud network 1700 and may assist at least a part of the processing of the connected devices 1710 to 1770.

The HMD 1770 represents one of the implementation types of the XR device and/or the PCC device according to the embodiments. According to embodiments, an HMD type device includes a communication unit, a control unit, a memory, an I/O unit, a sensor unit, and a power supply unit.

Hereinafter, various embodiments of the devices 1710 to 1750 to which the above-described technology is applied will be described. The devices 1710 to 1750 illustrated in FIG. 17 may be operatively connected/coupled to a point cloud data transmission/reception device according to the above-described embodiments.

<PCC+XR>

The XR/PCC device 1730 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1730 may analyze 3D point cloud data or image data acquired through various sensors or from an external device and generate position data and attribute data about 3D points. Thereby, the XR/PCC device 1730 may acquire information about the surrounding space or a real object, and render and output an XR object. For example, the XR/PCC device 1730 may match an XR object including auxiliary information about a recognized object with the recognized object and output the matched XR object.

<PCC+Self-Driving+XR>

The self-driving vehicle 1720 may be implemented as a mobile robot, a vehicle, an unmanned aerial vehicle, or the like by applying the PCC technology and the XR technology.

The self-driving vehicle 1720 to which the XR/PCC technology is applied may represent an autonomous vehicle provided with means for providing an XR image, or an autonomous vehicle that is a target of control/interaction in the XR image. In particular, the self-driving vehicle 1720, which is a target of control/interaction in the XR image, may be distinguished from the XR device 1730 and may be operatively connected thereto.

The self-driving vehicle 1720 having means for providing an XR/PCC image may acquire sensor information from the sensors including a camera, and output the generated XR/PCC image based on the acquired sensor information. For example, the self-driving vehicle 1720 may have an HUD and output an XR/PCC image thereto to provide an occupant with an XR/PCC object corresponding to a real object or an object present on the screen.

In this case, when the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap the object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 18:
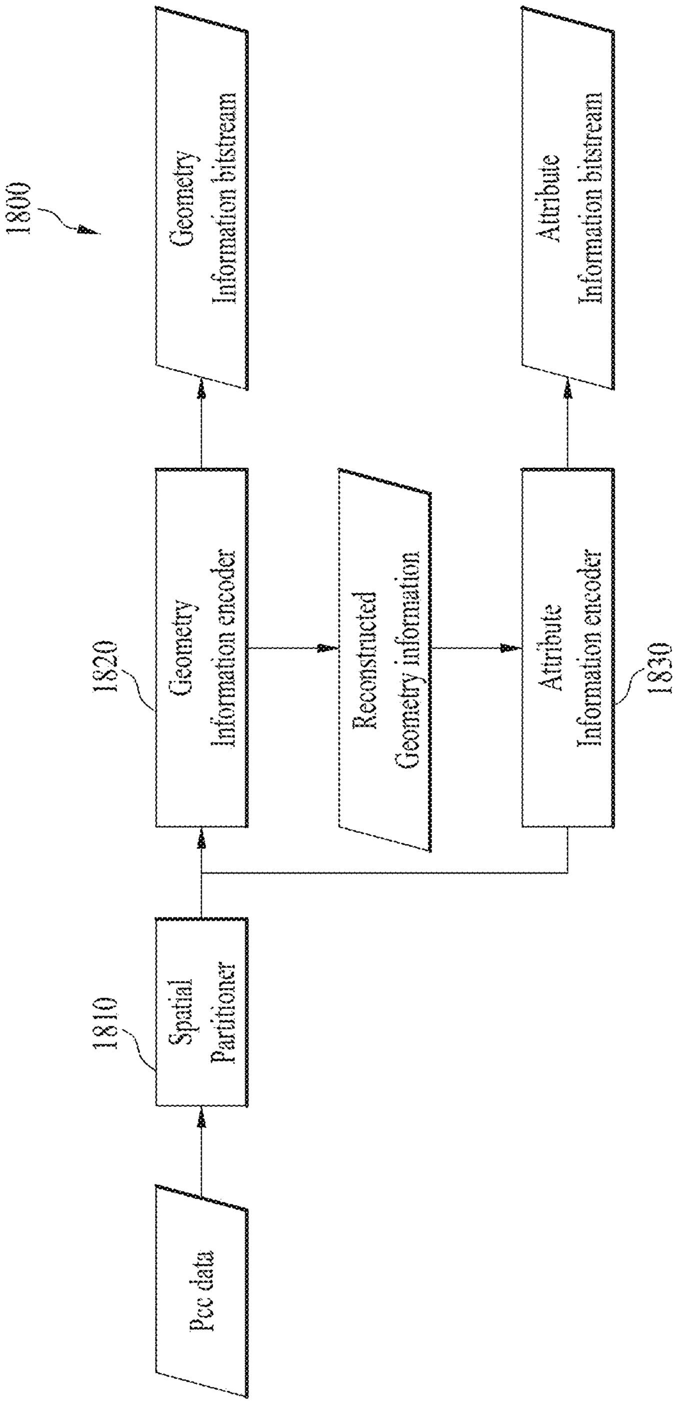
FIG. 18 is a block diagram illustrating an exemplary point cloud encoder.

FIG. 18 is a block diagram illustrating an exemplary point cloud encoder.

A point cloud encoder 1800 (e.g., the point cloud video encoder 10002 of FIG. 1, the point cloud encoder of FIG. 4, the point cloud encoder described with reference to FIGS. 12, 14 and 15) according to embodiments may be performed the encoding operation described with reference to FIGS. 1 to 17. The point cloud encoder 1800 according to the embodiments may include a spatial partitioner 1810, a geometry information encoder 1820, and an attribute information encoder 1830. Although not shown in FIG. 18, the point cloud encoder 1800 according to the embodiments may further include one or more elements to perform the encoding operation described with reference to FIGS. 1 to 17.

Point cloud compression (PCC) data (or PCC data or point cloud data) is input data to the point cloud encoder 1800 and may include geometry and/or attributes. The geometry according to the embodiments is information indicating a position (e.g., a location) of a point, and may be represented as parameters of a coordinate system such as a Cartesian coordinate system, a cylindrical coordinate system, or a spherical coordinate system. According to embodiments, the geometry may be referred to as geometry information, and the attribute may be referred to as attribute information.

The spatial partitioner 1810 according to the embodiments may generate geometry and attributes of point cloud data. The spatial partitioner 1810 according to the embodiments may partition the point cloud data into one or more 3D blocks in a 3D space in order to store point information of the point cloud data. A block according to the embodiments may represent at least one of a tile group, a tile, a slice, a coding unit (CU), a prediction unit (PU), or a transformation unit (TU). The spatial partitioner 1810 according to the embodiments may perform the partitioning operation based on at least one of an octree, a quadtree, a binary tree, a triple tree, or a k-d tree. A block may contain one or more points. A block according to the embodiments may be a block of a hexahedral shape having a preset width, depth, and height. The size of the block according to the embodiment is changeable and is not limited to the above-described example. The spatial partitioner 1810 according to the embodiments may generate geometry information about the one or more points contained in the block.

The geometry information encoder (or the geometry encoder) 1820 according to the embodiments may perform geometry encoding and generate a geometry bitstream and reconstructed geometry information. In the geometry encoding according to the embodiments, the reconstructed geometry information is input to the attribute information encoder (or attribute encoder) 1830. The geometry information encoder 1820 according to the embodiments may perform at least one of the operations of the coordinate transformer 40000, the quantizer 40001, the octree analyzer 40002, the surface approximation analyzer 40003, and the arithmetic encoder 40003, and the geometry reconstructor (Reconstruct geometry) 40005 described with reference to FIG. 4. In addition, the geometry information encoder 1820 according to the embodiments may perform at least one of the operations of the data input unit 12000, the quantization processor 12001, the voxelization processor 12002, the octree occupancy code generator 12003, the surface model processor 12004, the intra/inter-coding processor 12005, the arithmetic coder 12006, and the metadata processor 12007 described with reference to FIG. 12.

The attribute information encoder 1830 according to the embodiments may generate an attribute information bitstream (or an attribute bitstream) based on the reconstructed geometry information and attributes.

The point cloud encoder according to the embodiments may transmit a bitstream in which a geometry information bitstream and an attribute information bitstream or a geometry information bitstream and an attribute information bitstream are multiplexed. As described above, the bitstream may further include signaling information related to geometry information and attribute information, and signaling information related to coordinate transformation. Also, the point cloud encoder according to the embodiments may encapsulate the bitstream and transmit the same in the form of a segment and/or file.

Figure 19:
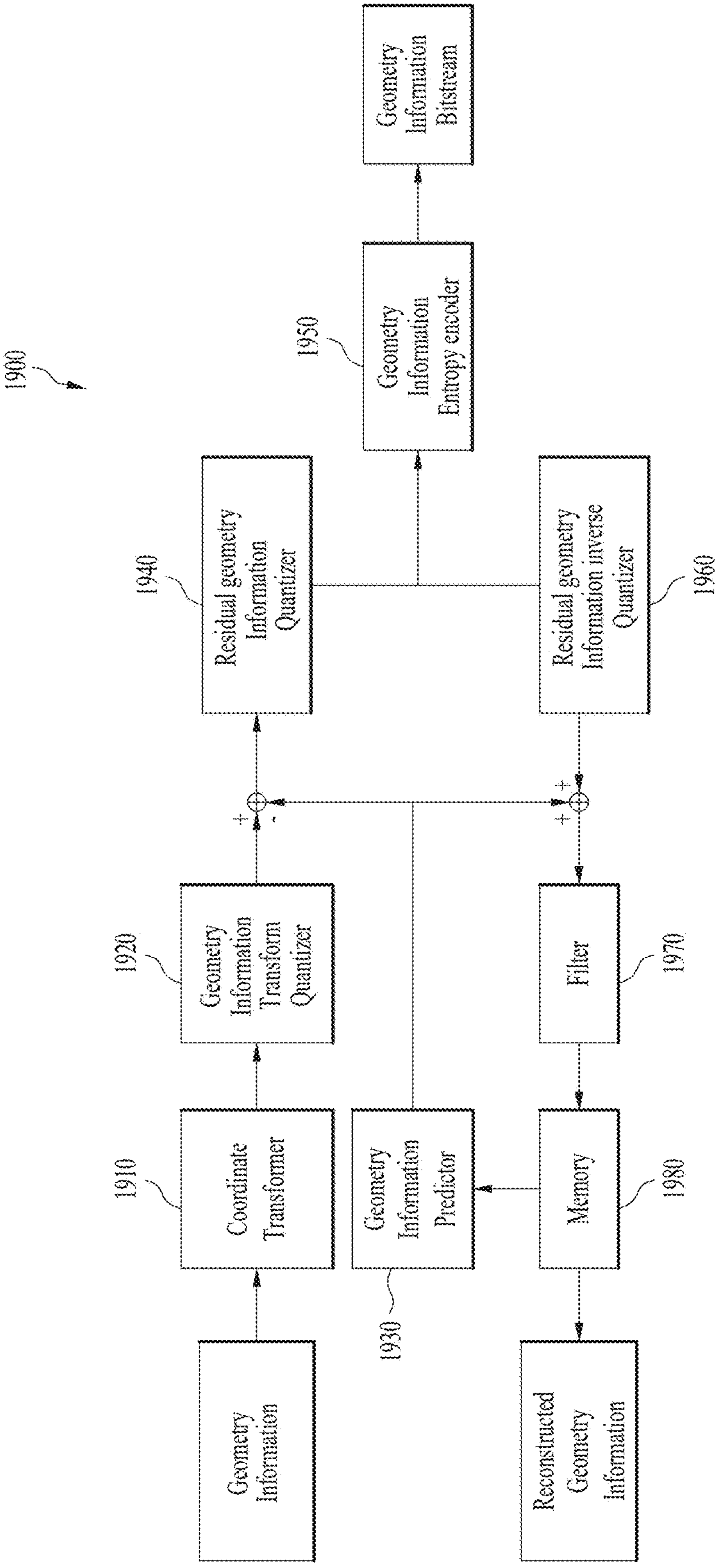
FIG. 19 is a block diagram illustrating an exemplary geometry information encoder.

FIG. 19 is a block diagram illustrating an exemplary geometry information encoder.

The geometry information encoder 1900 (or geometry encoder) according to the embodiments is an example of the geometry information encoder 1820 of FIG. 18, and may perform geometry encoding. Since the geometry encoding according to the embodiments is the same or similar to the geometry encoding described with reference to FIGS. 1 to 18, a detailed description thereof will be omitted. As shown in the figure, the geometry information encoder 1900 may include a coordinate transformer 1910, a geometry information transform quantizer 1920, a geometry information predictor 1930, a residual geometry information quantizer 1940, a geometry information entropy encoder 1950, a residual geometry information inverse quantizer 1960, a filter 1970, and a memory 1980. Although not shown in FIG. 19, the geometry information encoder 1900 according to the embodiments may further include one or more elements perform the geometry encoding described with reference to FIGS. 1 to 18.

The coordinate transformer 1910 according to the embodiments may transform the received geometry information into information in a coordinate system in order to represent the position of each point indicated by the input geometry information as a position in a 3D space. The coordinate transformer 1910 performs an operation which is the same or similar to the operation of the coordinate transformer 40000 described with reference to FIG. 4. The coordinate system according to the embodiments may include, but is not limited thereto, a three-dimensional Cartesian coordinate system, a cylindrical coordinate system, and a spherical coordinate system as described above. The coordinate transformer 1910 according to the embodiments may transform a set coordinate system into another coordinate system.

The coordinate transformer 1910 according to the embodiments may perform coordinate transformation on a unit such as a sequence, a frame, a tile, a slice, or a block. According to embodiments, whether to transform the coordinates and information related to the coordinate system and/or transformation may be signaled on a per sequence, frame, tile, slice, or block basis. Accordingly, the point cloud data reception device according to the embodiments may obtain information related to a coordinate system and/or transformation based on the coordinate transformation status of a neighbor block, the size of a block, the number of points, the quantization value, the block partition depth, the position of a unit, the distance between the unit and the origin, and the like.

The geometry information transform quantizer 1920 according to the embodiments may quantize geometry information presented in a coordinate system and generate transform-quantized geometry information. The geometry information transform quantizer 1920 according to the embodiments may apply one or more transformations such as position transformation and/or rotation transformation to the positions of points indicated by the geometry information output from the coordinate transformer 1910, and perform quantization by dividing the transformed geometry information by a quantization value. The geometry information transform quantizer 1920 may perform operations which are the same or similar to those of the quantizer 40001 of FIG. 4 and/or the quantization processor 12001 of FIG. 12. The quantization value according to the embodiments may vary based on a distance between a coding unit (e.g., a tile, a slice, etc.) and an origin of the coordinate system or an angle from a reference direction. According to embodiments, the quantization value may be a preset value.

The geometry information predictor 1930 according to the embodiments may calculate a predicted value (or predicted geometry information) based on the quantization value of a neighboring coding unit.

The residual geometry information quantizer 1940 may receive the transform-quantized geometry information and residual geometry information obtained by subtracting the predicted value, and quantize the residual geometry information with the quantization value to generate quantized residual geometry information.

The geometry information entropy encoder 1950 may entropy-encode the quantized residual geometry information. The entropy encoding according to the embodiments may include exponential Golomb, context-adaptive variable length coding (CAVLC), and context-adaptive binary arithmetic coding (CABAC).

The residual geometry information inverse quantizer 1960 may reconstruct the residual geometry information by scaling the quantized geometry information with the quantization value. The reconstructed residual geometry information and the predicted geometry information may be summed to generate reconstructed geometry information.

The filter 1970 may filter the reconstructed geometry information. According to embodiments, the filter 1970 may include a deblocking filter and an offset corrector. The filter 1970 according to the embodiments may perform additional filtering on the boundary between two different coding units for the geometry information obtained by coordinate-transforming the two coding units differently.

The memory 1980 may store reconstructed geometry information (or restored geometry information). The stored geometry information may be provided to the geometry information predictor 1930. Also, the reconstructed geometry information stored in the memory may be provided to the attribute information encoder 1830 described with reference to FIG. 18.

Figure 20:
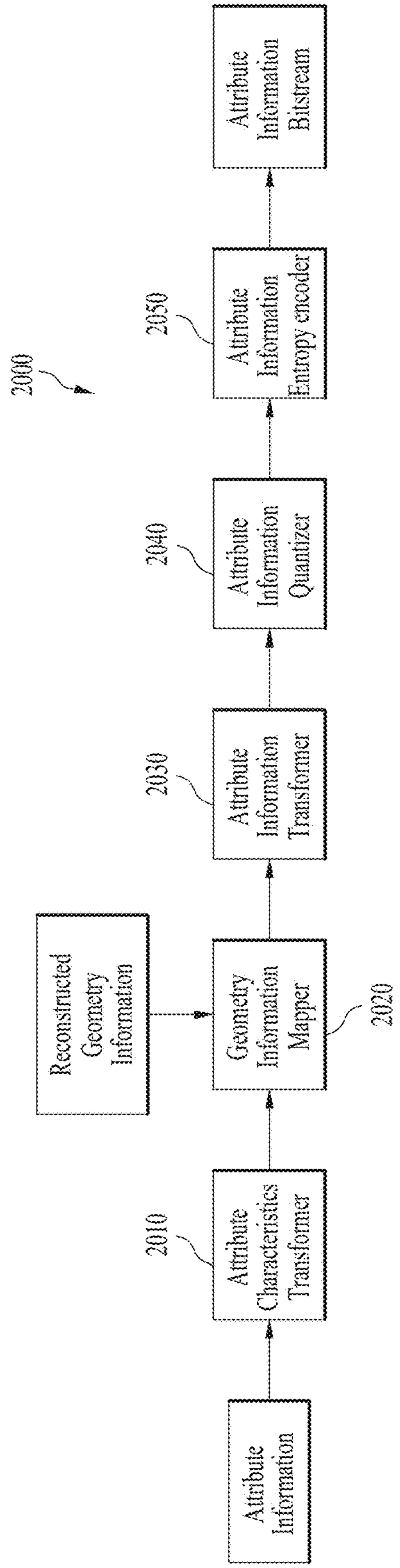
FIG. 20 shows an exemplary attribute information encoder according to embodiments.

FIG. 20 shows an exemplary attribute information encoder according to embodiments.

The attribute information encoder 2000 shown in FIG. 20 may perform attribute encoding as an example of the attribute information encoder 1830 described with reference to FIG. 18. Since the attribute encoding according to the embodiments is the same or similar to the attribute encoding described with reference to FIGS. 1 to 17, a detailed description thereof will be omitted. As shown in the figure, the attribute information encoder 2000 according to the embodiments may include an attribute characteristics transformer 2010, a geometry information mapper 2020, an attribute information transformer 2030, an attribute information quantizer 2040, and an attribute information entropy encoder 2050.

The attribute characteristics transformer 2010 according to the embodiments may receive attribute information and transform the characteristics (e.g., color, etc.) of the received attribute information. For example, when the attribute information includes color information, the attribute characteristics transformer 2010 may transform the color space of the attribute information (e.g., from RGB to YCbCr). Also, the attribute characteristics transformer 2010 may selectively skip transformation of the characteristics of the attribute information. The attribute characteristics transformer 2010 may perform operations which are the same or similar to the operations of the attribute transformer 40007 and/or the color transform processor 12008.

The geometry information mapper 2020 according to the embodiments may generate reconstructed attribute information by mapping the attribute information output from the attribute characteristics transformer 2010 and the received reconstructed geometry information. The geometry information mapper 2020 may generate attribute information by reconstructing attribute information about one or more points based on the reconstructed geometry information. As described above, the geometry information about the one or more points included in one voxel may be reconstructed based on a median value of the voxel. Since the attribute information is dependent on the geometry information, the geometry information mapper 2020 reconstructs the attribute information based on the reconstructed geometry information. The geometry information mapper 2020 may perform an operation that is the same as to or similar to that of the attribute transform processor 12009.

The attribute information transformer 2030 according to the embodiments may receive and transform the reconstructed attribute information. The attribute information transformer 2030 according to the embodiments may predict the attribute information and transform residual attribute information corresponding to the residual between the received reconstructed attribute information and the predicted attribute information, using one or more transform types (e.g., DCT, DST, SADCT, RAHT).

The attribute information quantizer 2040 according to the embodiments may receive the transformed residual attribute information and generate transform-quantized residual attribute information based on a quantization value.

The attribute information entropy encoder 2050 according to the embodiments may receive the transform-quantized residual attribute information, perform entropy encoding thereon, and output an attribute information bitstream. The entropy encoding according to embodiments may include, but is not limited to, one or more of exponential Golomb, CAVLC, and CABAC. The attribute information entropy encoder 2050 may perform an operation which is the same or similar to that of the arithmetic coder 12011.

Figure 21:
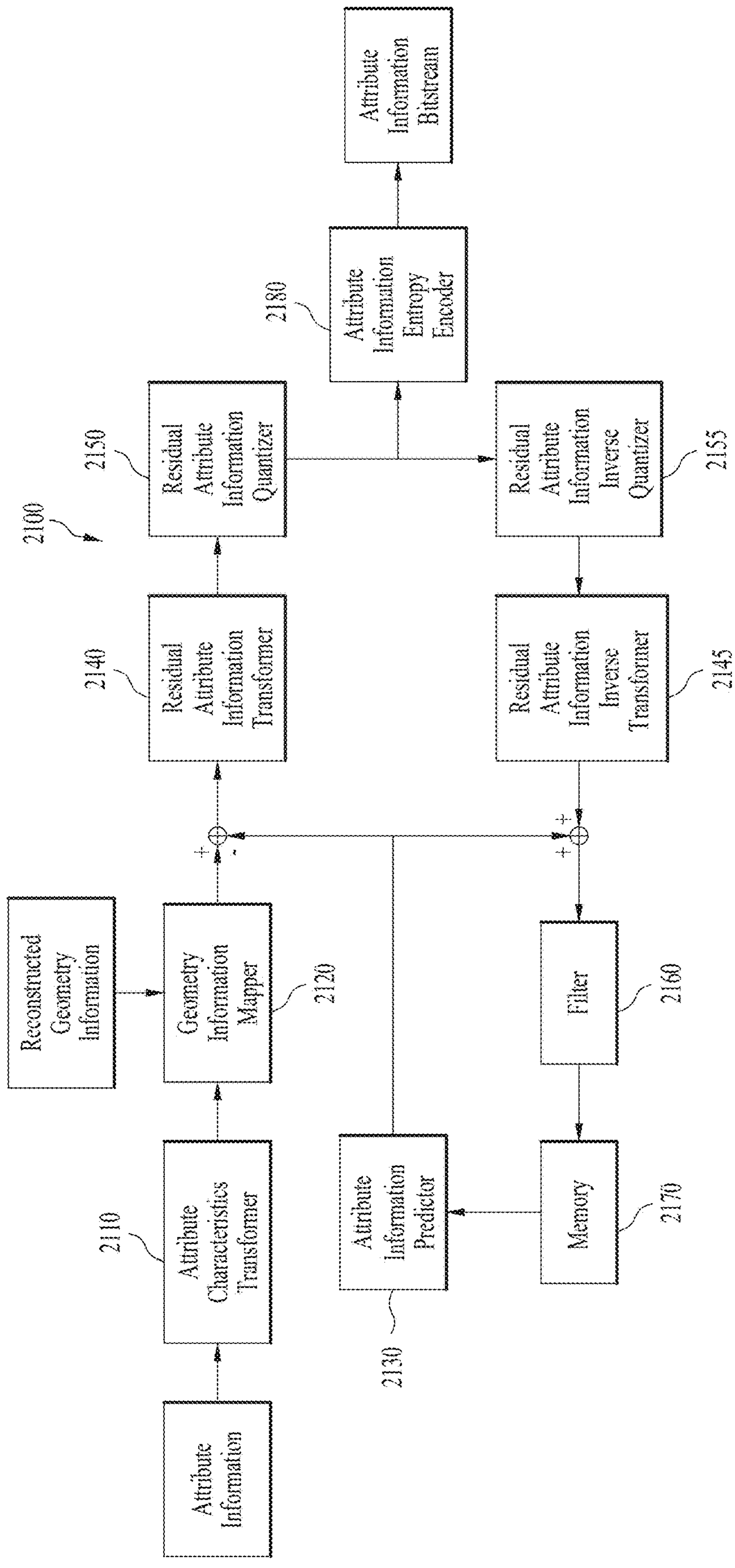
FIG. 21 shows an exemplary attribute information encoder according to embodiments.

FIG. 21 shows an exemplary attribute information encoder according to embodiments.

The attribute information encoder 2100 illustrated in FIG. 21 corresponds to an example of the attribute information encoder 1830 described with reference to FIG. 18 and the attribute information encoder 2000 described with reference to FIG. 20. The attribute information encoder 2100 according to the embodiments may include an attribute characteristics transformer 2110, a geometry information mapper 2120, an attribute information predictor 2130, a residual attribute information transformer 2140, and a residual attribute information inverse transformer 2145, a residual attribute information quantizer 2150, a residual attribute information inverse quantizer 2155, a filter 2160, a memory 2170, and an attribute information entropy encoder 2180. The attribute information encoder 2100 shown in FIG. 21 is difference from the attribute information encoder 2000 shown in FIG. 20 in that the residual attribute information transformer 2140, the residual attribute information inverse transformer 2145, the residual attribute information quantizer 2150, the residual attribute information inverse quantizer 2155, the filter 2160, and the memory 2170 are further included in the encoder.

The attribute characteristics transformer 2110 and the geometry information mapper 2120 according to the embodiments may perform operations which are the same or similar to the operations of the attribute characteristics transformer 2010 and the geometry information mapper 2020 described with reference to FIG. 20. The attribute information predictor 2130 according to the embodiments may generate predicted attribute information. The residual attribute information transformer 2140 may receive residual attribute information generated by obtaining a difference between the reconstruction attribute information output from the geometry information mapper 2120 and the predicted attribute information. The residual attribute information transformer 2140 may transform a residual 3D block including the received residual attribute information using one or more transform types (e.g., DCT, DST, SADCT, RAHT, etc.).

The residual attribute information quantizer 2150 according to the embodiments may transform the input transform residual attribute information based on a quantization value. The transformed residual attribute information may be input to the residual attribute information inverse quantizer 2155. The residual attribute information inverse quantizer 2155 according to the embodiments may transform the transform-quantized residual attribute information based on a quantization value and generate transformed residual attribute information. The transformed residual attribute information generated by the residual attribute information inverse quantizer 2155 is input to the residual attribute inverse transformer 2145. The residual attribute inverse transformer 2145 according the to embodiments may inversely transform the residual 3D block including the transformed residual attribute information using one or more transform types (e.g., DCT, DST, SADCT, RAHT, etc.). According to embodiments, reconstructed attribute information may be generated by combining the inversely transformed residual attribute information and the predicted attribute information output from the attribute information predictor 2130. According to embodiments, reconstructed attribute information may be generated by combining the non-inverse-transformed residual attribute information and the predicted attribute information. The reconstructed attribute information may be input to the filter 2160. The attribute information predictor 2130, the residual attribute information transformer 2140, and/or the residual attribute information quantizer 2150 according to the embodiments may perform operations which are the same or similar to the operations of the prediction/lifting/RAHT transform processor 12010.

The filter 2160 according to the embodiments may filter the reconstructed attribute information. The filter 2160 according to the embodiments may include a deblocking filter, an offset corrector, and an adaptive loop filter (ALF). The filter 2160 may perform an operation which is the same or similar to that of the filter 1970 of FIG. 19.

The memory 2170 according to the embodiments may store the reconstructed attribute information output from the filter 2160. The stored reconstructed attribute information may be provided as input data for the prediction operation of the attribute information predictor 2130. The attribute information predictor 2130 may generate predicted attribute information based on the reconstructed attribute information about the points. Although the memory 2170 is shown as one block in the figure, it may include one or more physical memories. The attribute information entropy encoder 2180 according to the embodiments may perform an operation which is the same or similar to the operation of the attribute information entropy encoder 2050 described with reference to FIG. 20.

Figure 22:
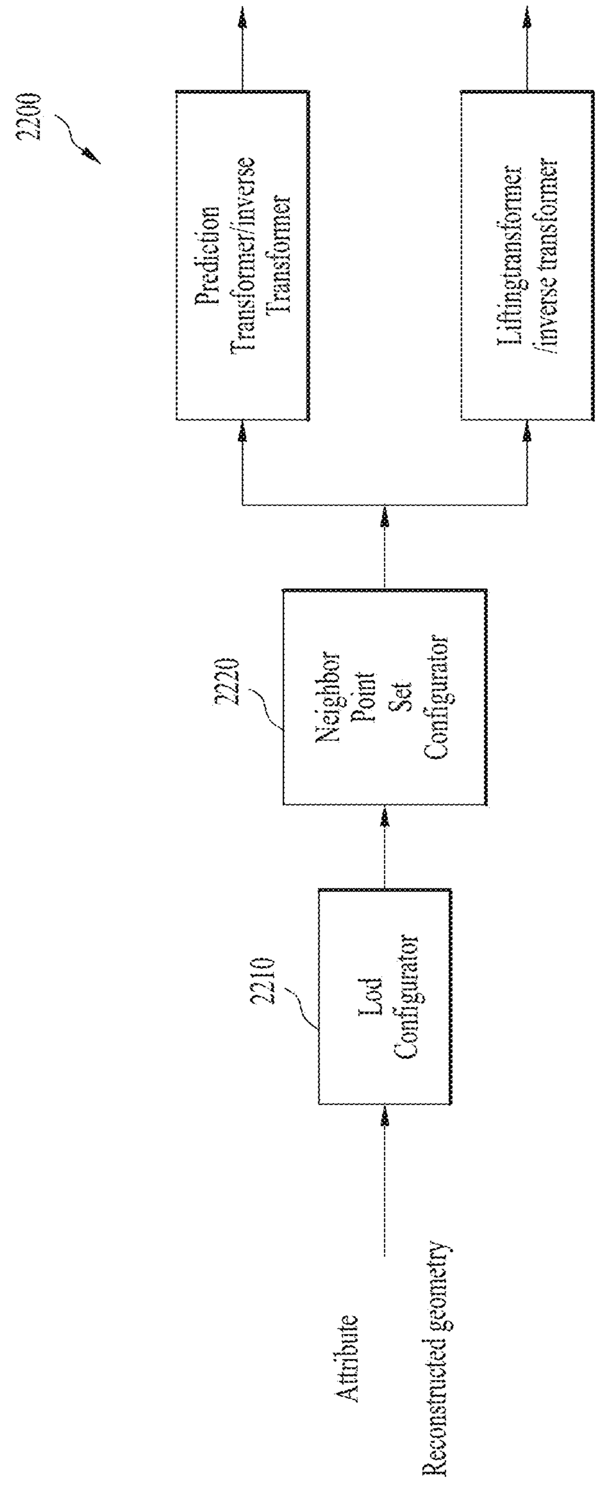
FIG. 22 illustrates an exemplary attribute information predictor according to embodiments.

FIG. 22 illustrates an exemplary attribute information predictor according to embodiments.

The attribute information predictor 2200 illustrated in FIG. 22 corresponds to an example of the attribute information predictor 2130 described with reference to FIG. 21. The attribute information predictor 2200 may perform an operation which is the same or similar to the operation of the attribute information predictor 2130. The attribute information predictor 2200 according to the embodiments may include an LOD configurator 2210 and a neighbor point set configurator 2220. The LOD configurator 2210 may perform an operation which is the same as or similar as that of the LOD generator 40009. That is, as shown in the figure, the LOD configurator 2210 may receive an attribute and a reconstructed geometry, and configure one or more LODs based on the received attribute and the reconstructed geometry. As described above with reference to FIGS. 4 and 8, the LODs may be generated by reorganizing points distributed in a 3D space into a set of refinement levels. According to embodiments, an LOD may include one or more points distributed at regular intervals. As described above, the LOD according to the embodiments indicates a level of details of point cloud content. Therefore, the level indicated by the LOD (or LOD value) is lowered, the details of the point cloud content may be deteriorated. As the level indicated by the LOD is raised, the details of the point cloud content are enhanced. That is, an LOD indicating a higher level may include points distributed at shorter intervals. A point cloud encoder (e.g., the point cloud encoder of FIG. 4) and a point cloud decoder (e.g., the point cloud decoder of FIG. 11) according to embodiments may generate an LOD to increase the attribute compression rate. Since points with similar attributes are highly probable to be in the neighborhood of a target point, the residual value between a predicted attribute obtained based on neighbor points having similar attributes and the attribute of the target point is highly likely to be close to 0. Accordingly, the point cloud encoder and the point cloud decoder according to the embodiments may generate an LOD in order to select appropriate neighbor points that may be used for attribute prediction.

The LOD configurator 2210 according to the embodiments may configure an LOD using one or more methods. As described above, the point cloud decoder (e.g., the point cloud decoder described with reference to FIGS. 10 to 11) may also generate an LOD. Accordingly, the information related to the LOD configuration method (or the LOD generation method) or the LOD configuration method information according to the embodiments is transmitted to the reception device (e.g., the reception device 10004 of FIG. 1 or the point cloud decoder of FIGS. 10 and 11) through a bitstream containing the encoded point cloud video data. Accordingly, the reception device may generate the LOD based on the LOD configuration method information.

When each LOD (or LOD set) is generated, the neighbor point set configurator 2220 according to the embodiments may search for or retrieve one or more neighbor points of a point of the $LOD_1$ set. The number of the one or more neighbor points may be X, where X is an integer greater than zero. A neighbor point according to embodiments is a nearest neighbor (NN) point positioned closest to the point of the $LOD_1$ set in 3D space, and is included in the same LOD as the target LOD (e.g., $LOD_1$) or in an LOD set (e.g., $LOD_{1-1}$, $LOD_{1-2}$, . . . , $LOD_0$) at a low level than the target LOD. The neighbor point set configurator 2220 according to the embodiments may register the one or more searched neighbor points as a neighbor point set in the predictor. The number of the neighbor points according to the embodiments may be set as the maximum number of neighbor points according to a user input signal, or may be preset to a specific value according to a neighbor point search method.

The neighbor point set configurator 2220 according to the embodiments may search $LOD_0$ and $LOD_1$ for neighbor points of a point P3 belonging to $LOD_1$ shown in FIG. 9. As shown in FIG. 9, $LOD_0$ includes P0, P5, P4 and P2. LOD2 includes the points of $LOD_0$, the points of $LOD_1$, P9, P8 and P7. When X, the number of the neighbor points, is 3, the neighbor point set configurator 2220 searches for three neighbor point closest to P3 from among the points belonging to $LOD_0$ or $LOD_1$ in the 3D space shown at the top of FIG. 9. That is, the neighbor point set configurator 2220 may search for P6 belonging to $LOD_1$, which is at the same LOD level, and P2 and P4 belonging to $LOD_0$, which is at a lower LOD level, as neighbor points of P3. In the 3D space, P7 is a point close to P3, but is not searched for as a neighbor point because it is at a higher LOD level. The neighbor point set configurator 2220 may register the searched neighbor points P2, P4, and P6 as a neighbor point set in the predictor of P3. The method of generating a set of neighbor points according to the embodiments is not limited to this example. Information on the method of generating a set of neighbor points according to the embodiments (hereinafter referred to as a neighbor point set generation information) is transmitted to the reception device (e.g., the reception device 10004 of FIG. 1, the point cloud decoder of FIGS. 10 and 11, or the like) through a bitstream including the above-described encoded point cloud video data.

As described above, every point may have one predictor. The point cloud encoder according to the embodiments may encode an attribute value of a corresponding point by applying the predictor, and may generate a predicted attribute (or a predicted attribute value). According to embodiments, a predictor is generated based on searched neighbor points after LOD generation. The predictor is used to predict the attribute of the target point. Accordingly, the predictor may generate a predicted attribute by applying weights to the attributes of the neighbor points.

For example, the predictor may calculate and register a weight based on a distance value (e.g., 12 distance) between a target point (e.g., P3) and each neighbor point in a set of neighbor points. As described above, since the neighbor point set of P3 includes P2, P4, and P6, the point cloud encoder (or predictor) according to the embodiments calculates weights based on the distance value between P3 and each neighbor point. Therefore, the weights for the respective neighbor points are represented as $(1/\sqrt{(P2-P3)^2}, 1/\sqrt{(P4-P3)^2}, 1/\sqrt{(P6-P3)^2})$. When a set of neighbor points for the predictor is configured, the point cloud encoder according to the embodiments may normalize the weights of the neighbor points with the total sum of the weights of the neighbor points. For example, the sum of the weights of all neighbor points in the neighbor point set of the node P3 is represented as follows. The normalized weight generated by dividing the sum of weights (total_weight), $total\_weight=1/\sqrt{(P2-P3)^2}+1/\sqrt{(P4-P3)^2}+1/\sqrt{(P6-P3)^2}$, by the weight of each neighbor point is represented as $1/\sqrt{(P2-P3)^2}$/total_weight, $1/\sqrt{(P4-P3)^2}$/total_weight, 1 $\sqrt{(P6-P3)^2}$/total_weight.

The point cloud encoder (or the attribute information predictor) according to the embodiments may predict the attribute through the predictor. The predicted attribute (or predicted attribute information) according to the embodiments may be an average of values obtained by multiplying attributes of registered neighbor points by calculated weights, as described with reference to FIG. 9, or may be a value obtained by multiplying an attribute of a specific point by a weight. According to embodiments, after pre-calculating a compressed result value, the point cloud encoder may selectively use a predicted attribute value for generation of the smallest stream (a predicted attribute value with the highest compression efficiency) among the above-described attribute values. The method of predicting an attribute is not limited to the above example.

The point cloud encoder (e.g., the coefficient quantizer 40011, etc.) according to the embodiments may encode information on the attribute value of the point, the residual of the predicted attribute value, and the selected predicted attribute (or information on the method of selecting the predicted attribute) and transmit the same to the reception device (e.g., the reception device 10004 of FIG. 1 or the point cloud decoder of FIGS. 10 and 11). The reception device according to the embodiments performs the same processes as the LOD generation, neighbor point set generation, weighted normalization of neighbor points, and attribute prediction performed by the transmission device. The reception device may predict the attribute using the same method as carried out by the transmission device based on the information on the selected predicted attribute. The reception device may decode the received residual value and reconstruct the attribute value by adding the decoded residual value to the predicted attribute value.

As described above, the LOD configurator 2210 according to the embodiments may generate an LOD based on one or more LOD generation methods.

The LOD configurator 2210 according to the embodiments may generate an LOD based on a distance (a distance-based LOD generation method). The LOD configurator 2210 according to the embodiments may set a distance (e.g., Euclidean distance) between at least two points for each LOD, and calculate distances between all points distributed in a 3D space to generate an LOD based on the calculation result (an LOD generation method based on calculation of the distance between neighbor points). As described above, each LOD may include points distributed at regular intervals according to the level indicated by the LOD. Accordingly, the LOD configurator 2210 should calculate the distances between all points. That is, since the point cloud encoder and the point cloud decoder need to calculate the distances between all points every time they generate an LOD, an unnecessary burden may be caused in the process of processing the point cloud data. However, when the density of the point cloud content is high, the dense points have a high geometry-based nearby relationship, and are thus highly likely to have similar attributes. Accordingly, the LOD configurator 2210 according to the embodiments may generate an LOD for the point cloud content having a high density by calculating a distance between points.

According to embodiments, the LOD configurator 2210 may configure the LOD based on the Morton codes of points. As described above, the Morton code is generated by presenting the coordinate values (e.g. (x, y, z)) representing the 3D positions of all points as bit values and mixing the bits.

The LOD configurator 2210 according to the embodiments may generate a Morton code of each point based on the reconstructed geometry and sort the points in an ascending order based on the Morton codes. The order of the points sorted in ascending order of the Morton codes may be referred to as a Morton order. The LOD configurator 2210 may configure the LOD by performing sampling on the points sorted in the Morton order. For example, the LOD configurator 2210 according to the embodiments may sequentially select points based on a sampling rate gap according to a Morton order of the points included in each region corresponding to a node. A sampling rate (which may be expressed as, for example, $k_1$) according to embodiments may be automatically changed according to a distribution of the point cloud and point cloud content, or may be changed according to a user input. Also, the sampling rate according to the embodiments may have a fixed value. The LOD configurator 2210 may select a point sorted at a position separated, by a sampling rate (e.g., 5), from a point (0-th point) sorted first according to the Morton order (for example, when the sampling rate is 5, the configurator may select the fifth point after the first point). For the remaining points, it may select one from among of every 5 points (for example, a point placed in the fifth position after the fifth point), and may classify the selected points into a lower level ($LOD_{1-1}$) than the current LOD (e.g., $LOD_1$). Accordingly, the LOD configurator 2210 may configure the LOD without calculating the distances between all points. That is, the point cloud encoder and the point cloud decoder do not need to calculate the distances between all points every time they generate an LOD, and accordingly they may process point cloud data more quickly. Further, the LOD configurator 2210 according to the embodiments may perform sampling differently for each LOD.

However, when the density of the point cloud content is low, the geometry-based nearby relationship between the points is low, and accordingly it is less likely that the distributed points have similar attributes. Therefore, in order to increase the accuracy of encoding and decoding of attribute information, the LOD configurator 2210 according to the embodiments may generate LODs by performing sampling based on any one of a fixed sampling range, an octree-based fixed sampling range, and an octree-based dynamic sampling range. The information on the sampling range and sampling according to the embodiments is included in the above-described LOD configuration method (or LOD generation method) information and is transmitted to the reception device (e.g., the reception device 10004 of FIG. 1 or the point cloud decoder of FIGS. 10 and 11) through a bitstream containing the encoded point cloud video data. Accordingly, the reception device may generate an LOD based on the LOD configuration method information.

The LOD configurator 2210 according to the embodiments may perform sampling based on a fixed sampling range. The sampling rate according to the embodiments may be set differently for each region of the 3D space according to the density of the point cloud. Also, the sampling rate according to the embodiments may be set differently for each LOD. The sampling range according to the embodiments is fixed.

Figure 23:
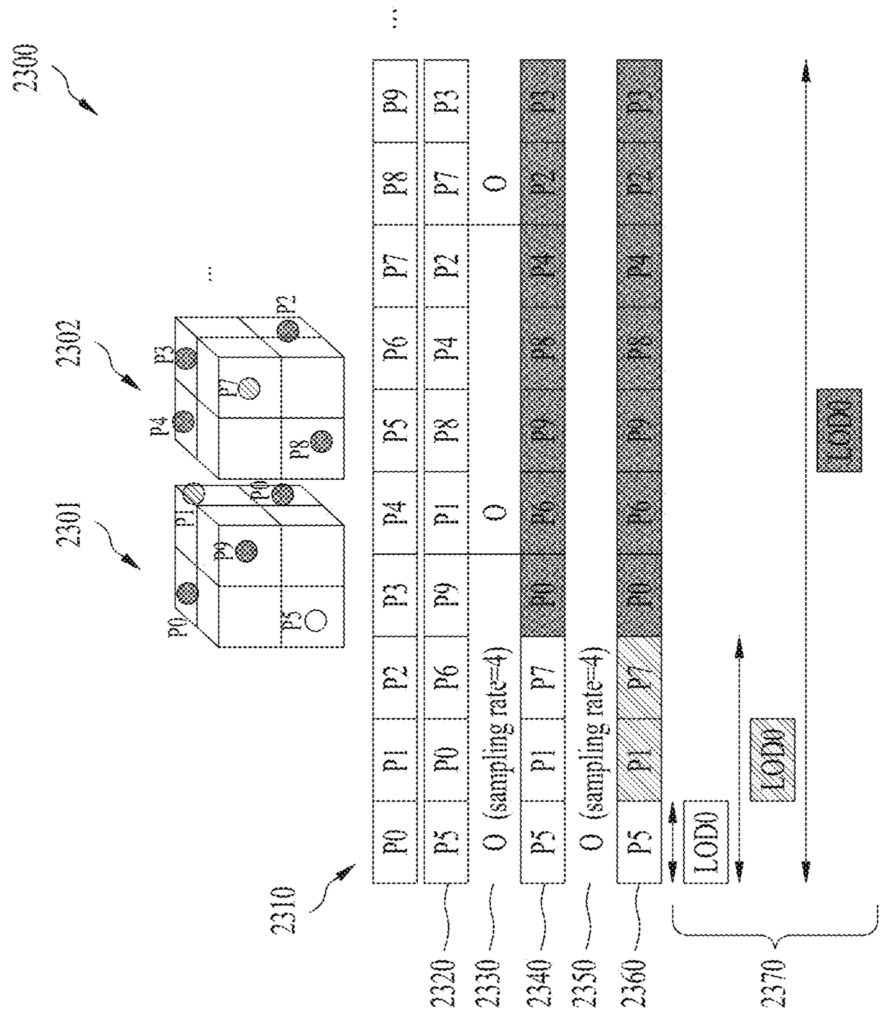
FIG. 23 shows an exemplary LOD generation process.

FIG. 23 shows an exemplary LOD generation process.

FIG. 23 shows an example 2300 of the LOD generation process. FIG. 23 illustrates a process of generating an LOD based on a fixed sampling range when a sampling rate (which may be expressed as, for example, $k_1$) is 4 according to embodiments. The fixed sampling range according to the embodiments is the same as that described with reference to FIG. 22 and thus a description thereof will be omitted. According to embodiments, the sampling rate may be changed according to a distribution of the point cloud, a user input, and the like. Also, the sampling rate according to the embodiments may have a fixed value.

The upper part of FIG. 23 shows points included in each of two spaces created by dividing a 3D space. As shown in the figure, a first space 2301 may contain five points, P0, P1, P5, P6 and P9, and a second space 2302 may contain five points, P2, P3, P4, P7 and P8.

In FIG. 23, a first index 2310 indicates an original order of 10 points distributed in a 3D space. As described above, the LOD configurator (e.g., the LOD configurator 2210 of FIG. 22) may calculate a Morton code of each point and sort the points in ascending order Ii based on the calculated Morton codes. In FIG. 23, a second index 2320 indicates the Morton order of the 10 points. Since the sampling rate according to the embodiments is 4, an example 2330 of points selected for each of every four points by sampling indicates points P5, P1, and P7. Unselected points are included only in $LOD_1$. In FIG. 23, a third index 2340 indicates indexes of points in $LOD_1$. The LOD configurator according to embodiments may perform re perform sampling (or sub-sampling) on the selected points P5, P1, and P7 to generate $LOD_{1-1}$. FIG. 23 shows an example 2350 of points selected according to sampling, namely P5. The unselected points (e.g., P1, P7) are included only in $LOD_{1-1}$. A fourth index 2350 shown in the figure indicates AN LOD order to which the points belong. As a result of the sampling, $LOD_0$ may have P5, $LOD_1$ may have points P5, P1, and P7, and LOD2 may have all points 2360.

Figure 24:
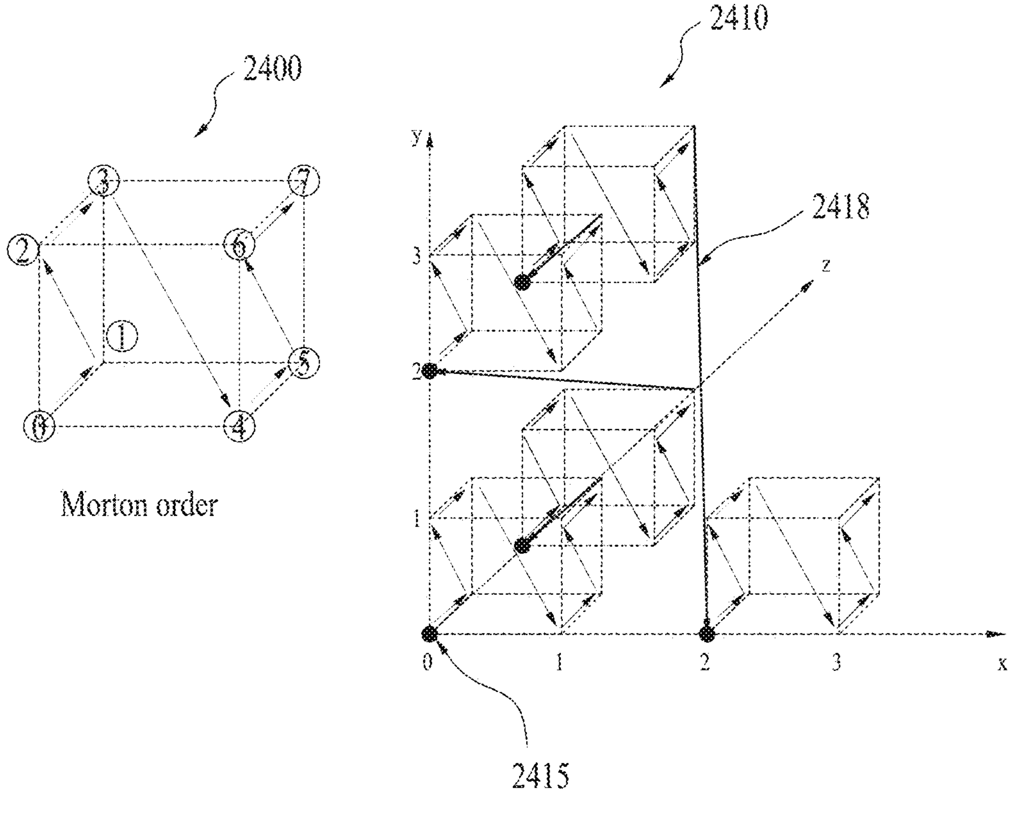
FIG. 24 illustrates an exemplary Morton order-based sampling process.

FIG. 24 illustrates an exemplary Morton order-based sampling process.

The left part of FIG. 24 shows a Morton order 2400 of points in one space formed by partitioning a three-dimensional space. As described above, an LOD configurator (e.g., the LOD configurator 2210) according to the embodiments may calculate a Morton code of each point and sort the points in ascending order based on the calculated Morton codes. The numbers shown in the figure indicate the order of the points sorted in ascending order based on the Morton codes. The right part of FIG. 24 shows an example 2410 of an LOD generated by performing sampling with respect to Morton orders of points in a plurality of spaces into which a three-dimensional space is partitioned. The example 2410 of FIG. 24 represents an example in which the sampling rate is 4. Circles 2415 presented in the coordinate system represent a point selected in the sampling process. A line 2418 indicated in the coordinate system represents the process of selecting a point. As described above, the LOD configurator (e.g., the LOD configurator 2210) may configure the LOD by performing sampling on points sorted in Morton order. However, as shown in the example of FIG. 24, the Morton order may be represented by a zigzag line. Accordingly, the distances between the points sorted according to the Morton order may not be constant. Also, the points are not evenly distributed in a 3D region (e.g., a 3D region represented by the X-axis, the Y-axis and the Z-axis). Therefore, even if sampling is performed at a constant sampling rate on points sorted in Morton order, the sampling result may not ensure the minimum and maximum values of the distances between points.

The LOD configurator according to the embodiments may perform sampling based on an octree-based fixed sampling range. A sampling rate according to embodiments may be set differently for each depth of the octree. The sampling range according to the embodiments is fixed. As described with reference to FIGS. 5 and 6, the octree according to the embodiments may be generated by recursively partitioning the 3D space of the point cloud content into eight equal parts. The recursively partitioned regions according to the embodiments be cubes or cuboids having the same volume. The octree according to the embodiments has an occupancy code indicating whether each of the eight partitioned spaces generated by partitioning one space includes at least one point. The occupancy code may include a plurality of nodes, and each of the nodes may indicate whether there is any point present in each partitioned space. For example, when at least one point is included in a partitioned space, the node corresponding to the space indicates that the point is present (e.g., a '1' is assigned). The depth of each node corresponds to a level indicated by at least one LOD.

A node region corresponding to each level may guarantee the maximum distance between points in the LOD. The maximum distance between selected points among the points within a node according to embodiments is a node size, and a maximum distance between nodes selected between nodes is limited by the node size. Accordingly, sampling according to the embodiments may maintain a constant maximum distance between points, and therefore the LOD configurator may reduce the complexity of LOD generation and generate an LOD with high compression efficiency.

In addition, the LOD configurator according to the embodiments may perform sampling based on an octree-based dynamic sampling range. A sampling rate according to embodiments may be set based on a level of an LOD and a depth of the octree. In addition, the sampling range according to the embodiments is not fixed and may be calculated based on the LOD level and the Morton code value. The LOD configurator according to the embodiments may group points for sampling based on the octree, rather than grouping (selecting) points the number of which corresponds to each sampling rate for sampling. In the octree structure, it is clear that points belonging to the same parent node neighbor each other. Accordingly, the LOD configurator according to the embodiments does not need to additionally calculate the distance between the selected points in order to check whether the selected points are actually neighbors. In addition, the LOD configurator according to embodiments may check the density of the point cloud content based on whether or not the nodes of the occupancy code of the octree are allocated (occupied), and select points for sampling based on the density. For example, if all the nodes are allocated, this indicates that the density of points in the region represented by each node is high. If nodes are not used, this indicates that the density of points is low. Since high-density points have high similarity in terms of attributes, the LOD configurator may select points fewer than the low-density points for sampling.

The sampling based on a fixed sampling range according to the embodiments includes an operation of repeatedly selecting the same number of points according to a sampling rate regardless of the density of points. The repetitive point selection process may cause unnecessary burden in the LOD generation operation.

Figure 25:
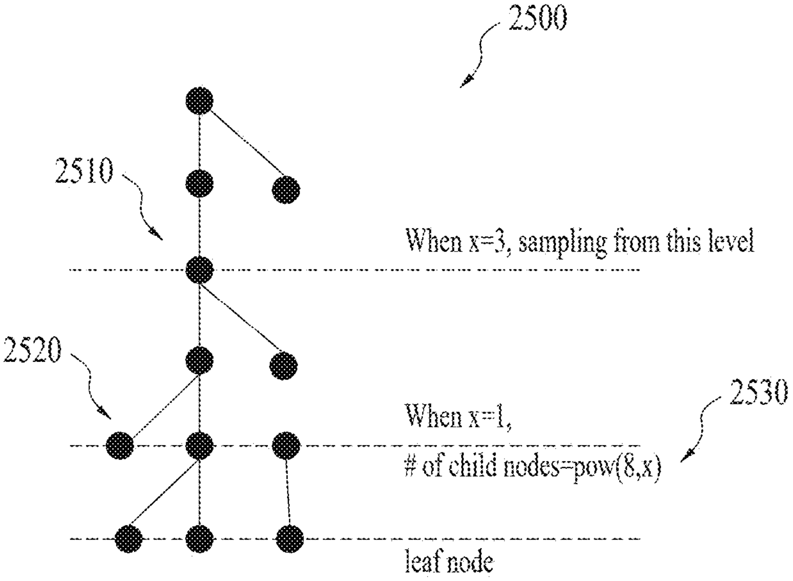
FIG. 25 illustrates an LOD generation process according to embodiments.

FIG. 25 illustrates an LOD generation process according to embodiments.

FIG. 25 illustrates an example 2500 of the LOD generation process based on an octree-based dynamic sampling range. Since the octree-based dynamic sampling range according to the embodiments is the same as that described with reference to FIG. 24, a detailed description thereof will be omitted. The octree-based dynamic sampling range according to the embodiments may be set based on child points from the same parent node in the octree.

The maximum level of the LOD according to the embodiments is expressed as lmax. Since the density of the point cloud content is different as described above, the maximum level of the LOD may be set differently for each point cloud content. Accordingly, according to the embodiments, each point cloud content may have the same or different octree depth for the maximum level of LOD. The depth of the octree according to the embodiments may be expressed as d. The LOD maximum level according to the embodiments is lower than the depth of the octree ($I_{max}$<d).

The maximum sampling rate of an LOD (e.g., $LOD_1$) according to the embodiments may be expressed as follows.

$$k=8^{l\,max-l+1} \quad \text{[Equation 1]}$$

Here, k denotes the maximum sampling rate. The LOD configurator according to the embodiments may change the sampling rate according to the point density of the point cloud content. In the equation above, 1 denotes sampling performed at the depth level of the octree (e.g., level d−1). When the points are dense, it is highly likely that all nodes of level d−1 are allocated. However, since the density differs among the point cloud contents, the LOD configurator according to the embodiments may set a value for configuring the LOD at a specific depth of the occupancy code of the octree. The maximum sampling rate of an LOD (e.g., $LOD_1$) according to the embodiments may be represented as follows.

$$k=8^{l\,max-l+X} \quad \text{[Equation 2]}$$

Here, X has a value for configuring an LOD at a specific depth of the octree, and is greater than 0. According to embodiments, X may be set differently for each point cloud content.

An example 2500 shown in FIG. 25 shows nodes where sampling is performed in a case where X is 3 and a case where X is 1. When X is 3, the LOD configurator according to the embodiments may perform sampling from node 2510 corresponding to depth 3 (e.g., the LOD value is 0). When X is 1, the LOD configurator according to the embodiments may perform sampling from node 2520 corresponding to depth 1. According to embodiments, the number of child nodes is expressed as pow (8,x), indicated by 2530.

According to embodiments, a sampling range for each LOD may be expressed as follows.

$$P_i.mc\sim P_i.mc+(k-(P_i.mc\ \%\ k)) \quad \text{[Equation 3]}$$

Here, Pi.mc denotes the Morton code value of the i-th point. A sampling range according to embodiments may be limited to a Morton code range having the same upper parent node in the occupancy code of the octree. For example, the LOD level is the maximum level, and the sampling range for a point with a Morton code of 2 among the points sorted in Morton order is set as a range including points of Morton codes 0 to 7 (because the occupancy code has 8 nodes at each depth). When the Morton code value of the point is greater than the maximum value of the sampling range (e.g., $P_i$.me+(k−($P_i$.mc % k)), the LOD configurator according to the embodiments may recalculate the next sampling range.

Accordingly, when the points are configured in an octree structure, the maximum sampling rate of $LOD_0$ becomes 8 ($8^{0+1}$=8). The sampling range of $LOD_0$ may be Morton codes 0 to 7, 8 to 15, 16 to 23, . . . . The maximum sampling rate of $LOD_1$ according to the embodiments may be 64 ($8^{1+1}$=64), and the sampling range of $LOD_1$ may be 0 to 63, 64 to 127, 128 to 192, . . . .

The LOD configurator (e.g., the LOD configurator 2210 of FIG. 22) according to the embodiments may select one point from among the points within a sampling range, classify the selected point into LODs (e.g., $LOD_{(0\ to\ -1-1)}$) of levels lower than the level of the current LOD (e.g., $LOD_1$), and register the remaining unselected points in the current LOD.

The LOD constructor according to the embodiments may select a point based on one or more methods in order to generate a good set of neighbor nodes for prediction coding of attributes and to increase compression efficiency.

For example, the LOD configurator according to the embodiments may select the N-th point within the sampling range. According to embodiments, N may be set according to a user input signal. In addition, according to embodiments, N may be set based on rate distortion optimization (RDO).

The LOD configurator according to the embodiments may select a point having a Morton code most similar to a mean or a mean Morton code value of the points belonging to the sampling range. As the similarity of the Morton code value increases, the probability that the distance between the points is close increases. This is because a point having a Morton code most similar to the mean Morton code value of the points within the same sampling range is highly likely to have attributes (e.g., color, reflectance value, etc.) that may represent the points in the sampling range or attributes that may have a relatively greater influence on the points belonging to the sampling range. In particular, when a point that may represent neighboring values is selected as a neighbor node set, compression efficiency may be increased. In addition, the LOD configurator according to the embodiments may select the N-th point from among the points sorted based on the mean Morton code value. According to embodiments, N is a preset value. When there is no set value of N, the LOD configurator according to the embodiments may select the 0-th point from among the sorted points.

The LOD configurator according to embodiments may select a point corresponding to a mean index value from among the points belonging to a sampling range. The value index value is likely to be the mean value of the corresponding region. Therefore, the LOD configurator may perform fast data processing with high compression efficiency without performing an additional calculation process. According to embodiments, the mean index value and the mean value may be replaced with other terms having the same meaning. When the points in the sampling range are not evenly distributed (for example, they are maldistributed), the mean Morton code value of the points may not properly represent the sampling range. Accordingly, the LOD configurator according to the embodiments may select a point having a Morton code most similar to the ideal mean Morton code value of the sampling range. Assuming that all child nodes from a parent node are allocated in the octree structure, the LOD configurator according to the embodiments calculates an ideal mean Morton code value and selects a point having a Morton code most similar to the ideal mean Morton code value. The LOD configurator according to the embodiments may select the N-th point from among the points sorted based on the ideal mean Morton code value. According to embodiments, N is a preset value. When there is no set value of N, the LOD configurator according to the embodiments may select the 0-th point among the sorted points.

The LOD configurator according to the embodiments may select one or more points within a sampling range. The number of points to select may be preset. According to the method of selecting the N-th point within the sampling range, the LOD configurator may iteratively select the N-th point from among the points within the sampling range. For example, when N is 2, the LOD configurator repeatedly selects the second point, the fourth point, and the like within the sampling range as many as a preset number X. According to the method of selecting a point having a Morton code most similar to the mean Morton code value of the points belonging to the sampling range, the LOD configurator may repeatedly select as many points corresponding to the N-th position in order sorted by the mean Morton code value as the preset number X. According to the method of selecting a point having a Morton code most similar to an ideal mean Morton code value of the points belonging to the sampling range, the LOD configurator may iteratively select as many points corresponding to the N-th position in order sorted by the ideal mean Morton code value as a preset number X.

A sampling range according to the embodiments may contain only one point. The one point included in the sampling range may be referred to as an isolated point. To increase compression efficiency, the LOD configurator may process the isolated point using one or more methods.

For example, the LOD configurator may perform sampling on isolated points. The LOD configurator may select one point from among consecutive isolated points as many as the above-described fixed sampling rate k.

The LOD configurator may separate the isolated point into a candidate group of LODs of a lower level than the current LOD. The LOD configurator does not select an isolated point in a sampling range having the isolated point during $LOD_1$ generation, but separates the same into $LOD_{(0\ to\ -1-1)}$. The LOD configurator may select an isolation point by applying a wider sampling range and a higher sampling rate in generating the $LOD_{|-i\text{-}\alpha}$.

The LOD configurator according to the embodiments may register the isolated point in the current LOD. For example, when an isolated point is generated during $LOD_1$ generation, the LOD configurator registers the isolated point in $LOD_1$. This is because the isolated point is less likely to have attributes that may represent the neighbor points and thus does not need to be selected as a neighbor point set.

The LOD configurator may merge isolated points into neighbor points. Points according to the embodiments are sorted in ascending order based on Morton code values and divided into one or more sampling ranges according to a sampling rate. As described above, points corresponding to each sampling range belong to the same parent node in the occupancy code of the octree. Accordingly, the number of points included in a sampling range may vary. The LOD configurator may determine whether points are isolated points based on the sampling range, that is, the number of points included in the sampling range. For example, when the number of points included in the sampling range is less than or equal to a preset value, the LOD configurator sets the sampling range or the points included in the sampling range as isolated points. The LOD configurator integrate (or merges) the sampling range having isolated points with a next sampling range (e.g., a sampling range adjacent to the sampling range having the isolated points). When the number of points in the integrated sampling range is less than or equal to a preset value, the LOD configurator integrates the integrated sampling range with the next sampling range (e.g., a sampling range adjacent to the integrated sampling range). Alternatively, when the number of points in the integrated sampling range is greater than the preset value, the LOD configurator sets the integrated sampling range as one sampling range.

Information on the isolated point processing method is included in the above-described LOD configuration method (or LOD generation method) information and transmitted to the reception device (e.g., the reception device of FIG. 110004 or the point cloud decoder of FIGS. 10 and 11) through a bitstream containing the encoded point cloud video data. Accordingly, the reception device may generate an LOD based on the LOD configuration method information.

The point selection method according to the embodiments may also be applied when selecting the above-described isolated point. In addition, the information on the point selection method according to the embodiments is transmitted to the reception device (e.g., the reception device 10004 of FIG. 1 or the point cloud decoder of FIGS. 10 and 11) through a bitstream containing the encoded point cloud video data included in the above-described LOD configuration method (or LOD generation method) information. Accordingly, the reception device may generate an LOD based on the LOD configuration method information.

Figure 26:
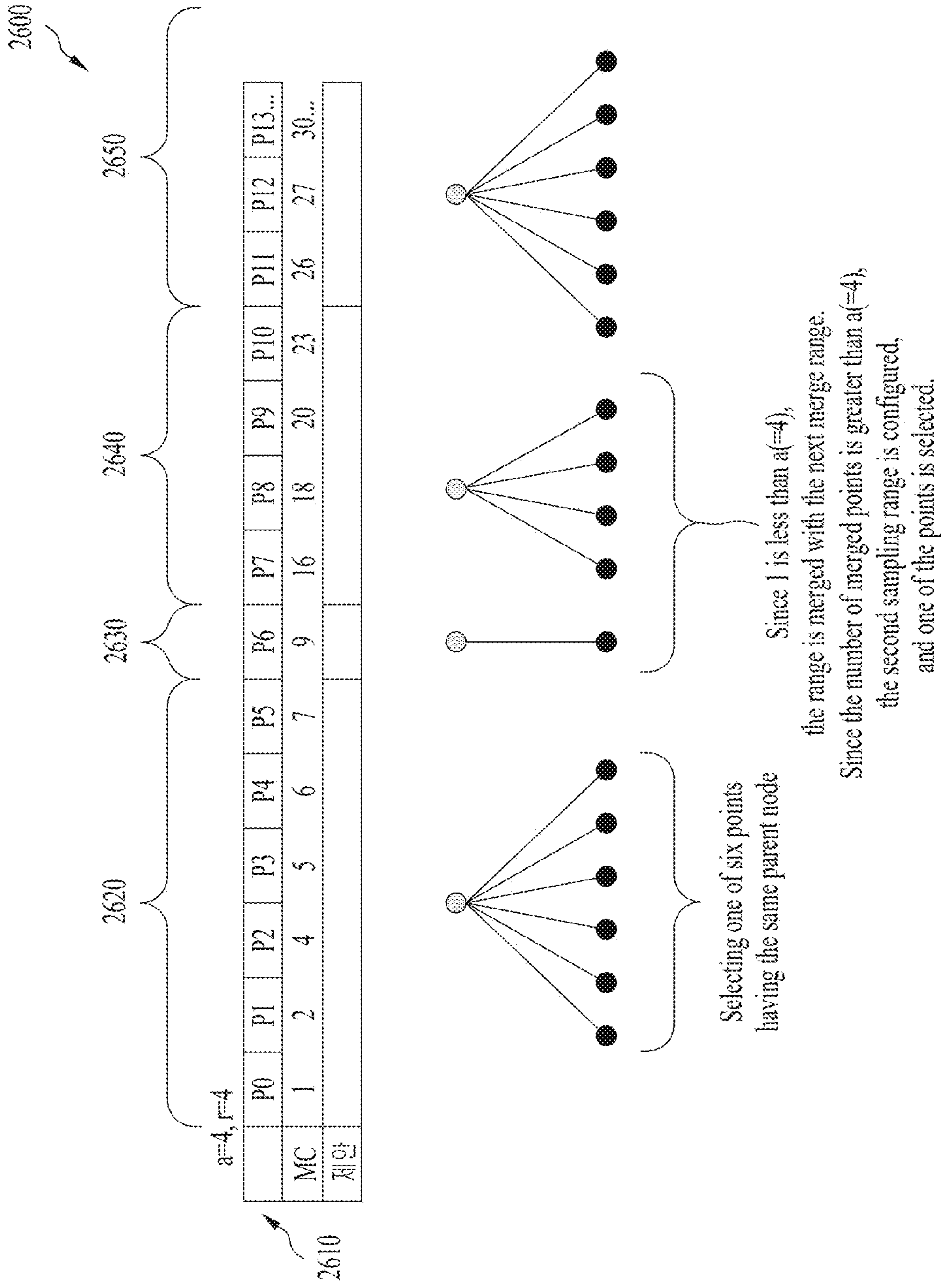
FIG. 26 illustrates an isolated point processing method according to embodiments.

FIG. 26 illustrates an isolated point processing method according to embodiments.

As described with reference to FIG. 25, the LOD configurator (e.g., the LOD configurator 2210) may merge a sampling range including an isolated point with the next sampling range. The LOD configurator according to the embodiments defines a preset value a to determine a sampling range including an isolated point. According to embodiments, a is an integer greater than 0. When the number of points included in the sampling range is less than or equal to a, the LOD configurator sets the sampling range or the points included in the sampling range as isolated points. The LOD configurator integrate (or merges) the sampling range having isolated points with a next sampling range (e.g., a sampling range adjacent to the sampling range having the isolated points). The LOD configurator sets a maximum value r of a sampling range for sampling integration. According to embodiments, r is an integer greater than 0 and less than or equal to a. When the number of points in the integrated sampling range is less than or equal to a, the LOD configurator integrates the integrated sampling range with the next sampling range (e.g., a sampling range adjacent to the integrated sampling range). When the integrated sampling range is less than a, the LOD configurator repeats the sampling range integration. When the number of points in the integrated sampling range is greater than a, the LOD configurator sets the integrated sampling range as one sampling range.

FIG. 26 illustrates an example 2600 of the isolated point processing method when a is 4 and r is 4. As described above, the points are sorted in ascending order based on the Morton code values thereof. The index 2610 shown in the figure indicates the Morton code values of the points. The LOD configurator divides multiple points into one or more sampling ranges. The one or more sampling ranges according to the embodiments include a first sampling range 2620, a second sampling range 2630, and a third sampling range 2640. As shown in the figure, the first sampling range 2620 includes six points P0, P1, P2, P3, P4, and P5 belonging to the same parent node. The number of the points included in the first sampling range 2620 is 6, and is thus greater than a, which is 4. Accordingly, the LOD configurator may not set the points included in the first sampling range 2620 as isolated points, but may select one of the points in the first sampling range 2620 according to the sampling rate. The points except for the selected point are registered in the current LOD, and the selected point is set as candidate points for LODs of a lower level than the current LOD. As shown in the figure, the second sampling range 2630 includes one point P6. The number of points included in the second sampling range 2630 is 1, and is thus less than a, which is 4. Accordingly, the LOD configurator sets the point included in the second sampling range 2630 as an isolated point. The LOD configurator integrates the second sampling range 2630 with the third sampling range 2640. As shown in the figure, the third sampling range 2640 includes four points P7, P8, P9, and P10 belonging to the same parent node. The number of points in the integrated sampling range in which the second sampling range 2630 and the third sampling range 2640 are integrated is five. That is, the number of points in the integrated sampling range, 5, is greater than 4, which is the maximum value r of the sampling range for merging. Accordingly, the LOD configurator may select one of the points in the integrated sampling range based on the sampling rate. The points except for the selected point are registered in the current LOD, and the selected point is set as candidate points for LODs of a lower level than the current LOD. Although not shown in the figure, the fourth sampling range 2650 includes six points P11, P12, P13, . . . . The number of the points included in the third fourth sampling range 2650 is 6, and is thus greater than a. Accordingly, the LOD constructor may not set the points included in the [third] fourth sampling range 2650 as isolated points, but select one of the points in the fourth sampling range 2650 according to the sampling rate.

Figure 27:
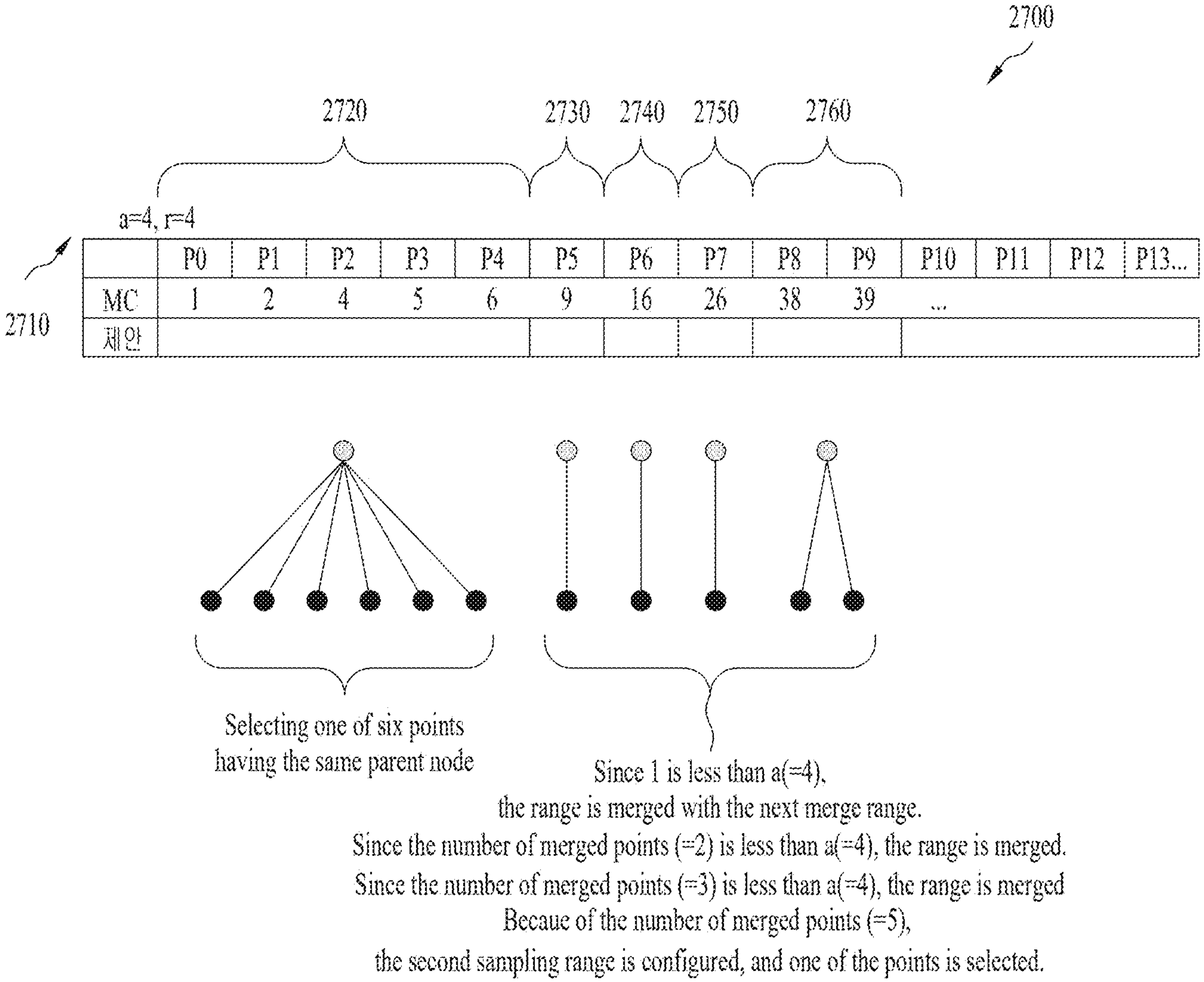
FIG. 27 illustrates an isolated point processing method according to embodiments.

FIG. 27 illustrates an isolated point processing method according to embodiments.

An example 2700 of the isolated point processing method illustrated in FIG. 27 is an embodiment of the example 2600 of the isolated point processing method illustrated in FIG. 26.

FIG. 27 illustrate an example 2700 of the isolated point processing method when a is 4 and r is 4 as in the example 2600 of FIG. 26. The index 2710 shown in the figure indicates the Morton code values of the points. The LOD configurator divides multiple points into one or more sampling ranges. The one or more sampling ranges according to the embodiments include a first sampling range 2720, a second sampling range 2730, a third sampling range 2740, a fourth sampling range 2750, and a fifth sampling range 2760. As shown in the figure, the first sampling range 2720 includes five points P0, P1, P2, P3, and P4. Since the number of points included in the first sampling range 2720 is 5, it is greater than a, which is 4. Accordingly, the LOD configurator may not set the points included in the first sampling range 2720 as isolated points, but select one of the points in the first sampling range 2720 according to the sampling rate. The points except for the selected point are registered in the current LOD, and the selected point is set as candidate points for LODs of a lower level than the current LOD. As shown in the figure, the second sampling range 2730 includes one point P5. Accordingly, the number of points included in the second sampling range 2730 is 1 and is less than a, which is 4, and thus the LOD configurator sets the point included in the second sampling range 2730 as an isolated point. The LOD configurator integrates the second sampling range 2730 with the third sampling range 2740. As shown in the figure, the third sampling range 2740 includes one point P6. Accordingly, the number of points of the integrated sampling range in which the second sampling range 2730 and the third sampling range 2740 are integrated is 2. That is, the number of points in the integrated sampling range, 2, is less than 4, which is the maximum value r of the sampling range for merging. Thus, the LOD configurator integrates the integrated sampling range with the fourth sampling range 2750, which is the next sampling range after the integrated sampling range. As shown in the figure, the fourth sampling range 2750 includes one point P7. That is, the number of points in the integrated sampling range is 3 and is less than 4, which is the maximum value r of the sampling range for integration. Accordingly, the LOD configurator integrates the integrated sampling range with the fifth sampling range 2760, which is the next sampling range after the merged sampling range. As shown in the figure, the fifth sampling range 2760 includes two points P8 and P9. That is, the number of points in the integrated sampling range is 5 and is thus greater than 4, which is the maximum value r of the sampling range for integration. Accordingly, the LOD configurator stops the integration operation without setting the points included in the integrated sampling range as isolated points. The LOD configurator may select one of the points in the integrated sampling range based on the sampling rate. The points except for the selected point are registered in the current LOD, and the selected point is set as candidate points for LODs of a lower level than the current LOD.

Figure 28:
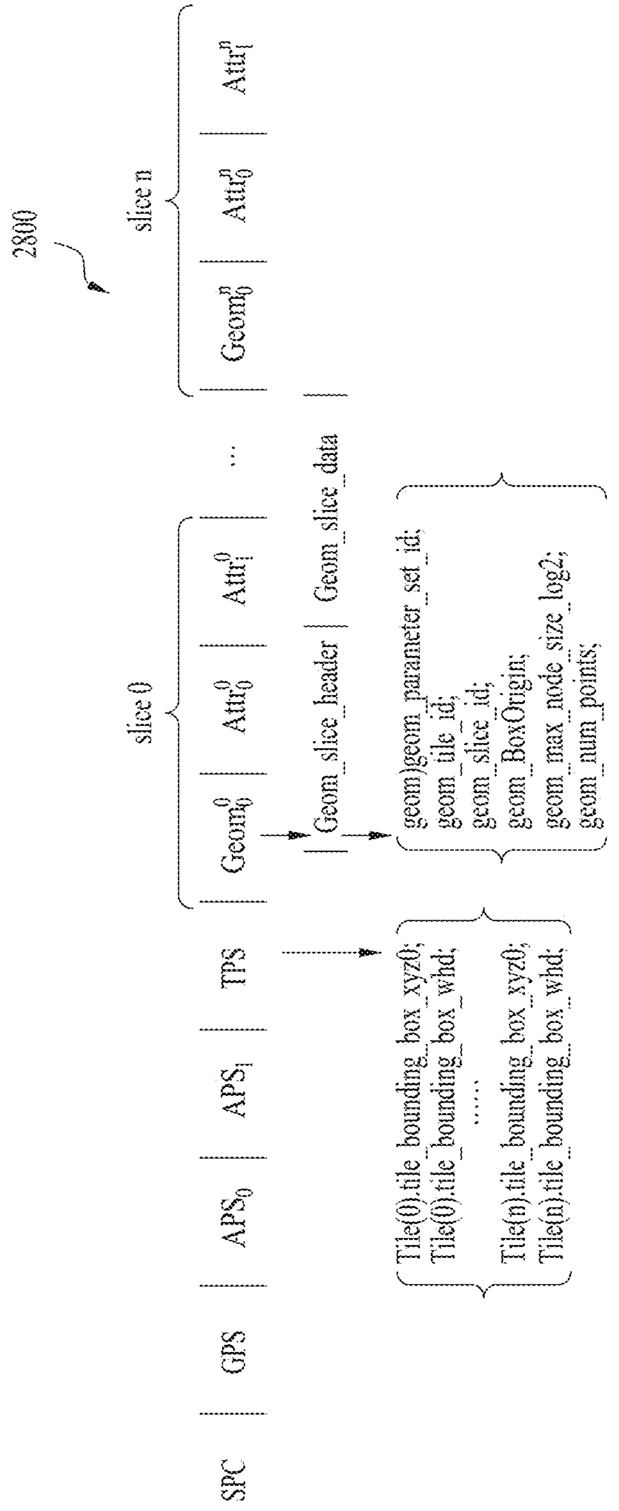
FIG. 28 shows an exemplary structural diagram of a point cloud compression (PCC) bitstream.

FIG. 28 shows an exemplary structural diagram of a point cloud compression (PCC) bitstream.

As described above, a point cloud data transmission device (e.g., the point cloud data transmission device described with reference to FIGS. 1, 12, 14 and 15) may transmit encoded point cloud data in the form of a bitstream 2800. The bitstream 2800 according to the embodiments may include one or more sub-bitstreams.

The point cloud data transmission device (e.g., the point cloud data transmission device described with reference to FIGS. 1, 12, 14 and 15) may divide an image of the point cloud data into one or more packets in consideration of the error of the transmission channel, and transmit the same over the network. According to embodiments, the bitstream 2800 may include one or more packets (e.g., network abstraction layer (NAL) units). Therefore, even when some packets are lost in a poor network environment, the point cloud data reception device may reconstruct the image using the remaining packets. The point cloud data may be partitioned into one or more slices or one or more tiles to be processed. The tiles and slices according to embodiments are regions for performing point cloud compression coding by partitioning a picture of the point cloud data. The point cloud data transmission device may provide high-quality point cloud content by processing data corresponding to each region according to the importance of each partitioned region of the point cloud data. That is, the point cloud data transmission device according to the embodiments may perform point cloud compression coding having better compression efficiency and appropriate latency on data corresponding to a region important to a user.

A tile according to embodiments, represents a cuboid in a three-dimensional space (e.g., a bounding box) in which point cloud data is distributed. A slice according to embodiments is a series of syntax elements representing some or all of encoded point cloud data, and represents a set of points that may be independently encoded or decoded. According to embodiments, a slice may include data transmitted through a packet, and may include one geometry data unit and zero or more attribute data units. According to embodiments, a tile may include one or more slices.

The bitstream 2800 according to the embodiments may include signaling information including a sequence parameter set (SPS) for sequence-level signaling, a geometry parameter set (GPS) for signaling of geometry information coding, an attribute parameter set (APS) for signaling of attribute information coding, and a tile parameter set (TPS) for tile-level signaling, and one or more slices.

The SPS according to the embodiments is encoding information about the entire sequence including a profile and a level, and may include comprehensive information about the entire file, such as a picture resolution and a video format.

According to embodiments, one slice (e.g., slice 0 of FIG. 28) includes a slice header and slice data. The slice data may include one geometry bitstream (Geom0$^0$) and one or more attribute bitstreams (Attr0$^0$, Attr1$^0$). The geometry bitstream may include a header (e.g., a geometry slice header) and a payload (e.g., a geometry slice data). The header of the geometry bitstream according to the embodiments may include identification information (geom_geom_parameter_set_id) for a parameter set included in the GPS, a tile identifier (geom_tile id), a slice identifier (geom_slice_id), and information related to the data included in the payload. The attribute bitstream may include a header (e.g., an attribute slice header or an attribute brick header) and a payload (e.g., attribute slice data or attribute brick data).

As described above with reference to FIGS. 22 to 27, the point cloud encoder and the point cloud decoder according to the embodiments may generate an LOD for attribute prediction. Accordingly, the bitstream shown in FIG. 28 may contain the LOD configuration method information described with reference to FIGS. 18 to 27. A point cloud decoder according to embodiments may generate an LOD based on the LOD configuration method information.

The signaling information included in a bitstream according to the embodiments may be generated by a metadata processor or a transmission processor (e.g., the transmission processor 12012 of FIG. 12) included in the point cloud encoder, or an element in the metadata processor or the transmission processor. According to embodiments, the signaling information may be generated based on results of geometry encoding and attribute encoding.

FIG. 29 shows an exemplary syntax for APS according to embodiments.

FIG. 29 shows an example 3100 of syntax for APS according to embodiments, and may include the following information (or fields, parameters, etc.).

aps_attr_parameter_set_id specifies an identifier for the APS for reference by other syntax elements. aps_attr_parameter_set_id has a value in the range of 0 to 15. As shown in FIG. 27, since one or more attribute bitstreams are included in the bitstream, a field (e.g., ash_attr_parameter_set_id) having the same value as aps_attr_parameter_set_id may be included in the header of each attribute bitstream.

The point cloud decoder according to embodiments may acquire an APS corresponding to each attribute bitstream based on aps_attr_parameter_set_id and process the attribute bitstreams.

aps_seq_parameter_set_id specifies the value of sps_seq_parameter_set_id for the active SPS. aps_seq_parameter_set_id has a value in the range of 0 to 15.

attr_coding_type indicates an attribute coding type for a given value of attr_coding_type. The value of attr_coding_type is equal to 0, 1, or 2 in the bitstreams according to the embodiments. Other values of attr_coding_type may be reserved for future use by ISO/IEC. Accordingly, decoders according to embodiments may ignore the reserved values of attr_coding_type described above. Among the values, 0 may indicate predicting weight lifting transform coding as the attribute coding type, 1 may indicate RAHT transform coding as the attribute coding type, and 2 may indicate fixed weight lifting transform coding as the attribute coding type.

When attr_coding_type is equal to 0 or 2, the following parameters are given.

num_pred_nearest neighbours indicates the maximum number of nearest neighbors to be used for prediction. The value of numberOfNearestNeighboursInPrediction may be included in the range of 1 to xx.

max_num_direct_predictors indicates the number of predictors to be used for direct prediction. max_num_direct_predictors has a value in the range of 0 to num_pred_nearest neighbours. The value of the variable MaxNumPredictors that is used in the decoding operation is as follows.

MaxNumPredictors=max_num_direct_predicots+1 lifting_search_range indicates a search range for the lifting.

lifting_quant_step_size indicates the quantization step size for the first component of the attribute. The value of lifting_quant_step_size may be in the range of 1 to xx.

lifting_quant_step_size_chroma may indicate the quantization step size for the chroma component of the attribute when the attribute is color. The value of lifting_quant_step_size_chroma may be in the range of 1 to xx.

lod binary_tree_enabled_flag indicates whether the binary tree is applied for the LOD generation.

num_detail_levels_minus1 indicates the number of LODs for attribute coding. num_detail_levels_minus1 may have a value in the range of 0 to xx. The following ‘for’ statement is information about each LOD.

sampling_distance_squared [idx] may indicate the square of the sampling distance for each LOD represented by idx. According to embodiments, idx has a value in the range of 0 to the number of LODs for attribute coding indicated by num_detail_levels_minus1. sampling_distance_squared has a value in the range of 0 to xx.

When the same sampling information is applied to point cloud data transmitted through one bitstream, the syntax for the APS according to embodiments includes LOD configuration information.

LOD configuration information 2900 according to embodiments includes the following information.

lod_generation_type is information indicating the type of a method of configuring (generating) an LOD set. lod_generation_type may be set to any one of 1 and 2, but the values of lod_generation_type are not limited to this example. When lod_generation_type is equal to 1, lod_generation_type indicates that the LOD set generation method is distance-based LOD generation (e.g., the distance-based LOD generation described with reference to FIG. 22). When lod_generation_type is equal to 2, lod_generation_type indicates that the LOD set generation method is Morton order-based sampling LOD generation (e.g., the Morton order-based sampling LOD generation method described with reference to FIG. 22). Since the LOD set generation method is the same as that described with reference to FIG. 22, a detailed description thereof will be omitted.

The following is information related to sampling when lod_generation_type is equal to 2.

sampling_range_type indicates a sampling range and a sampling rate, or a type of the sampling range. sampling_range_type may be sest to any one of 1, 2, and 3, but the values of sampling_range_type is not limited to this example. When sampling_range_type is equal to 1, sampling_range_type indicates that the sampling range is a fixed sampling range (e.g., the fixed sampling range described with reference to FIGS. 22 and 23). When sampling range-type is equal to 2, sampling_range_type indicates that the sampling range is an octree-based fixed sampling range (e.g., the octree-based fixed sampling range described with reference to FIGS. 22 and 24). When sampling_range_type is equal to 3, sampling_range_type indicates that the sampling range is an octree-based dynamic sampling range (e.g., the octree-based dynamic sampling range described with reference to FIGS. 22 and 25). Since the sampling range and the sampling rate according to the embodiments are the same as those described with reference to FIGS. 22 to 25, a detailed description thereof will be omitted.

sampling rate indicates a sampling rate. The value of sampling_rate is an integer greater than 0.

sampling_select_type indicates a point selection method for selecting a point within a sampling range. sampling_select_type may be set to any one of 1, 2, and 3, but the values of sampling_select_type are not limited to this example. When sampling_select_type is equal to 1, sampling_select_type indicates that the point selection method is the method of selecting the N-th point within the sampling range (e.g., the method of selecting the N-th point within the sampling range described with reference to FIG. 25). When sampling_select_type is equal to 2, sampling_select_type indicates that the point selection method is to select a point having a Morton code most similar to the mean Morton code value of the points belonging to the sampling range (e.g., the method of selecting a point having a Morton code most similar to the mean Morton code value of the points belonging to the sampling range described with reference to in FIG. 25). When sampling_select_type is equal to 3, sampling_select_type indicates that the point selection method is to select a point corresponding to a mean index value among the points belonging to the sampling range (e.g., the method of selecting a point corresponding to an mean index value among the points belonging to the sampling range as described with reference to FIG. 25). When sampling_select_type is equal to 4, sampling_select_type indicates that the point selection method is to select a point having a Morton code most similar to the ideal mean Morton code value of the sampling range (e.g., the method of selecting a point having a Morton code most similar to the ideal mean Morton code value of the sampling range described with reference to FIG. 25). Since the point selection method according to the embodiments is the same as the point selection method described with reference to FIG. 25, a detailed description thereof will be omitted.

sampling_select_idx indicates a fixed index of a point to be selected. For example, when sampling_select_type is equal to 1, sampling_select_idx indicates the index of the N-th point to be selected among the sorted points within the sampling range. In addition, when sampling_select_type is equal to 2 and 3, sampling_select_idx indicates the index of the N-th point to be selected among the points sorted based on the mean Morton code value or the ideal mean Morton code value.

sampling_select_max_num_of_points indicates the maximum number of points selectable within a sampling range.

The following represents sampling information when sampling_select_type is greater than or equal to 2. sampling_begin_depth indicates the depth of the octree at which the $LOD_0$ set starts to be generated. sampling_begin_depth has a positive integer value.

sampling_isolated_point_minimum_num_of elements indicates a limit of the number of points that may be defined as isolated points (e.g., the predetermined value of a that is to determine a sampling rage including the isolated point described in FIGS. 26 and 27). Thus, sampling_isolated_point_minimum_num_of elements indicates a minimum number of points that belong to the sampling range.

sampling_isolated_point_sampling_type indicates an isolated point processing method. sampling_isolated_point_sampling_type may indicate any one of sampling of isolated points, merging of isolated points with neighbor points, separation and processing of isolated points into a candidate group of LODs of a lower level than the current LOD, and registration of the isolated point in the current LOD. The method of performing sampling on the isolated points is to select a point from among k consecutive isolated points, where k is a fixed sampling rate. In the method of merging isolated points with neighbor points, the number of points included in the sampling range is compared with the number of points that may be defined as isolated points indicated by sampling_isolated_point_mininum_num_of_elements. When the points are isolated points, the sampling range including the isolated points is integrated with the next sampling range. In the method of separating and processing the isolated points into a candidate group of LODs of a lower level than the current LOD, an isolated point in the sampling range is separated into $LOD_{(0\ to\ -1-1)}$ rather than being selected, and is selected generating $LOD_{1-1-}{}^\alpha$. The method of registering the isolated point in the current LOD is to register an isolated point in $LOD_1$ when the isolated point is generated during generation of $LOD_{1-1-}{}^\alpha$. Since the isolated point processing method is the same as the isolated point processing method described with reference to FIG. 26-FIG. 27, a detailed description thereof will be omitted.

sampling_isolated_point_maximum_merge_range indicates the maximum sampling range of the sampling range for sampling integration (e.g., the maximum value r of the sampling range for sampling integration described with reference to FIGS. 26 and 27).

When attribute_coding_type is equal to 0, a related parameter is given as follows.

adaptive_prediction_threshold indicates the threshold of prediction.

When attribute_coding_type is equal to 1, related parameters are configured as follows.

raht_depth indicates the number of LODs for RAHT. The value of depthRAHT is in the range of 1 to xx (arbitrary value).

raht_quant_step_size indicates a quantization step size for the first component of the attribute. The value of rate_quant_step_size is in the range of 1 to xx (arbitrary value).

raht_quant_step_size_chroma may indicate the quantization step size for a chroma component of the attribute when RAHT is applied.

aps_extensionpresent_flag is a flag whose value is 0 or 1.

aps_extensionpresent_flag equal to 1 indicates that the aps_extension_data syntax structure is present in the APS RBSP syntax structure. aps_extension_present_flag equal to 0 indicates that this syntax structure is not present. When the syntax structure is not present, the value of aps_extension_present_flag is inferred to be equal to 0.

aps_extension_data_flag may have any value. The presence and value of this field may not affect decoder performance according to embodiments.

FIG. 30 shows an exemplary syntax for APS according to embodiments.

FIG. 30 shows an exemplary syntax for the APS described with reference to FIG. 29.

The exemplary syntax for the APS in FIG. 30 is configured when sampling information for each LOD is applied differently. For simplicity, descriptions of the same information and/or parameters as those described with reference to FIG. 29 will be omitted.

The LOD configurator (e.g., the LOD configurator 2210) according to the embodiments may perform sampling differently or the same for each LOD. In this case, when lod_generation_type is equal to 2, the syntax for the APS according to the embodiments may further include the following sampling related information 3000.

sampling_attrs_per_lod_flag is a flag indicating whether a sampling method differs among LODs. As described with reference to FIG. 22, the LOD configurator (e.g., the LOD configurator 2210) may perform sampling differently for each LOD. Accordingly, LOD generation information according to embodiments may include sampling information for each LOD. Therefore, when sampling_attrs_per_lod_flag is equal to 1, the illustrated 'for' statement is information 3010 related to sampling for each LOD. In the figure, idx denotes each LOD. Since the information 3010 related to sampling according to the embodiments is the same as the information described with reference to FIG. 29, a detailed description thereof will be omitted.

The LOD configurator (e.g., the LOD configurator 2210) according to the embodiments may apply a different LOD generation method for each tile or slice. As described above, the point cloud data reception device also needs to generate an LOD. Accordingly, the bitstream according to the embodiments may further contain signaling information related to the LOD generation method for each region.

FIG. 31 shows an exemplary syntax for TPS according to embodiments.

When the LOD configurator according to the embodiments applies a different LOD generation method for each tile, the TPS according to the embodiments may further include signaling information related to the LOD generation method (e.g., signaling information related to the LOD generation method (2900,3000,3010) described with reference to FIGS. 29-30). FIG. 31 shows an example of syntax for TPS according to embodiments, and may include the following information (or fields, parameters, etc.).

num_tiles indicates the number of tiles signaled for the bitstream. When there are no tiles signaled for the bitstream, the value of this information is inferred to be 0. The followings are signaling parameters for each tile.

tile_bounding_box_offset_x[i] indicates the x offset of the i-th tile in the Cartesian coordinate system. When this parameter is not present, the value of tile_bounding_box_offset_x[0] is inferred to be the value of sps_bounding_box_offset_x included in the SPS.

tile_bounding_box_offset_y[i] indicates the y offset of the i-th tile in the Cartesian coordinate system. When this parameter is not present, the value of tile_bounding_box_offset_y[0] is inferred to be the value of sps_bounding_box_offset_y included in the SPS.

tile_bounding_box_offset_z[i] indicates the z offset of the i-th tile in the Cartesian coordinate system. When this parameter is not present, the value of tile_bounding_box_offset_z[0] is inferred to be the value of sps_bounding_box_offset_z included in the SPS.

tile_bounding_box_scale_factor[i] indicates a scale factor related to the i-th tile in the Cartesian coordinate system. When this parameter is not present, the value of tile_bounding_box_scale_factor[0] is inferred to be the value of sps_bounding_box_scale_factor.

tile_bounding_box_size_width[i] indicates the width of the i-th tile in the Cartesian coordinate system. When this parameter is not present, the value of tile_bounding_box_size_width[0] is inferred to be the value of sps_bounding_box_size_width.

tile_bounding_box_size_height[i] indicates the height of the i-th tile in the Cartesian coordinate system. When this parameter is not present, the value of tile_bounding_box_size_height[0] is inferred to be the value of sps_bounding_box_size_height.

tile_bounding_box_size_depth[i] indicates the depth of the i-th tile in the Cartesian coordinate system. When this parameter is not present, the value of tile_bounding_box_size_depth[0] is inferred to be the value of sps_bounding_box_size_depth.

As shown in the figure, the TPS according to the embodiments may include LOD configuration information 3100. The LOD configuration information 3100 according to the embodiments is applied to each tile. Since the LOD configuration information 3100 is the same as the LOD configuration information 2900 described with reference to FIG. 29, a detailed description thereof will be omitted.

FIG. 32 shows an exemplary syntax for TPS according to embodiments.

FIG. 32 shows an exemplary syntax for the TPS described with reference to FIG. 30. The exemplary syntax for the TPS in FIG. 32 is configured when sampling information is applied differently for each LOD. For simplicity, descriptions of the same information and/or parameters as those described with reference to FIG. 30 will be omitted.

The LOD configurator (e.g., the LOD configurator 2210) according to the embodiments may perform sampling differently or the same for each LOD. In this case, when lod_generation_type is equal to 2, the syntax for the TPS according to the embodiments may further include sampling_attrs_per_lod_flag 3200 related to sampling. Since sampling_attrs_per_lod_flag according to the embodiments is the same as sampling_attrs_per_lod_flag 3000 described with reference to FIG. 30, a detailed description thereof will be omitted. When sampling_attrs_per_lod_flag is equal to 1, the syntax for the TPS according to the embodiments includes a 'for' statement indicating sampling related information 3210 for each LOD. Since the sampling related information 3210 for each LOD according to the embodiments is the same as the sampling related information 3010 for each LOD described with reference to FIG. 30, a detailed description thereof will be omitted.

FIG. 33 shows an exemplary syntax for an attribute header according to embodiments.

The syntax for the attribute header of FIG. 33 is an example of syntax of information transmitted through the header included in the attribute bitstream described with reference to FIG. 28.

When the LOD configurator (e.g., the LOD configurator 2110) according to the embodiments applies a neighbor point set generation method differently for each slice, the attribute header according to the embodiments may further include the LOD configuration information 3300 (e.g., the LOD configuration information 2900 described with reference to FIG. 29, the LOD configuration information 3100 described with reference to FIG. 31). The exemplary syntax for the attribute header shown in FIG. 33 may include the following information (or fields, parameters, etc.).

ash_attr_parameter_set_id has the same value as aps_attr_parameter_set_id of the active APSs.

ash_attr_sps_attr_idx may specify the value of sps_seq_parameter_set_id for the active SPS. The value of ash_attr_sps_attr_idx is in the range of 0 to the value of sps_num_attribute_sets included in the active SPS.

ash_attr_geom_slice_id specifies the value of a geometry slice ID (e.g. geom_slice_id).

As shown in the figure, the attribute header according to the embodiments may include LOD configuration information 3300. The LOD configuration information 3300 according to the embodiments is applied to each attribute bitstream (or attribute slice data) belonging to each slice. Since the LOD configuration information 3100 is the same as the LOD configuration information 2900 and 2900 described with reference to FIGS. 29 and 31, a detailed description thereof will be omitted.

FIG. 34 shows an exemplary syntax for an attribute header according to embodiments;

FIG. 34 shows an exemplary syntax for the attribute header described with reference to FIG. 33. The exemplary syntax for the attribute header in FIG. 34 is configured when sampling information is applied differently for each LOD.

The LOD configurator (e.g., the LOD configurator 2210) according to the embodiments may perform sampling differently or the same for each LOD. In this case, when lod_generation_type is equal to 2, the syntax for the attribute header according to the embodiments may further include sampling_attrs_per_lod_flag 3400 related to sampling. Since sampling_attrs_per_lod_flag according to the embodiments is the same as sampling_attrs_per_lod_flag 3000, 3200 described with reference to FIGS. 30 and 32, a detailed description thereof will be omitted. When sampling_attrs_per_lod_flag is equal to 1, the syntax for the attribute header according to the embodiments includes a 'for' statement indicating sampling related information 3410 for each LOD. Since the sampling related information 3410 for each LOD according to the embodiments is the same as the sampling related information 3010 and 3210 for each LOD described with reference to FIGS. 30 and 32, a detailed description thereof will be omitted.

Figure 35:
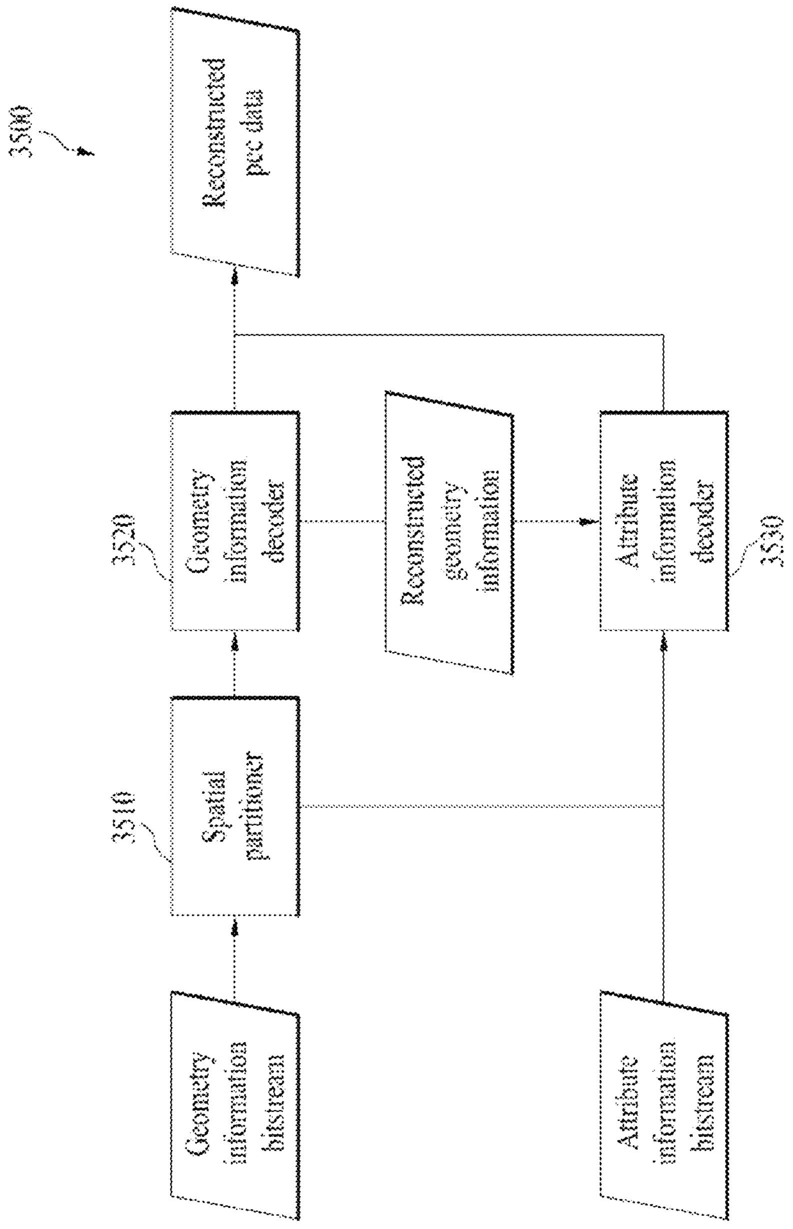
FIG. 35 is a block diagram illustrating an exemplary point cloud decoder.

FIG. 35 is a block diagram illustrating an exemplary point cloud decoder.

The point cloud decoder 3500 according to the embodiments performs a decoding operation that is the same or similar to that of the decoder described with reference to FIGS. 1 to 17 (e.g., the point cloud decoder described with reference to FIGS. 1, 10 to 11, 13, 14 and 16). Also, the point cloud decoder 3500 may perform a decoding operation corresponding to the opposite process of the encoding operation of the point cloud encoder 1800 described with reference to FIG. 18. The point cloud decoder 3500 according to the embodiments may include a spatial partitioner 3510, a geometry information decoder (or geometry decoder) 3520, and an attribute information decoder (or attribute decoder) 3530. Although not shown in FIG. 35, the point cloud decoder 3500 according to the embodiments may further include one or more elements to perform the decoding operation described with reference to FIGS. 1 to 17.

The spatial partitioner 3510 according to the embodiments may partition the space based on the signaling information (e.g., the information on the partitioning operation performed by the spatial partitioner 1810 described with reference to FIG. 18) received from the point cloud data transmission device (e.g., the point cloud data transmission device described with reference to FIGS. 1, 12, 14 and 15) according to the embodiments, or partitioning information derived (generated) by the point cloud decoder 3500. As described above, the partitioning operation of the spatial partitioner 1810 of the point cloud encoder 1800 may be based on at least one of an octree, a quadtree, a binary tree, a triple tree, or a k-d tree.

The geometry information decoder 3520 according to the embodiments may decode the input geometry bitstream and reconstruct geometry information. The reconstructed geometry information may be input to the attribute information decoder. The geometry information decoder 3520 according to the embodiments may perform the operations of the arithmetic decoder (arithmetic decode) 11000, the octree synthesizer (Synthesize octree) 11001, and the surface approximation synthesizer (Synthesize surface approximation) 11002, the geometry reconstructor (Reconstruct geometry) 11003, and the coordinate inverse transformer (Inverse transform coordinates) 11004 described with reference to FIG. 11. Also, the geometry information decoder 3520 according to the embodiments may perform the operations of the arithmetic decoder 13002, the occupancy code-based octree reconstruction processor 13003, and the surface model processor (triangle reconstruction, up-sampling, voxelization) 13004, and the inverse quantization processor 13005 described with reference to FIG. 13. Alternatively, the geometry information decoder 3520 according to the embodiments may perform the operation of the point cloud decoder described with reference to FIG. 16.

The attribute information decoder 3530 according to the embodiments may decode attribute information based on the attribute information bitstream and the reconstructed geometry information. The attribute information decoder 3530 according to the embodiments may perform operations which are the same or similar to the operations of the arithmetic decoder 11005, the inverse quantizer 11006, the RAHT transformer 11007, the LOD generator 11008, the inverse lifter 11009 and/or the color inverse transformer 11010, which are included in the point cloud decoder of FIG. 11. The attribute information decoder 3530 according to the embodiments may perform operations which are the same or similar to the operations of the arithmetic decoder 13007, the inverse quantization processor 13008, the prediction/lifting/RAHT inverse transform processor 13009, and the color inverse transform processor 13010, which are included in the reception device of FIG. 13.

The point cloud decoder 3500 may output final PCC data based on the reconstructed geometry information and the reconstructed attribute information.

Figure 36:
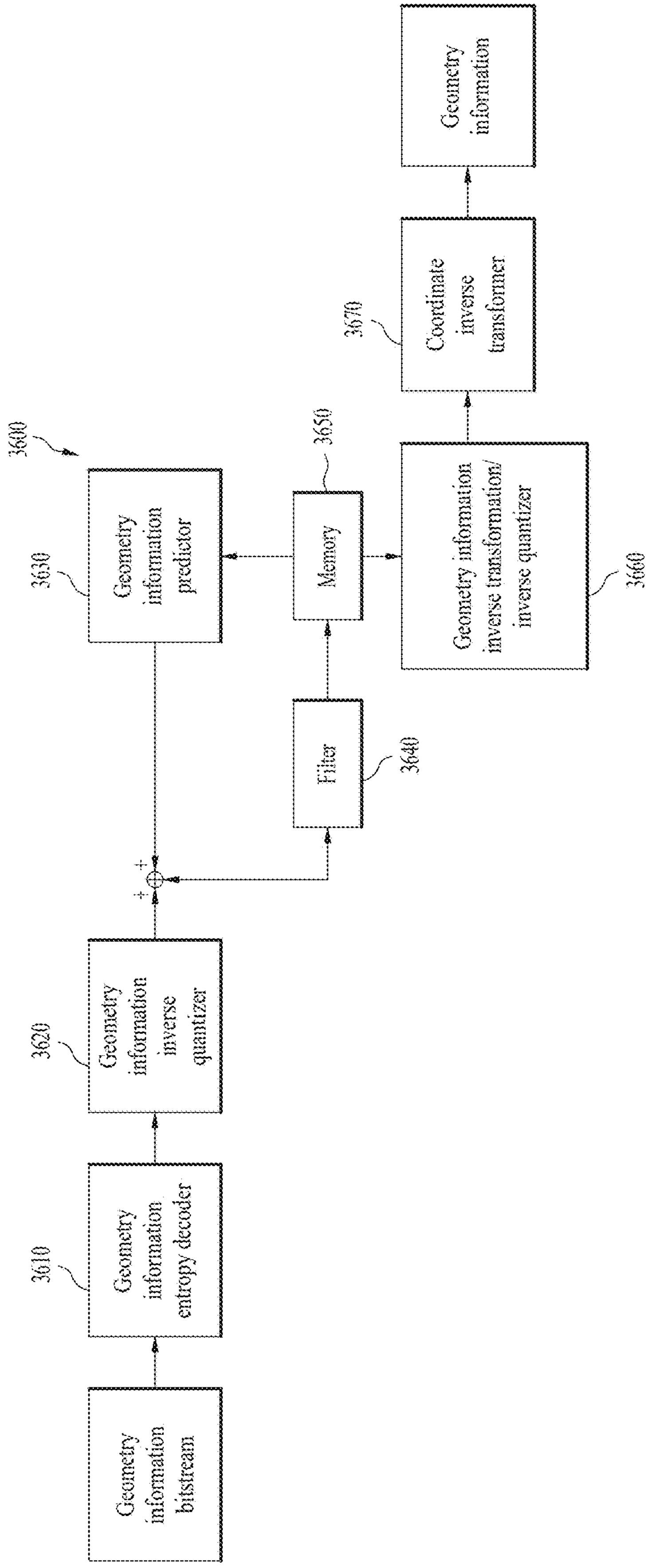
FIG. 36 is a block diagram illustrating an example of a geometry information decoder.

FIG. 36 is a block diagram illustrating an example of a geometry information decoder.

A geometry information decoder 3600 according to the embodiments is an example of the geometry information decoder 3520 of FIG. 35, and may perform an operation which is the same or similar to the operation of the geometry information decoder 3520. The geometry information decoder 3600 according to the embodiments may perform a decoding operation that is opposite to the encoding operation of the geometry information encoder 1900 described with reference to FIG. 19. The geometry information decoder 3600 according to the embodiments may include a geometry information entropy decoder 3610, a geometry information inverse quantizer 3620, a geometry information predictor 3630, a filter 3640, a memory 3650, a geometry information inverse transformation/inverse quantizer 3660, and a coordinate inverse transformer 3670. Although not shown in FIG. 36, the geometry information decoder 3600 according to the embodiments may further include one or more elements to perform the geometry decoding operation described with reference to FIGS. 1 to 35.

The geometry information entropy decoder 3610 according to the embodiments may generate quantized residual geometry information by entropy-decoding the geometry information bitstream. The geometry information entropy decoder 3610 may perform an entropy decoding operation that is inverse process of the entropy encoding performed by the geometry information entropy encoder 1905 described with reference to FIG. 19. As described above, the entropy encoding operation according to the embodiments may include exponential Golomb, CAVLC and CABAC, and the entropy decoding operation exponential Golomb, CAVLC, and CABAC corresponding to the entropy encoding operation. The geometry information entropy decoder 3610 according to the embodiments may decode information related to geometry coding included in the geometry information bitstream, for example, information related to generation of predicted geometry information, information related to quantization (e.g., quantization values, etc.), signaling information related to coordinate transformation, and the like.

The residual geometry information inverse quantizer 3620 according to the embodiments may generate residual geometry information or geometry information by performing an inverse quantization operation on the quantized residual geometry information based on quantization-related information.

The geometry information predictor 3630 according to the embodiments may generate predicted geometry information based on information related to generation of predicted geometry information output from the geometry entropy decoder 3610 and previously decoded geometry information stored in the memory 3650. The geometry information predictor 3630 according to the embodiments may include an inter-predictor and an intra-predictor. The inter-predictor according to the embodiments may perform inter-prediction on the current prediction unit based on information included in at least one of a space before or after the current space (e.g., a frame, a picture, etc.) in a current space including the current prediction unit based on information necessary for inter-prediction of the current prediction unit (e.g., node, etc.) provided by the geometry information encoder (e.g., the geometry information encoder 1900). The intra-predictor according to the embodiments may generate predicted geometry information based on geometry information about a point in the current space based on information related to intra-prediction in a prediction unit provided by the geometry information encoder 1900.

The filter 3640 according to the embodiments may filter the reconstructed geometry information generated by combining the predicted geometry information, which is generated based on the filtering-related information, and the reconstructed residual geometry information. The filtering-related information according to the embodiments may be signaled from the geometry information encoder 1900. Alternatively, the geometry information decoder 3600 according to the embodiments may derive and calculate filtering-related information in the decoding process.

The memory 3650 according to the embodiments may store the reconstructed geometry information. The geometry inverse transformation quantizer 3660 according to the embodiments may inversely transform-quantize the reconstructed geometry information stored in the memory 3650 based on quantization-related information.

The coordinate system inverse transformer 3670 according to the embodiments may inversely transform the coordinates of the inversely transform-quantized geometry information based on the coordinate transformation related information provided by the geometry information entropy decoder 3610 and the reconstructed geometry information stored in the memory 3650, and output the geometry information.

Figure 37:
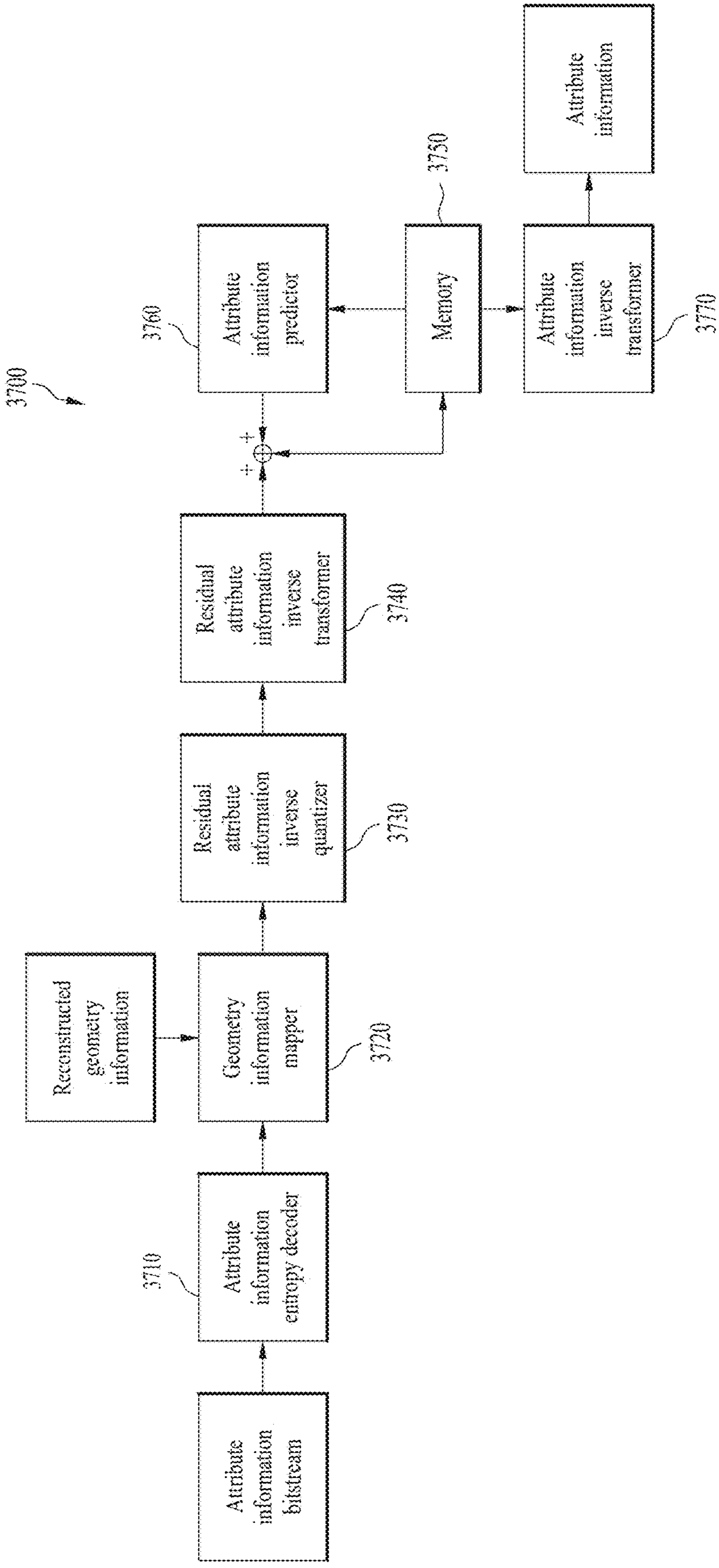
FIG. 37 is a block diagram illustrating an exemplary attribute information decoder.

FIG. 37 is a block diagram illustrating an exemplary attribute information decoder.

An attribute information decoder 3700 according to embodiments is an example of the attribute information decoder 3530 of FIG. 35, and may perform an operation which is the same or similar to the operation of the attribute information decoder 3530. The attribute information decoder 3700 according to the embodiments may perform a decoding operation that is opposite to the encoding operations of the attribute information encoder 2000 and the attribute information encoder 2100 described with reference to FIGS. 20 and 21. The attribute information decoder 3700 according to the embodiments may include an attribute information entropy decoder 3710, a geometry information mapper 3720, a residual attribute information inverse quantizer 3730, a residual attribute information inverse transformer 3740, a memory 3750, an attribute information predictor 3760, and an attribute information inverse transformer 3770. Although not shown in FIG. 37, the attribute information decoder 3700 according to the embodiments may further include one or more elements to perform the attribute decoding operation described with reference to FIGS. 1 to 36.

The attribute information entropy decoder 3710 receives the attribute information bitstream and performs entropy decoding to generate transform-quantized attribute information.

The geometry information mapper 3720 generates residual attribute information by mapping the transform-quantized attribute information and the reconstructed geometry information.

The residual attribute information inverse quantizer 3730 may inversely quantize the residual attribute information based on a quantization value.

The residual attribute information inverse transformer 3740 may inversely transform the residual 3D block including attribute information obtained through inverse quantization by performing transform coding such as DCT, DST, SADCT, or RAHT.

The memory 3750 may add the predicted attribute information output from the attribute information predictor 3760 and store the inversely transformed attribute information. Alternatively, the memory 3750 may add and store the predicted attribute information and the attribute information n without inversely transforming the attribute information.

The attribute information predictor 3760 may generate predicted attribute information based on the attribute information stored in the memory 3750. The attribute information predictor 3760 may generate the predicted attribute information by performing entropy decoding.

The attribute information inverse transformer 3770 may receive the type and transform information about the attribute information from the attribute information entropy decoder 3710 to perform various types of color inverse transform coding.

Figure 38:
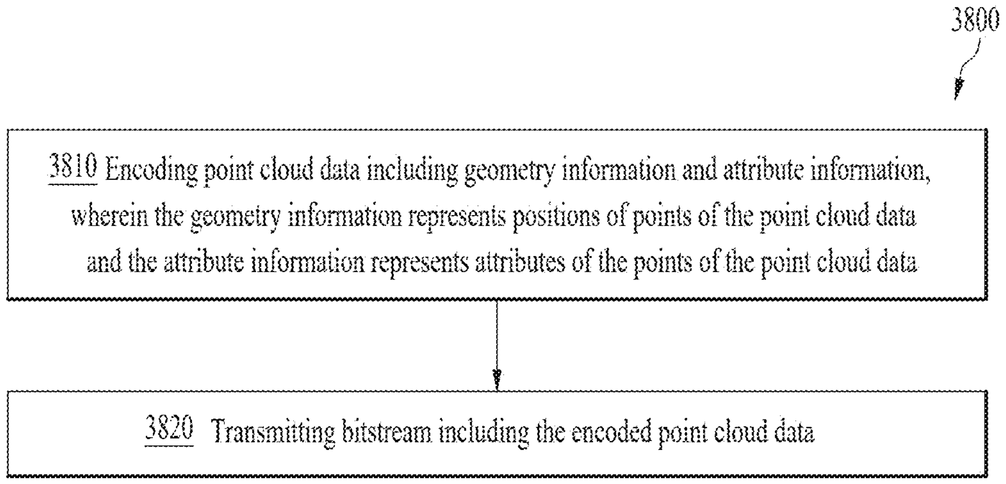
FIG. 38 is an exemplary flow diagram of a point cloud data processing method according to embodiments.

FIG. 38 is an exemplary flow diagram of a point cloud data processing method according to embodiments.

The flow diagram 3800 of FIG. 38 illustrates a point cloud data processing method for the point cloud data processing device (e.g., the point cloud data transmission device or point cloud data encoder described with reference to FIGS.

1, 11, 14, 15, and 18 to 22). The point cloud data processing device according to the embodiments may perform the same or similar operation to the encoding operation described with reference to FIGS. 1 to 35.

The point cloud data processing device according to the embodiments may encode point cloud data including geometry information and attribute information (3810). The geometry information according to the embodiments is information indicating positions of points of the point cloud data. The attribute information according to the embodiments is information indicating attributes of the points of the point cloud data.

The point cloud data processing device according to the embodiments may encode the geometry information and encode the attribute information. The point cloud data processing device according to the embodiments performs the same or similar operation to the geometry information encoding operation described with reference to FIGS. 1 to 37. In addition, the point cloud data processing device performs the same or similar operation to the attribute information encoding operation described with reference to FIGS. 1 to 37. The point cloud data processing device according to embodiments may generate at least one LOD by partitioning the points. Since the LOD generation scheme or method according to the embodiments is the same as or similar to the LOD generation scheme or method described with reference to FIGS. 22 to 27, a detailed description thereof will be omitted.

The point cloud data processing device according to the embodiments may transmit a bitstream containing the encoded point cloud data (3820).

Since the structure of the bitstream according to the embodiments is the same as that described with reference to FIG. 28, a detailed description thereof will be omitted. The bitstream according to the embodiments may include LOD configuration information (e.g., LOD configuration information described with reference to FIGS. 29 to 34). The LOD configuration information according to the embodiments may be transmitted to the reception device through an APS, a TPS, an attribute header, or the like as described with reference to FIGS. 29 to 34.

The LOD configuration information according to the embodiments may include type information (e.g., lod_generation_type described with reference to FIGS. 29 to 34) indicating the type of the LOD generation method. The type information according to the embodiments may indicate at least one of a first type of generating an LOD based on a distance between points (e.g., the distance-based LOD generation method described with reference to FIG. 22) and a second type of generating an LOD by Morton code-based sampling of points (e.g., the Morton order-based sampling LOD generation method described with reference to FIG. 22). Since the LOD set generation method is the same as that described with reference to FIG. 22, a detailed description thereof will be omitted.

When the type information according to the embodiments indicates the second type, the LOD configuration information may include sampling range type information (e.g., sampling_range_type described with reference to FIGS. 29 to 34), sampling rate information (e.g., sampling_rate described with reference to FIGS. 29 to 34), fixed index information about a point that may be selected according to sampling (e.g., sampling_select_idx described with reference to FIGS. 29 to 34), and point selection method information for selecting a point in a sampling range (e.g., sampling_select_type described with reference to FIGS. 29 to 34), and information about the maximum number of points that may be selected according to sampling (e.g., sampling_select_max_num_of_points described with reference to FIGS. 29 to 34). Sampling range type information according to embodiments may have any one of values 1 to 4. The sampling range type information may have any one of values 1 to 4. When the value of the sampling range type information is greater than or equal to 2, the LOD configuration information may further include sampling information related to one or more points that may be defined as isolated points (e.g., sampling_begin_depth, sampling_isolated_point_minimum_num_of_elements, and sampling_isolated_point_sampling_type described with reference to FIG. 29). Since the LOD configuration information according to the embodiments is the same as that described with reference to FIGS. 29 to 34, a detailed description thereof will be omitted.

Figure 39:
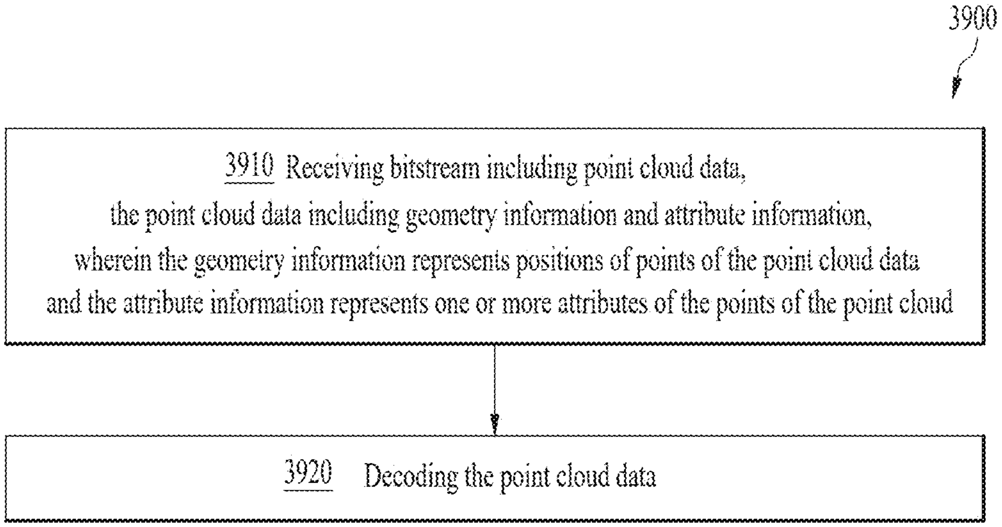
FIG. 39 is an exemplary flow diagram of a point cloud data processing method according to embodiments.

FIG. 39 is an exemplary flow diagram of a point cloud data processing method according to embodiments.

The flow diagram 3900 of FIG. 39 illustrates a point cloud data processing method for a point cloud data processing device (e.g., the point cloud data reception device or point cloud data decoder described with reference to FIGS. 1, 13, 14, 16, 27, and 28). The point cloud data processing device according to the embodiments may perform the same or similar operation to the decoding operation described with reference to FIGS. 1 to 35.

The point cloud data processing device according to the embodiments receives a bitstream including point cloud data (3910).

The point cloud data processing device according to the embodiments decodes the point cloud data (3920). The decoded point cloud data according to the embodiments includes geometry information and attribute information. The geometry information is information indicating positions of points of the point cloud data. The attribute information according to the embodiments is information indicating attributes of the points of the point cloud data. Since the structure of the bitstream according to the embodiments is the same as that described with reference to FIG. 28, a detailed description thereof will be omitted.

The point cloud data processing device according to the embodiments may decode the geometry information and decode the attribute information. The point cloud data processing device according to the embodiments performs the same or similar operation to the geometry information decoding operation described with reference to FIGS. 1 to 37. In addition, the point cloud data processing device performs the same or similar operation to the attribute information decoding operation described with reference to FIGS. 1 to 37. The point cloud data processing device according to embodiments may generate at least one LOD by partitioning the points. Since the LOD generation scheme or method according to the embodiments is the same as or similar to the LOD generation scheme or method described with reference to FIGS. 22 to 27, a detailed description thereof will be omitted.

Since the structure of the bitstream according to the embodiments is the same as that described with reference to FIG. 28, a detailed description thereof will be omitted. The bitstream according to the embodiments may include LOD configuration information (e.g., LOD configuration information described with reference to FIGS. 29 to 34). The neighbor point set generation information according to the embodiments may be transmitted to the reception device through an APS, a TPS, an attribute header, or the like as described with reference to FIGS. 29 to 34.

The LOD configuration information according to the embodiments may include type information (e.g., lod_generation_type described with reference to FIGS. 29 to 34) indicating the type of the LOD generation method. The type information according to the embodiments may indicate at least one of a first type of generating an LOD based on a distance between points (e.g., the distance-based LOD generation method described with reference to FIG. 22) and a second type of generating an LOD by Morton code-based sampling of points (e.g., the Morton order-based sampling LOD generation method described with reference to FIG. 22). Since the LOD set generation method is the same as that described with reference to FIG. 22, a detailed description thereof will be omitted.

When the type information according to the embodiments indicates the second type, the LOD configuration information may include sampling range type information (e.g., sampling_range_type described with reference to FIGS. 29 to 34), sampling rate information (e.g., sampling_rate described with reference to FIGS. 27 to 32), fixed index information about a point that may be selected according to sampling (e.g., sampling_select_idx described with reference to FIGS. 29 to 34), and point selection method information for selecting a point in a sampling range (e.g., sampling_select_type described with reference to FIGS. 29 to 34), and information about the maximum number of points that may be selected according to sampling (e.g., sampling_select_max_num_of_points described with reference to FIGS. 29 to 34). The sampling range type information may have any one of values 1 to 4. When the value of the sampling range type information is greater than or equal to 2, the LOD configuration information may further include sampling information related to one or more points that may be defined as isolated points (e.g., sampling_begin_depth, sampling_isolated_point_minimum_num_of_elements, and sampling_isolated_point_sampling_type described with reference to FIG. 29). Since the LOD configuration information according to the embodiments is the same as that described with reference to FIGS. 27 to 32, a detailed description thereof will be omitted.

Components of the point cloud data processing devices according to the embodiments described with reference to FIGS. 1 to 39 may be implemented as hardware, software, firmware, or a combination thereof including one or more processors coupled with a memory. The components of the devices according to the embodiments may be implemented as a single chip, for example, a single hardware circuit. Alternatively, the components of the point cloud data processing devices according to the embodiments may be implemented as separate chips. In addition, at least one of the components of the point cloud data processing devices according to the embodiments may include one or more processors capable of executing one or more programs, wherein the one or more programs may include are instructions that execute or are configured to execute one or more of the operations/methods of the point cloud data processing devices described with reference to FIGS. 1 to 39.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Descriptions of methods and devices may be applied so as to complement each other. For example, the point cloud data transmission method according to the embodiments may be carried out by the point cloud data transmission device or components included in the point cloud data transmission device according to the embodiments. Also, the point cloud data reception method according to the embodiments may be carried out by the point cloud data reception device or components included in the point cloud data reception device according to the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

MODE FOR DISCLOSURE

As described above, related contents have been described in the best mode for carrying out the embodiments.

INDUSTRIAL APPLICABILITY

It will be apparent to those skilled in the art that various changes or modifications can be made to the embodiments within the scope of the embodiments. Thus, it is intended that the embodiments cover the modifications and variations of this disclosure provided they come within the scope of the appended claims and their equivalents.

The invention claimed is:

1. A method for processing point cloud data, the method comprising:

encoding the point cloud data including geometry information and attribute information, wherein the geometry information represents positions of points of the point cloud data and the attribute information represents attributes of the points of the point cloud data, wherein the encoding the point cloud data includes encoding the geometry information and encoding the attribute information, wherein the encoding the attribute information includes generating at least one level of detail (LOD), wherein the generating at least one LOD includes sampling at least one point in a sampling range based on an octree, and wherein the sampling includes a grouping operation based on a number of points within the sampling range and an assigning operation of one point based on the grouping operation; and transmitting a bitstream including the encoded point cloud data.

2. The method of claim 1, wherein the grouping operation includes grouping the sampling range and at least one other sampling range based on the number of points of the sampling range, wherein the grouping includes comparing the number of points of the sampling range with a specific minimum number, wherein, based on the number of points of the sampling range being less than the specific minimum number, the sampling range is grouped with the at least one other sampling range, and wherein the sampling range corresponds to at least one node of the octree.

3. The method of claim 1, wherein the bitstream includes first information representing types of sampling methods to generate the at least one LOD, wherein the first information includes a first type of sampling methods representing the sampling range based on the octree, wherein, based on the first information indicating the first type of sampling methods, one point is sampled from the sampling range to generate the at least one LOD, and wherein the bitstream includes second information related to a sampling period.

4. A device configured to process for processing point cloud data, the device comprising:

an encoder configured to encode the point cloud data including geometry information and attribute information, wherein the geometry information represents positions of points of the point cloud data and the attribute information represents attributes of the points of the point cloud data, wherein the encoder includes a first encoder configured to encode the geometry information, wherein the encoder includes a second encoder configured to encode the attribute information, wherein the second encoder includes a level of detail (LOD) generator configured to generate at least one LOD, wherein the LOD generator is configured to perform sampling at least one point in a sampling range based on an octree, and wherein the LOD generator is configured to perform a grouping operation based on a number of points within the sampling range and an assigning operation of one point based on the grouping operation; and a transmitter configured to transmit a bitstream including the encoded point cloud data.

5. The device of claim 4, wherein the LOD generator is configured to group the sampling range and at least one other sampling range based on the number of points of the sampling range, wherein the LOD generator is configured to compare the number of points of the sampling range with a specific minimum number, wherein, based on the number of points of the sampling range being less than the specific minimum number, the sampling range is grouped with the at least one other sampling range, and wherein the sampling range corresponds to at least one node of the octree.

6. The device of claim 4, wherein the bitstream includes first information representing types of sampling methods to generate the at least one LOD.

7. The device of claim 6, wherein the first information includes a first type of sampling methods representing the sampling range based on the octree, wherein, based on the first information indicating the first type of sampling methods, one point is sampled from the sampling range to generate the at least one LOD, and wherein the bitstream includes second information related to a sampling period.

8. A method of processing point cloud data, the method comprising:

receiving a bitstream including the point cloud data, wherein the point cloud data includes geometry information and attribute information, and wherein the geometry information represents positions of points of the point cloud data and the attribute information represents attributes of the points of the point cloud data; and decoding the point cloud data, wherein the decoding the point cloud data includes decoding the geometry information and decoding the attribute information, wherein the decoding the attribute information includes generating at least one level of detail (LOD), wherein the generating at least one LOD includes sampling at least one point in a sampling range based on an octree, and wherein the sampling includes a grouping operation based on a number of points within the sampling range and an assigning operation of one point based on the grouping operation.

9. The method of claim 8, wherein the grouping operation includes grouping the sampling range and at least one other sampling range based on the number of points of the sampling range, wherein the grouping includes comparing the number of points of the sampling range with a specific minimum number, wherein, based on the number of points of the sampling range being less than the specific minimum number, the sampling range is grouped with the at least one other sampling range, and wherein the sampling range corresponds to at least one node of the octree.

10. The method of claim 9, wherein the bitstream includes first information representing types of sampling methods to generate the at least one LOD, wherein the first information includes a first type of sampling methods representing the sampling range based on the octree, wherein, based on the first information indicating the first type of sampling methods, one point is sampled from the sampling range to generate the at least one LOD, and wherein the bitstream includes second information related to a sampling period.

11. A device of processing point cloud data, the device comprising:

a receiver configured to receive a bitstream including the point cloud data, wherein the point cloud data includes geometry information and attribute information, and wherein the geometry information represents positions of points of the point cloud data and the attribute information represents attributes of the points of the point cloud data; and a decoder configured to decode the point cloud data, wherein the decoder includes a first decoder configured to decode the geometry information, wherein the decoder includes a second decoder configured to decode the attribute information, wherein the second decoder includes a level of detail (LOD) LOD (Level of Detail) generator configured to generate at least one LOD, wherein the LOD generator is configured to perform sampling at least one point in a sampling range based on an octree, and wherein the LOD generator is configured to perform a grouping operation based on a number of points within the sampling range and an assigning operation of one point based on the grouping operation.

12. The device of claim 11, wherein the LOD generator is configured to group the sampling range and at least one other sampling range based on the number of points of the sampling range, wherein the LOD generator is configured to compare the number of points of the sampling range with a specific minimum number, wherein, based on the number of points of the sampling range being less than the specific minimum number, the sampling range is grouped with the at least one other sampling range, and wherein the sampling range corresponds to at least one node of the octree.

13. The device of claim 12, wherein the bitstream includes first information representing types of sampling methods to generate the at least one LOD, wherein the first information includes a first type of sampling methods representing the sampling range based on the octree, and wherein, based on the first information indicating the first type of sampling methods, one point is sampled from the sampling range to generate the at least one LOD.

14. The device of claim 13, wherein the bitstream includes second information related to a sampling period.

* * * * *